Figure 1:
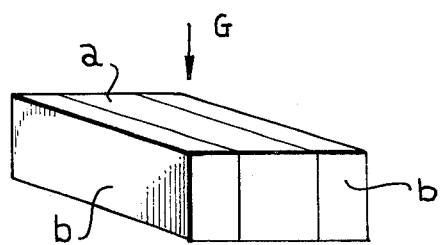

United States Patent [19]
Hirata et al.

[11] 3,931,449
[45] Jan. 6, 1976

[54] RESINOUS LAMINATES HAVING IMPROVED GAS PERMEATION AND RESISTANCE TO DELAMINATION

[75] Inventors: Sadao Hirata; Syunsaku Hirata, both of Yokohama; Toru Suzuki, Yokosuka; Akira Kishimoto, Tokyo, all of Japan

[73] Assignee: Toyo Seikan Kaisha Limited, Tokyo, Japan

[22] Filed: Aug. 16, 1973

[21] Appl. No.: 388,805

[30] Foreign Application Priority Data
Aug. 17, 1972  Japan.............................. 47-82348
Oct. 4, 1972  Japan.............................. 47-98993
July 7, 1973  Japan.............................. 48-76138

[52] U.S. Cl. .............. 428/474; 428/35; 428/36; 428/423; 428/483; 428/519; 428/520; 428/522; 260/857 C; 260/899 B; 260/859; 260/873; 264/176; 426/106
[51] Int. Cl.² .................. B32B 27/08; C08G 41/04
[58] Field of Search .......... 161/252, 253, 254, 255; 260/857 L, 897 B; 428/474, 483, 519, 428/520, 522

[56] References Cited
UNITED STATES PATENTS

| | | | |
|---|---|---|---|
| 3,419,654 | 12/1968 | Chiba et al. ................ | 264/288 X |
| 3,496,061 | 2/1970 | Freshour et al............. | 161/252 X |
| 3,552,638 | 1/1971 | Quackenbush ................ | 161/252 X |
| 3,595,740 | 7/1971 | Gerow ........................... | 161/256 X |
| 3,673,055 | 6/1972 | Sheld ............................ | 161/252 X |
| 3,767,523 | 10/1973 | Schwarz.......................... | 161/254 |
| 3,847,728 | 11/1974 | Hirata et al.................... | 161/254 X |

FOREIGN PATENTS OR APPLICATIONS

| | | |
|---|---|---|
| 30,296 | 7/1972 | Japan |
| 1,254,354 | 11/1971 | United Kingdom |
| 1,950,479 | 5/1970 | Germany |
| 7,031,758 | 10/1970 | Japan |

OTHER PUBLICATIONS
Chem. Ab., 75:6914w, Soki, 1971.

*Primary Examiner*—George F. Lesmes
*Assistant Examiner*—Patricia C. Ives
*Attorney, Agent, or Firm*—Diller, Brown, Ramik & Wight

[57] ABSTRACT

A resin laminate structure comprising a layer of a polymer selected from the group consisting of polyolefins and saponified products of ethylene-vinyl acetate copolymers and a layer of a blend comprising (A) a polyolefin and (B) a saponified product of an ethylene-vinyl acetate copolymer having an ethylene content of 25 to 50 mole % and a degree of saponification of at least 96% at an A:B mixing weight ratio ranging from 98:2 to 2:98, said two layers being laminated so that they are adjacent to each other.

17 Claims, 4 Drawing Figures

RESINOUS LAMINATES HAVING IMPROVED GAS PERMEATION AND RESISTANCE TO DELAMINATION

This invention relates to a resin laminate structure having in combination a high resistance to gas permeation and a high resistance to delamination. More detailedly, the invention relates to a laminate structure comprising a layer of a polyolefin or a saponified product of an ethylene-vinyl acetate copolymer and a layer of a blend of a polyolefin and a saponified product of an ethylene-vinyl acetate copolymer which may further include a carbonyl group-containing thermoplastic polymer, said two layers being laminated directly in the state adjacent to each other, namely without any adhesive layer.

Polyolefins have heretofore been broadly used as packaging materials for foodstuffs and the like by reason of excellent mechanical strength and sanitary qualities. However, polyolefins are fatally defective in that permeability of gases such as oxygen and carbon dioxide gas is very high, and polyolefins are still insufficient in that foodstuffs cannot be preserved for a long time with use of containers or the like formed of polyolefins.

Furthermore, disposal of used polyolefin containers includes a serious problem. More specifically, when used polyolefin containers are subjected to the incineration treatment, a large quantity of combustion heat is generated and refuse fernaces are readily damaged.

As means for improving the gas permeation resistance in polyolefins, there have been proposed methods comprising copolymerizing ethylene with various vinyl monomers. For instance, U.S. Pat. No. 3,419,654 discloses the use of a saponified product of an ethylenevinyl acetate copolymer. Although such saponified product is advantageous over polyolefins in the point that its oxygen permeability is much smaller than that of polyolefins, and the combustion heat generated at incineration is much smaller than the combustion heat generated at the incineration treatment of polyolefins, it is still defective in that its water vapor permeability is high because of its hydrophilic properties and that its mechanical strength, especially impact resistance, is considerably low.

It is considered that a packaging material having in combination characteristic properties of polyolefins and those of ethylene-vinyl acetate copolymer saponified products may be obtained by laminating a polyolefin and an ethylene-vinyl acetate copolymer saponified product. However, because there is hardly any affinity between these two resin layers, it is generally difficult to laminate them without use of an adhesive. As means for overcoming this disadvantage, U.S. Pat. No. 3,595,740 proposes a method comprising laminating a polyolefin layer and an ethylene-vinyl acetate copolymer saponified product layer through an intermediate layer of an adhesive such as ethylene-ethyl acrylate copolymer to thereby form a film excellent in the gas permeation resistance. The so formed film is excellent in that it has a high gas permeation resistance ( gas barrier property ) and it is heat-sealable. However. in view of operational procedures this proposal is industrially disadvantageous in that a specific adhesive layer should be interposed to laminate a polyolefin layer and an ethylene-vinyl acetate copolymer saponified product layer and complicated steps are required for extrusion with use of a number of extruders.

We have found that a blend of a polyolefin and an ethylene-vinyl acetate copolymer saponified product can be laminated with a polyolefin or an ethylene-vinyl acetate copolymer saponified product without use of any particular adhesive layer and that the resulting laminate structure has a desired combination of a gas permeation resistance and a delamination resistance and hence, it is very valuable as a packaging material such as bottle, tube, tank or packaging film to be used for containing or preserving foodstuffs, medicines, cosmetics and the like.

We have also found that when a thermoplastic polymer having a carbonyl group in its main or side chain is incorporated in said blend, a much stronger bonding can be obtained between said blend layer and a layer of the polyolefin or ethylene-vinyl acetate copolymer saponified product without use of any particular adhesive layer and the resulting laminate structure not only has a desired combination of a gas permeation resistance and a delamination resistance but also is excellent in appearance characteristics such as transparency and smoothness, mechanical properties such as impact resistance and processability at the molding operation.

It has further found that when a melt of a polyolefin or an ethylene-vinyl acetate copolymer saponified product and a melt of the above-mentioned polymer blend are simultaneously extruded and molded under such specific co-extrusion conditions that in a multi-ply molding die the difference of the average flow rate of the melt of the ethylene-vinyl acetate copolymer sampnified product at a resin passage for said polymer blend and the average flow rate of the melt of the polyolefin optionally with said carbonyl group-containing thermoplastic polymer at said passage is at least 1 cm/sec, there can be obtained a molded laminate structure, the layer of the polymer blend of which has such a laminar structure that the polymer composition is different in the thickness direction but substantially identical in the plane direction and each laminar layer is continuous with respect to the plane direction; such molded laminate structure comprised in the polymer blend layer adjoining to the polyolefin or ethylene-vinyl acetate copolymer saponified product layer a plurality of layers, each of which contains predominantly any of the polymer blend constituents, i.e., the polyolefin, the copolymer saponified product and optionally the carbonyl group-containing polymer, at a ratio exceeding the average content in the polymer blend; and that by reason of such specific layer structure the above-mentioned molded laminate structure can possess an excellent strong bonding between the polyolefin or saponified copolymer layer and the polymer blend layer, which bonding is much superior to the bonding attained in a laminate structure comprising a mere polymer blend layer with respect to not only the delamination resistance but also the impact resistance, water resistance, heat resistance and hot water resistance, and in this specific molded laminate structure the permeability of ordinary gases such as oxygen, steam and carbon dioxide gas can be much reduced.

It is a primary object of this invention to provide a novel laminate structure which exhibits an excellent permeation resistance similarly to oxygen, steam, carbon dioxide gas, etc. and which comprises a layer of a polyolefin or an ethylene-vinyl acetate copolymer saponified product and a layer of a blend of a polyolefin and an ethylene-vinyl acetate copolymer saponified product, said two layers being tightly bonded to each other without use of any particular adhesive layer.

Another object of this invention is to provide a resin laminate structure which has in combination an excellent gas permeation resistance and an excellent delamination resistance and hence, is valuable as a container for liquid foodstuffs, medicines or cosmetics, such as bottle, tube and tank and as a packaging material such a film.

A further object of this invention is to provide a technique for preparing laminate structures, according to which a polyolefin or a saponified product of an ethylene-vinyl acetate copolymer and a blend of a polyolefin and a saponified product of an ethylene-vinyl acetate copolymer are simultaneously extruded from melt extruders, respectively and thus there can be obtained a strong bonding between a layer of the polyolefin or saponified copolymer and a layer of the polymer blend.

A still further object of this invention is to provide a novel molded laminate structure which is formed by co-extruding a melt of a polyolefin or a saponified product of an ethylene-vinyl acetate copolymer and a melt of a polymer blend of a polyolefin, a saponified product of an ethylene-vinyl acetate copolymer and optionally a carbonyl group-containing thermoplastic polymer and which has such a specific layer structure that a layer of said polymer blend has such a laminar structure that the polymer composition is different with respect to the thickness direction but substantially identical with respect to the plane direction and each laminar layer is continuous with respect to the plane direction; and that in the polymer blend layer adjoining to the polyolefin or ethylene-vinyl acetate copolymer saponified product there are formed a plurality of layers, each of which contains predominantly any of the polymer blend constituents, i.e., the polyolefin, the saponified copolymer and optionally the carbonyl group-containing polymer; and a process for the preparation of such molded laminate structure.

In accordance with one aspect of this invention, there is provided a resin laminate structure comprising a layer of a polymer selected from the group consisting of polyolefins and saponified products of ethylene-vinyl acetate copolymers and a layer of a blend comprising (A) a polyolefin and (B) a saponified product of an ethylene-vinyl acetate copolymer having an ethylene content of 25 to 50 mole % and a degree of saponification of at least 96% at an A : B mixing weight ratio ranging from 98 : 2 to 2 : 98, said two layers being laminated so that they are adjacent to each other.

In accordance with another aspect of this invention, there is provided a resin laminate structure set forth above, wherein the blend layer further comprises a thermoplastic polymer containing a carbonyl group in the main or side chain thereof in an amount of 0.5 to 15 parts by weight per 100 parts of the sum of the polyolefin (A) and the saponified copolymer (B).

In accordance with a still further aspect of this invention, there is provided a resin laminate structure set forth above, wherein the blend layer has a laminar structure formed by extrusion molding of said polymer blend, in which the polymer composition is different with respect to the thickness direction but substantially identical with respect to the plane direction, and wherein when said blend layer is divided into three layers in the thickness direction, at least one layer continuous with respect to the plane direction contains predominantly the ethylene-vinyl acetate copolymer saponified product (B), namely contains said saponified product in an amount expressed by the following formula $$M_1 = m_1 X$$

wherein $X$ stands for the average content ( % by weight ) of the ethylene-vinyl acetate copolymer saponified product (B) in said blend layer, $m_1$ is a number of at least 1.05 and $M_1$ is the content (% by weight ) of said saponified product in said specific divided layer, and at least one layer of the remaining two divided layers continuous with respect to the plane direction contains predominantly the polyolefin (A), namely contains said saponified product (B) in an amount expressed by the following formula $$M_2 = m_2 X$$

wherein $X$ is defined above, $m_2$ is a number of from 0 to 0.95, and $M_2$ is the content ( % by weight ) of said saponified product in said specific divided layer.

The laminate structure of this invention has various advantages in addition to a desired combination of a high permeation resistance to oxygen, steam, carbon dioxide gas, etc. and a high delamination resistance. By reason of excellent moisture resistance, sanitation characteristics and flexibility, polyolefins have heretofore been used broadly as containers for various liquid materials. However, disposal of used polyolefin containers involves a serious problem. More specifically, when used polyolefin containers are subjected as refuses to the incineration treatment, a large quantity of combustion heat is generated and refuse furnaces are readily damaged. In contrast, when a blend of a polyolefin and a saponified product of an ethylene-vinyl acetate copolymer is laminated with a polyolefin or saponified product of an ethylene-propylene copolymer according to this invention, in a container formed from such laminate structure the combustion heat generated at the incineration treatment can be much reduced as compared with the case of a polyolefin container, with the result that the damage of refuse furnaces can be greatly lowered.

This invention will now be illustrated detailedly.

RESIN COMPONENTS

The basic concept of this invention resides in that a blend of a polyolefin and a saponified product of an ethylene-vinyl acetate copolymer has a good adhesiveness to a polyolefin or a saponified product of an ethylene-vinyl acetate copolymer and a laminate structure formed by laminating a layer of said blend directly with a layer of the polyolefin or saponified copolymer has a delamination resistance sufficient to endure not only ordinary application conditions but also falling shock or the like; when a layer of said blend is laminated with a layer of a polyolefin, the resulting laminate structure has a much reduced oxygen permeability as compared with the case of a polyolefin alone; and that when a layer of said blend is laminated with a layer of a saponified product of an ethylene-vinyl acetate copolymer, the resulting laminate structure has a much reduced steam permeability as compared with the case of such saponified copolymer alone.

The saponified product of an ethylene-vinyl acetate copolymer to be used in the blend layer of the molded structure of this invention is obtained by saponifying an ethylene-vinyl acetate copolymer having an ethylene content of 25 to 50 mole % so that the degree of saponification reaches at least 96%.

The ethylene-vinyl acetate copolymer saponified product to be used in this invention is composed of polymerized ethylene units and vinyl alcohol units. Accordingly, in this invention saponified products of copolymers of ethylene with a monomer capable of forming a vinyl alcohol unit by saponification subsequent to polymerization, such as vinyl esters of lower fatty acids other than vinyl acetate, e.g., vinyl formate and vinyl propionate, can be similarly used as the saponified copolymer.

In case the ethylene content exceeds 50 mole % in the saponified copolymer, the gas permeation resistance (gas-barrier property) against gases such as oxygen is lost, and the objects of this invention cannot be attained. In case the ethylene content of the saponified copolymer is less than 25 mole %, the layer structure exhibits a high hydrophilic property and its water vapor permeability becomes high with degradation of its moldability. Accordingly, use of such saponified copolymer is not suitable for attaining the objects of this invention.

Further, in order to maintain a gas permeation resistance to oxygen, steam, carbon dioxide, etc. at a high level and heighten the adhesiveness of a layer of said blend to a layer of the polyolefin or saponified copolymer, it is important that the ethylene content in the saponified copolymer should be adjusted within the above-mentioned range.

In order for the molded structure to have an improved gas permeation resistance, it is essential that the degree of saponification should be at least 96%.

A saponified product of an ethylene-vinyl acetate copolymer to be especially preferably used in this invention has an ethylene content of 25 to 45 mole % and a degree of saponification of at least 99%.

In compositions comprising a polyolefin and a saponified copolymer of ethylene and vinyl acetate, which have heretofore been used as packaging laminate materials ( for instance, those disclosed in Japanese Patent Publication No. 30296/72 ), an ethylene-vinyl acetate copolymer saponified product having a very high ethylene content, namely a saponified copolymer having a vinyl acetate content of 10 to 50% by weight ( which corresponds to an ethylene content of 75 to 96.5 mole % ), is employed. A saponified copolymer having such a high ethylene content, however, has a very high oxygen permeability and exhibits a very poor interlaminar strength when molded in a laminate structure. Further, it is said that when the ethylene content is low in a saponified product of an ethylene-vinyl acetate copolymer, the compatibility between the saponified copolymer and polyolefin is generally degraded and the processability of the resulting composition is much lowered ( see page 2, column 3 of above-mentioned Japanese Patent Publication ). In contrast to such teachings, in this invention it is made possible to maintain a permeability of such gas as oxygen and steam at a very low level and improve the processability and appearance characteristics and obtain a laminate structure excellent in the interlaminar strength, by selecting a saponified product of an ethylene-vinyl acetate copolymer having an ethylene content of 25 to 50 mole % and combining it with a polyolefin, preferably together with a carbonyl group-containing polymer which will be detailed hereinafter.

The molecular weight of the ethylene-vinyl acetate copolymer saponified product to be used in this invention is not particularly critical, as far as it is in general within the range capable of forming films. In general, the viscosity of the ethylene-vinyl acetate copolymer saponified product is measured with use of a mixed solvent of 85% by weight of phenol and 15% by weight of water.

In this invention, it is preferred that the ethylene-vinyl acetate copolymer saponified product used has an intrinsic viscosity ($\eta$), measured at 30° C. in such mixed solvent, of from 0.07 to 0.17 l/g. In the case of a saponified copolymer having an intrinsic viscosity ($\eta$) of lower than 0.07 l/g, the mechanical strength of the final molded article is insufficient, and in the case of a saponified copolymer having an intrinsic viscosity ($\eta$) exceeding 0.17 l/g, the moldability of the resulting resinous composition tends to lowered.

In this invention, selection of a polyolefin among various thermoplastic resins and formation of a blend layer by combining so selected polyolefin with an ethylene-vinyl acetate copolymer saponified product are very important for attaining a desired combination of a high permeation resistance to all of ordinary gases such as oxygen, steam, carbon dioxide gas, etc. and a high delamination strength.

Any of polyolefins which have heretofore been used for molding of films or containers and the like broadly in the art may be used as the polyolefin in this invention. As such polyolefin, there may be employed homopolymers and copolymers of olefins expressed by the following formula

wherein R is a hydrogen atom or an alkyl group having up to 4 carbon atoms.

In order to obtain a laminate structure having sufficient mechanical strength, it is important that such olefin homopolymer or copolymer should be crystalline.

As such crystalline polyolefin there may be mentioned, for instance, low density polyethylene, medium density polyethylene, high density polyethylene, isotactic polypropylene, crystalline ethylene-propylene copolymer, polybutene-1 and polypentene-1. Of course, in this invention the polyolefin to be used is not limited to olefin homopolymers and copolymers of two or more olefins, but copolymers comprising a small amount, for instance, up to 15 mole %, especially up to 5 mole %, of other ethylenically unsaturated comonomer within a range such as will not substantially damage the properties of the polyolefin, may be used. As such comonomer component, there may be exemplified vinyl chloride, vinyl acetate, acrylic acid, esters thereof, methacrylic acid and esters thereof.

In general, the molecular weight of the polyolefin is not particularly critical in this invention, as far as it is within the film-forming range. For instance, a polyolefin having an average molecular weight of from 5,000 to 400,000 [corresponding to a melt index, MI (measured according to ASTM 1238) from 0.05 to 5.0 g/10 min] is used preferably in general.

In this invention, if improvement of such properties as transparency, flexibility, and impact resistance in the laminate structure is desired, a low density or medium density polyethylene is preferably employed as the polyolefin. If improvement of stiffness, tensile strength and tear strength is desired, a high density polyethylene or an isotactic polypropyle is preferably employed.

In the blend layer of the laminate structure of this invention, in order to obtain a high gas permeation resistance and a high delamination resistance, it is important that the polyolefin (A) and the ethylene-vinyl acetate copolymer saponified product (B) are contained at a mixing weight ration A : B ranging from 98 : 2 to 2 : 98. A preferable mixing ratio of the polyolefin and the saponified copolymer (B) varies to some extent depending on not only the kinds of these resins (A) and (B) but also the kind of the resin of the layer to be laminated with the blend layer. For instance, when a polyolefin layer is laminated with the blend layer, it is generally preferred that the A : B mixing weight ratio in the blend layer is adjusted within a range of from 90 : 10 to 10 : 90, especially from 80 : 20 to 10 : 90. In case a layer of a saponified product of an ethylene-vinyl acetate copolymer is laminated with the blend layer, it is generally preferred that the mixing weight ratio A : B in the blend layer is adjusted within a range of from 90 : 10 to 20 : 80, especially from 90 : 10 to 50 : 50.

However, in accordance with a preferred embodiment of this invention, even when the mixing weight ratio of the polyolefin and the saponified copolymer in the blend layer is outside such a preferred range, if, as is detailed below, a multi-layer structure comprising a layer containing the polyolefin at a content exceeding the average polyolefin content in the blend layer and a layer containing the saponified copolymer at a content exceeding the average saponified copolymer content in the blend polymer is formed in the blend layer, it is possible to attain in the laminate structure a desired combination of an excellent permeation resistance to all of ordinary gases and a high layer peeling resistance.

In the molded laminate structure of this invention, in order to obtain a high delamination resistance sufficient to endure not only ordinary application conditions but also falling shock and to further improve appearance characterisitcs such as transparency and smoothness and mechanical properties such as impact resistance, it is preferred that a carbonyl group-containing thermoplastic polymer is incorporated into a layer of the above-mentioned blend of the polyethylene (A) and the ethylene-vinyl acetate copolymer saponified product (B).

As such carbonyl group-containing thermoplastic polymer, there may optionally be employed any of thermoplastic polymers containing in the main or side chain carbonyl groups from free carboxylic acids, carboxylic acid salts, carboxylic acid esters, carboxylic anhydrides, carboxylic acid amides, carbonic acid esters, urethane and urea. Examples of such polymer will now be described.

a. Homopolymers or copolymers of monomers expressed by the following formula (I), and copolymers of monomers expressed by the formula (I) with olefins such as ethylene and propylene or other vinyl monomers such as styrene, vinyl chloride, vinyl acetate and acrylonitrile:

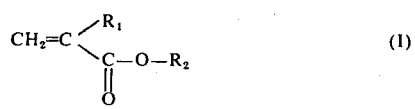

wherein $R_1$ is a hydrogen atom or a lower alkyl group having up to 4 carbon atoms, and $R_2$ is a hydrogen atom or an alkyl group having 1 to 12 carbon atoms.

Specific examples of the polymer of this type are polyacrylic acid esters, polymethacrylic acid esters, ethylene/acrylic acid ester copolymers, acrylic acid ester/acrylic acid copolymer, ethylene/acrylic acid ester/acrylic acid copolymers, ethylene/acrylic acid copolymers, styrene/methacrylic acid ester/acrylic acid copolymers, acrylic acid ester/vinyl chloride copolymers, methacrylic acid ester/vinyl chloride copolymers, styrene/methacrylic acid ester/butadiene copolymers, and methacrylic acid esters/acrylonitrile copolymers.

b. Homopolymers or copolymers of vinyl esters expressed by the following formula (II), and copolymers of monomers expressed by the formula (II) with olefins such as ethylene or other vinyl monomers:

wherein $R_3$ is a hydrogen atom or an alkyl or phenyl group.

Specific examples of the polymer of this type are polyvinyl acetate, polyvinyl propionate, ethylene/vinyl acetate copolymers, acrylic acid ester/vinyl acetate copolymers, and vinyl chloride/vinyl acetate copolymers.

c. Ionomers, that is, resins obtained by neutralizing copolymers of olefins with unsaturated carboxylic acids and optionally other vinyl monomers, with an alkali metal, an alkaline earth metal, zinc or an organic base.

Specific examples of the polymer of this type are Surlyns marketed by E. I. du Pont de Nemours & Co., U.S.A.

d. Copolymers of maleic anhydride with olefins or other vinyl monomers.

Specific examples of the polymer of this type are maleic anhydride/vinyl other copolymers, maleic anhydride/vinyl chloride copolymers, ethylene/maleic anhydride copolymers and maleic anhydride-modified polypropylenes.

e. Polyamides composed of the recurring units expressed by the formula

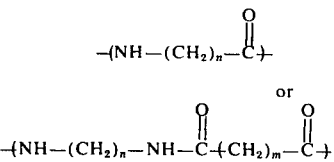

wherein $n$ is a number of from 3 to 13 and $m$ is a number of from 4 to 11.

Specific examples of the polymer of this type are poly-ω-aminocaroic acid, poly-ω-aminoheptanoic acid, poly-ω-aminocaprylic acid, poly-ω-aminopelagonic acid, poly-ω-aminodecanoic acid, poly-ω-aminoundecanoic acid, poly-ω-aminotridecanoic acid, polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydecamethylene azelamide, polydodecamethylene azelamide, and polytridecamethylene azelamide.

f. Polyesters composed of the recurring units expressed by the formula

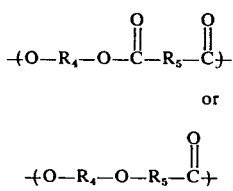

wherein $R_4$ is an alkylene group of 2 to 6 carbon atoms, and $R_5$ is an alkylene or arylene group of 2 to 24 carbon atoms.

Specific examples of the polymer of this type are polyethylene adipate, polyethylene sebacate, polyethylene terephthalate, polytetramethylene isophthalate, polyethylene terephthalate/isophthalate, and polyethylene hydroxybenzoate.

g. Polyureas composed of the recurring units expressed by the formula

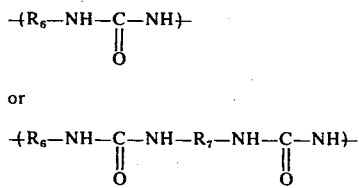

wherein $R_6$ and $R_7$ stand for an alkylene group of 1 to 13 carbon atoms.

Specific examples of the polymer of this type are polyhexamethyleneurea, polyheptamethyleneurea, polyundecamethyleneurea and polynonamethyleneurea.

h. Polyurethanes or polyureaurethanes expressed by the formula

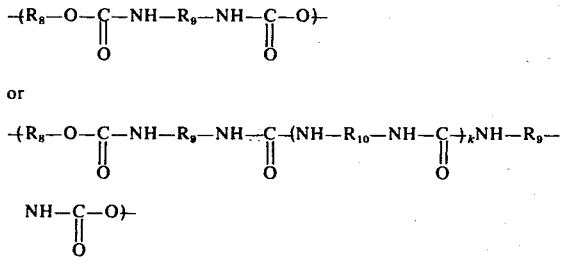

wherein $R_8$ is an alkylene group of 3 to 24 carbon atoms, or a polyether or polyester residue, $R_9$ is an alkylene or arylene group of 3 to 24 carbon atoms, $R_{10}$ is an alkylene or arylene group of 1 to 13 carbon atoms, and $k$ is 0 or 1.

Specific examples of the polymer of this type are polytetramethylenehexamethylene urethane, polyhexamethylenetetramethylene urethane, and polyurea urethanes formed by chain-extending isocyanate-terminated polyesters or polyethers with a diamine or water.

i. Polycarbonates composed of the recurring units expressed by the formula

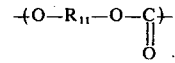

wherein $R_{11}$ is a hydrocarbon group of 8 to 15 carbon atoms.

Specific examples of the polymer of this group are poly-p-xyleneglycol biscarbonate, poly-dihydroxydiphenyl-methane carbonate, poly-dihydroxydiphenyl-ethane carbonste, poly-dihydroxyphenyl-2, 2-propane carbonate, and poly-dihydroxydiphenyl-1, 1-ethane carbonate.

It is desired that the carbonyl group-containing polymer to be used in this invention contains carbonyl groups based on functional groups of free carboxylic acids, carboxylic acid salts, carboxylic acid esters, carboxylic acid amides, carboxylic anhydrides, carbonic acid esters, urethane and urea, in an amount of 120 to 1400 milliequivalents, especially 150 to 1200 milliequivalents, per 100 g of the polymer.

Such carbonyl group-containing polymers should be substantially linear and be molten at temperatures for melt molding the resulting resinous composition, for instance, at 170° to 300°C., preferably 180° to 250°C.

Carbonyl group-containing polymers which are readily available, can be easily blended and are very effective for improving the processability of the final resinous coposition, that is, polymers which are especially suitable for attaining the objects of this invention, are polyvinyl acetste; copolymers of ethylene with a vinyl monomer containing a carboxylic acid salt group, such as vinyl acetate/ethylene copolymers, acrylic acid-/ethylene copolymers, ethyl acrylate/ethylene copolymers and ionomers; and aliphatic polyamides such as poly-ω-aminocaproic acid, poly-ω-aminoundecanoic acid, poly-ω-aminododecanoic acid, polyhexamethylene adipamide and polyhexamethylene sebacamide.

The molecular weight of the carbonyl group-containing polymer to be used is not particularly critical, as far as it is within such range that the polymer can be molded into a film or vessel.

In this invention, it is preferred that the blend layer comprises such carbonyl group-containing polymer as an auxiliary component in addition to the polyolefin (A) and the ethylene-vinyl acetate copolymer saponified product (B).

For instance, a resinous composition comprising a saponified product of an ethylene-vinyl acetate copolymer and a polyolefin is relatively sufficient in that the composition has an excellent gas permeation resistance and it is also advantageous in that it can be laminated with a layer of a polyolefin or a saponified product of an ethylene-vinyl acetate copolymer. However, it is still insufficient with respect to the impact resistance of the final laminated structure. Moreover, it is defective in that it is inferior in processability, namely melt-extrusion moldability. Still in addition, a molded article composed of a resinous composition of said polyolefin and saponified copolymer has transparency, but it is defective in that it frequently has a craped appearance and it lacks the surface smoothness and uniformity.

This defect is conspicuous especially when the ethylene content of the saponified ethylene-vinyl acetate copolymer is low and hence, the hydroxyl group concentration is high, or when the amount incorporated of the saponified copolymer is large in the resinous composition.

Further, when the blend layer of the polyolefin and saponified copolymer is used as an outer layer of the laminate structure or even if an outer layer is composed of a relatively transparent, ethylene-vinyl acetate copolymer saponified product or a relatively transparent polyolefin such as low density polyethylene, isotactic polypropylene, polybutene-1 or poly-4-methylpentene-1 and such blend layer is an intermediate or inner layer, the above defect concerning the appearance characteristics is conspicuous and a commercial value as a molded article tends to be reduced.

When such resinous composition comprising the polyolefin and saponified copolymer is incorporated with the above-mentioned carbonyl group-containing polymer in an amount of 0.5 to 15 parts by weight per 100 parts by weight of said resinous composition, the interlaminar strength and the impact resistance can be conspicuously improved. Further, the flowability of the resin composition at the melt molding is generally improved by more than 10%, and the melt molding processing can be facilitated greatly. Moreover, the surface of an article formed by melt molding such composition incorporated with the carbonyl group-containing polymer is smooth and uniform, and thus, the defect of the rough surface or craped appearance can be overcome.

As the polyolefin layer to be laminated with said blend layer, there can be employed a layer of a polyolefin such as detailed hereinabove with respect to the blend layer. A layer of an ethylene-vinyl acetate copolymer saponified product such as detailed above as regards the blend layer, namely a saponified product having an ethylene content of 25 to 50 mole % and a degree of saponification of at least 96%, can be used as the layer to be laminated with the blend layer.

In this invention, a polyolefin or an ethylene-vinyl acetate copolymer saponified product and a blend of a polyolefin, an ethylene-vinyl acetate copolymer saponified product and optionally a carbonyl group-containing polymer are subjected to the laminating operation, directly or after incorporation of so called compounding ingredients, according to known multi-layer extrusion or extrusion coating procedures.

In case the final laminate structure is used as a packaging material for food stuffs, it is preferred that such resin is directly subjected to the laminating operation without incorporation of so called compounding ingredients. However, if desired, it is possible to incorporate known additives such as ultraviolet absorbents, stabilizers, antioxidants, pigments, dyes and antistatic agents.

In the laminated structure of this invention, each layer may further comprise other polymers, for instance, other poly-α-olefins, olefin copolymers, vinyl polymers, diolefin polymers and olefin-vinyl-type copolymers, in such amounts as will not give substantially and bad influences to the gas permeation resistance, impact resistance and transparency of the resulting laminate structure, for instance, in amounts of up to 10.0 parts by weight per 100 parts by weight of the composition.

LAMINATE STRUCTURE

The laminate structure of this invention can take various multi-layer structures as far as the condition that a layer of a blend of a polyolefin, an ethylene-vinyl acetate copolymer saponified product and optionally a carbonyl group-containing polymer (hereinafter referred to merely as "blend layer") should be adjacent to a polyolefin layer or a layer of an ethylene-vinyl acetate copolymer saponified product (hereinafter referred to merely as "saponified copolymer layer") is satisfied. For instance, the laminate structure of this invention can take the following sectional arrangements.

I. Asymmetric Two-Layer Type Laminate Structure:
 I-a. blend layer/polyolefin layer
 I-b. blend layer/saponified copolymer layer
II. Symmetric Three-Layer Type Laminate Structure:
 II-a. polyolefin layer/blend layer/polyolefin layer
 II-b. blend layer/polyolefin layer/blend layer
 II-c. saponified copolymer layer/blend layer/saponified copolymer layer.
 II-d. blend layer/saponified copolymer layer/blend layer
III. Asymmetric Three/Layer Type Laminate Structure:
 III-a. polyolefin layer/blend layer/saponified copolymer layer
 III-b. two component blend layer/saponified copolymer layer/three component blend layer.
 III-c. two component blend layer/polyolefin layer/three component blend layer Of course, the laminate structure of this invention includes multi-layer structures including more than three layers in addition to the above-mentioned examples. For instance, the following structure can be adopted.

IV. Symmetric Five-Layer Type Laminate Structure:
 IV-a. polyolefin layer/blend layer/saponified copolymer layer/blend layer/polyolefin layer When such a multi-layer structure as having 5 or more layers is adopted, the gas permeation resistance can be further improved, but in ordinary cases the intended objects of this invention can be fully attained by a laminated structure having two or three layers.

In the above-mentioned laminate structure of this invention, the blend layer may be either (i) a layer of a two-component polymer blend of an ethylene-vinyl acetate copolymer saponified product and a polyolefin or (ii) a layer of a three-component polymer blend of an ehtylene-vinyl acetate copolymer saponified product, a polyolefin and a carbonyl group-containing thermoplastic polymer.

In this invention, since the blend layer comprises as one of indispensable components an ethylene-vinyl acetate copolymer saponified product, when this blend layer is laminated with a polyolefin layer, the oxygen permeability can be much reduced as compared with the case of a polyolefin layer alone and the steam permeability can be much reduced as compared with the case where this blend layer alone is employed. Further, in the laminate structure of this invention, since the blend layer comprises a polyolefin as the other indispensable component, when this blend layer is laminated with a layer of an ethylene-vinyl acetate copolymer saponified product, the steam permeability can be maintained at a much lower level as compared with the case of such saponified copolymer layer alone and the oxygen permeability can be further reduced as compared with the case where this blend layer alone is employed. Still further, in this invention, the blend layer acting as a barrier to oxygen or steam has an excellent adhisive property to the polyolefin layer or saponified copolymer layer, and therefore, use of a particular adhesive is not necessary. Moreover, the resulting laminate structure has a very high interlaminar strength sufficient to endure falling shock. In this invention, when a suitable resin layer is chosen among the above-mentioned resin layer as the inner or outer surface layer of the laminate structure, properties such as water resistance, oil resistance, moisture resistance, impact resistance, flexibility and stiffness can optionally be given to the inner or outer surface layer.

In general, this laminate structure has a thickness of at least 15 $\mu$, especially at least 70 $\mu$, and up to 6 mm, and it is useful as a molding material for preparing molded articles of a thin thickness having two-dimensional or three-dimensional surfaces, such as bottle, tube, tank, bag, other packaging containers, film, sheet, pipe and the like.

In case the laminate structure of this invention has a form of a container, it is preferred that the layer arrangement is decided in view of the kind of a material to be contained and the desired gas permeation resistance. For instance, if the material to be contained is an aqueous liquid, in view of the water resistance it is preferred that the inner layer of the container is a polyolefin layer or a blend layer. Further, when an oily material is contained in the container, in view of the oil resistance it is preferred that the inner layer of the container is a blend layer or a saponified copolymer layer. In each case, in view of the impact resistance or moisture resistance of the container per se it is preferred that the outermost layer of the vessel is a polyolefin layer or a blend layer.

In order for the laminate structure of this invention to have a similar permeation resistance to all of ordinary gases, it is preferred that a resin different from the resin of the layer adjacent to the blend layer is contained in a large amount in the blend layer. From the foregoing viewpoints, among the above-mentioned two-layer and three-layer structures, the following structures are especially preferred:

Structure (I-a), especially a structure in which the saponified copolymer content in the blend layer is 50 to 90% by weight.

Structure (I-b), especially a structure in which the polyolefin content is 50 to 90% by weight in the blend layer.

Structure (II-a), especially a structure in which the saponified copolymer content is 50 to 90% by weight in the blend layer.

Structure (II-d), especially a structure in which the saponified copolymer content is 10 to 50% by weight in the blend layer.

The thickness ratio of layers constituting the laminate structure varies depending on the use of the final product or the mixing ratio of the polyolefin and saponified copolymer in the blend layer, and the thickness ratio can be freely chosen. However, in view of the impact resistance and the like it is preferred that (i) in the case of a laminate structure composed of (a) a polyolefin layer and (b) a blend layer, the thickness ratio (a) : (b) is within a range of from 1 : 10 to 40 : 1, especially from 1 : 1 to 30 : 1; (ii) in the case of a laminate structure composed of (b) a blend layer and (c) a saponified copolymer layer the thickness ratio (b) : (c) is within a range of from 1 : 10 to 50 : 1, especially from 1 : 1 to 35 : 1; and that (iii) in the case of a laminate structure composed of (a) a polyolefin layer, (b) a blend layer and (c) a saponified copolymer layer the thickness raio (a) : (b) : (c) is within a range of from 1 : 1 : 1 to 50 : 30 : 1, especially from 1 : 1 : 1 to 30 : 20 : 1.

MULTI-LAYER MOLDED ARTICLE

In the laminate structure of this invention, the blend layer may be either a layer in which resin components are homogeneously mixed or a layer which has a structure in which each resin component is distributed in a laminar form. In a preferred embodiment of this invention, the blend layer has such a laminar structure that the polymer composition is different with respect to the thickness direction but identical with respect to the plane direction and each laminar layer is continuous with respect to the plane direction. In case the blend layer has such a structure, the gas permeation resistance can be further improved. This fact can be confirmed by various experiments.

For instance, the fact that in the blend layer of a preferred laminate structure of this invention the polymer composition is different in the thickness direction can be confirmed by sampling an optional layer from the blend layer by mechanical peeling means or the like and examining the infrared absorption spectrum of the sample.

For instance, the saponified ethylene-vinyl accetate copolymer exhibits an absorption at 3320 cm$^{-1}$ owing to the presence of the hydroxyl group, and therefore, the concentration of the saponified copolymer present in an optional sampled layer of the blend layer of the molded structure can be determined by the following method:

i. One polyolefin (A) and a saponified product of an ethylene-vinyl acetate copolymer (B) whose ethylene content and degree of saponification were known were preliminarily blended (dry-blended) at a weight ratio of A : B ranging from 97.5 : 2.5 to 30 : 70, and then, the melt blending was conducted at 220°C. in a nitrogen atmosphere for 15 minutes with use of a Banbury mixer (the rotation rate of the rotor being 45 rpm). As a result of the microcopic observation, it was confirmed that in all of the mixtures obtained under such conditions the components A and B were mixed homogeneously.

ii. Each of the so formed mixture was heated at 195°C. under a pressure of 10 Kg/cm$^2$ to 300 Kg/cm$^2$ for 20 minutes by employing a high pressure press and formed into a film having a thickness of 5 to 150 $\mu$.

iii. The infrared absorption curve of each of the so formed films was obtained under conditions of a temperature of 20° C. and a relative humidity of 40% by means of an infrared spectrophoto meter.

iv. In each infrared absorption curve thus obtained, the point at 3100 cm$^{-1}$ was connected with the point at 3640 cm$^{-1}$ by a line. Then, the values of Io and I were read from the crossing point of said line and the line vertical to the wavelength axis at 3320 cm$^{-1}$ and from the crossing point of said vertical line and the absorption curve, respectively.

v. According to the following known equation $$\frac{\log{(Io/I)}}{\mu} = KC$$

Wherein is the average thickness ($\mu$) of the film used for the infrared absorption measurement, C designates the concentration (% by weight) of the saponified ethylene-vinyl acetate copolymer, and K is a constant, the values of (log (Io/I) )/$\mu$ and C were plotted to obtain the calibration curve. The calibration curve expressed by the formula $$\frac{\log (Io/I)}{\mu} = (0.85 \times 10^{-3})C$$

was obtained with respect to the mixture system of a low density polyethylene having a density of 0.920 g/cc (determined according to ASTM D-1505) and a saponified product of an ethylene-vinyl acetate copolymer having an ethylene content of 25.4 mole % and a degree of saponification of 99.2%. The calibration curve expressed by the formula $$\frac{\log (Io/I)}{\mu} = (0.85 \times 10^{-3})C$$

was obtained with respect to the mixture system of a high density polyethylene having a density of 0.950 g/cc (determined according to ASTM D-1505) and said saponified copolymer. Still further, the calibration curve expressed by the formula $$\frac{\log (Io/I)}{\mu} = (0.42 \times 10^{-3})C$$

was obtained with respect to the mixture system of the above high density polyethylene and a saponified ethylene-vinyl acetate copolymer having an ethylene content of 49.4 mole % and a degree of saponification of 96.3%. As the carbonyl group-containing thermoplastic polymer, there were chosen Surlyn A of the Na$^+$ type having a carboxylic acid concentration of 5 mole %, Surlyn A of the Zn$^{++}$ type having a carboxylic acid concentration of 10 mole %, an ethylene-vinyl acetate copolymer having a vinyl acetate concentration of 10% by weight, an ethylene-vinyl acetate copolymer having a vinyl acetate concentration of 17% by weight, an isotactic polypropylene, an ethylene-propylene copolymer, a high density polyethylene and a low density polyethylene, and these polymers were separately molded into films in the same manner as described in (ii) above. Then, their infrared absorption spectrum curves were obtained in the same manner as described in (iii) above but in any of them there was not observed any absorption at 3320 cm$^{-1}$.

vi. A prescribed portion of the blend layer of the laminate structure was sampled by means of a knife. The sampled blend layer was divided in three layers extending in the direction vertical to the thickness and parallel to the plane direction. The so obtained divided layers were molded into films in the same manner as (ii) above. In Examples gives below, these three layers are identified as follows:

Layer (1): divided layer adjacent to an outer layer
Layer (2): central divided layer Layer (3): divided layer adjacent to an inner layer vii. The infrared absorption curve of each layer obtained in vi) above was obtained under the same conditions with use of the same apparatus as in (iii) above.

viii. With respect to each of the so obtained infrared absorption curves, the values Io and I were determined from the absorption at 3320 cm$^{-1}$ in the same manner as in (iv) above, and from these Io and I values and the average thickness ($\bar{\mu}$) of each film, the value of (log(Io/I) ) was calculated. The calculated value was put into the calibration curve equation of the corresponding mixture system described in (v) above, and the concentration of the saponified ethylene-vinyl acetate copolymer was calculated.

Further, the fact that the blend layer of a preferred laminate structure of this invention has such a laminar structure that the polymer composition is substantially identical with respect to the plane direction and each laminar layer is continuous with respect to the plane direction can be confirmed by, for instance, the measurement of the oxygen permeability.

1. With use of a multi-ply extruder such as used in Examples 2 and 38 given hereinafter, the extrusion molding was carried out under the same conditions as adopted in examples 2 and 38 by employing the same outer and inner layer materials as used in these Examples but changing the intermediate layer material as follows:

a. an ethylene-vinyl acetate copolymer saponified product having an ethylene content of 25.4 mole %, a degree of saponification of 99.2 %, an intrinsic viscosity of 0.08 l/g and a melt density of 1.07 g/cc as measured at 190° C.

b. a low density polyethylene having a density of 0.920 g/cc and a melt density of 0.76 g/cc as measured at 190°C.

c. Surlyn A of the Na$^+$ type (ionomer manufactured by Du Pont, U.S.A.) having a density of 0.942 g/cc, a melt density of 0.80 g/cc as measured at 190°C. and a carbonyl concentration of 160 milliequivalents per 100 g.

Thus, three kinds of bottles (the intermediate layer material being (a), (b) or (c) above) were formed.

2. With respect to each of the so obtained bottles, the oxygen permeability was determined according to the measurement method detailed below. As a result it was found that the oxygen permeability $Q_{EV}$ of the bottle (a) (intermediate layer material being the saponified copolymer) was 3.7 cc/m$^2$.day.atm, the oxygen permeability $Q_{PE}$ of the bottle (b) (intermediate layer being the low density polyethylene) was 1270 cc/m$^2$ day atm and the oxygen permeability $Q_{Su}$ of the bottle (c) (intermediate layer material being the Surlyn A) was 1160 cc/m$^2$.day.atm.

3. FIGS. 1–4 are perspective views of block modles illustrating a typical instance of the distribution state of each resin component in the blend layer of the laminate structure.

Figure 2:
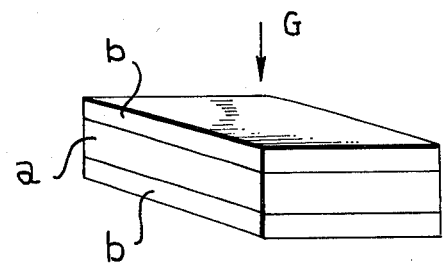
Figure 3:
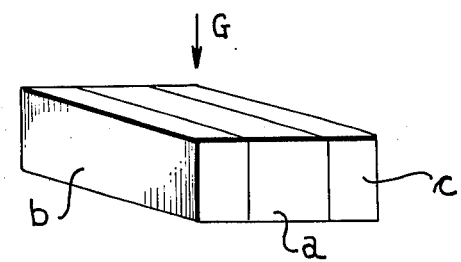
Figure 4:
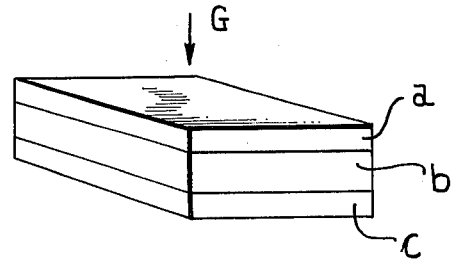

In FIGS. 1 and 2 there is shown a two-component system of said saponified copolymer and low density polyethylene such as obtained in Example 2 and FIGS. 3 and 4 show a three-component system of said saponified product, Surlyn A and low density polyethylene such as obtained in Example 38.

In FIGS. 1 and 3, the saponified copolymer and the low density polyethylene, or both resins and the Surlyn A are aligned in parallel to the thickness direction, and the polymer composition is different with respect to one plane direction (X direction) but identical with respect to the other plane direction (Y direction). In contrast, in FIGS. 2 and 4, each of the above resins is aligned vertically to the thickness direction, and the polymer composition is identical with respect to plane directions (X and Y directions) but different with respect to the thickness direction. Namely, in FIGS. 2 and 4, a model of a so-called laminate is shown. In the drawing, each symbol has the following meaning:

a. ethylene-vinyl acetate copolymer saponified product
b. low density polyethylene
c. Surlyn A (ionomer manufactured by Du Pont, U.S.A.)

The gas permeability of each of the models of FIGS. 1, 2, 3 and 4 is expressed by the following formula:

I. $Q = V_{EV} \times Q_{EV} + V_{PE} \times Q_{PE}$ (1)
in which $V_{EV} + V_{PE} = 1$.
II. $1/Q = V_{EV}/Q_{EV} + V_{PE}/Q_{PE}$ (2)
in which $V_{EV} + V_{PE} = 1$.
III. $Q = V_{EV} \times Q_{EV} + V_{su} \times Q_{su} + V_{PE} \times Q_{PE}$ (3)
in which $V_{EV} + V_{su} + V_{PE} = 1$.
IV. $1/Q = V_{EV}/Q_{EV} + V_{su}/Q_{su} + V_{PE}/Q_{PE}$ (4)
in which $V_{VE} + V_{su} + V_{PE} = 1$.

In each of the above formulas (1) to (4) symbols have the following meanings:

$Q$ : the gas permeability of each model blend layer
$Q_{EV}$ : the gas permeability of the saponified copolymer
$Q_{su}$ : the gas permeability of the Surlyn A
$Q_{PE}$ : the gas permeability of the low density polyethylene (the gas permeability was determined with respect to the same later thickness
$V_{EV}$ : the volume ratio of the saponified copolymer in the blend layer
$V_{su}$ : the volume ratio of the Surlyn A in the blend layer $V_{PE}$ : the volume ratio of the low density polyethylene in the blend layer 4. The permeability of oxygen or the like is known with with respect to each model shown in FIGS. 1–4 if the thickness is constant, and such known value is shown below each model. In the case of the two-component blend same as shown in Example 2, the volume ratios of the saponified copolymer and low density polyethylene ($V_{EV}$ and $V_{PE}$) are calculated from the mixing ratio 50 : 50 of both the resins shown in Example 2 and the densities of both the resins indicated in (1) above, and the oxygen permeability of each of the models of FIGS. 1 and 2 is calculated from the oxygen permeability Q of each of bottles (a) and (b) mentioned in (2) above. As a result, it is found that in the case of model (I) the value Q of 720 cc/mm². day . atm is obtained from the formula (1) and in the case of model of FIG. 2 the value Q of 8.5 cc/m².day.atm is obtained from the formula (2). In the case of of the three-component blend same as shown in Example 38, the volume ratio of each resin is calculated from the density shown in (1) above (based on the mixing ratio shown in Example 38), and the oxygen permeability Q of each of the models of FIGS. 3 and 4 are calculated from the oxygen permeability of each of bottles (a), (b) and (c) mentioned in (2) above. As a result it is found that in the case of model of FIG. 3 the value Q of 610 cc/m².day.atm is obtained from the formula (3) and in the case of model of FIG. 4 the value Q of 7.2 cc/m².day.atm.

5. As is seen from data shown in Table 2 of Example 2, the oxygen permeability of a bottle (bottle A) obtained by employing a metering screw of a low mixing effect as an intermediate layer extruder and conducting the extrusion under such conditions the difference of the average flow rate between the two resins is at least 1 cm/sec is 26 cc/m².day.atm. This value is much closer to the value of the so called laminate model of FIG. 2 (8.5 cc/m².day.atm) than to the value of model (I) (720 cc/m².day.atm).

6. As is seen from data shown in Table 48 of Example 38, a bottle (bottle F) obtained by employing a metering screw of a low mixing effect as an intermediate layer extruder and conducting the extrusion under such conditions that the average flow rate of the saponified copolymer is different by at least 1 cm/sec from the average flow rate of other two resins (Surlyn A and low density polyethylene) has an oxygen permeability of 12.4 cc/m².day.atm, which is much closer to the value of the so called laminate model of FIG. 4 (7.2 cc/m².day.atm) than to the value of model of FIG. 3 (610 cc/m².day.atm).

7. As is seen from results shown in (5) and (6) above, the blend layer of the laminate structure of this invention has such a laminar structure that the composition of the saponified copolymer, the low density polyethylene and optionally the Surlyn A is different with respect to the thickness direction but is identical with respect to the plane direction.

In a preferred embodiment of the laminate structure of this invention, the blend layer has such a laminar structure that when the blend layer is divided into three layers in the direction of the thickness, namely a first surface layer, an intermediate layer and a second surface layer, (a) at least one layer contains predominantly the ethylene-vinyl acetate copolymer saponified product, namely contains the saponified copolymer in an amount expressed by the following formual
$M_1 = m_1 X$ wherein X stands for the average content (% by weight) of the ethylene-vinyl acetate copolymer saponified product in the blend layer, $m_1$ is a number of at least 1.05, especially from 1.2 to 4, and $M_1$ is the content (% by weight) of said saponified product in said specific divider layer, and at least one layer of the remaining two divided layers contains predominantly the polyolefin and optionally the carbonyl group-containing thermoplastic polymer, namely contains said saponified product in an amount expressed by the following formula
$M_2 = m_2 X$ wherein X is as defined above, $m_2$ is a number of from 0 to 0.95, especially from 0 to 0.90, and $M_2$ is the content (% by weight) of said saponified product in said specific layer.

In order to attain such laminar structure in the blend layer of the laminate structure, it is preferred that the extrusion molding is conducted under specific conditions detailed hereinbelow and the polyolefin (A) and the ethylene-vinyl acetate copolymer saponified product (B) are mixed at a mixing weight ratio A : B ranging from 98 : 2 to 2 : 98, especially from 95 : 5 to 20 : 80.

In the laminate structure of this invention, in case the blend layer is a three-component layer of the polyolefin, the saponified copolymer and the carbonyl group-containing thermoplastic polymer, it is desired that when the blend layer is divided into three layers in the thickness direction, the divided layer adjacent to the polyolefin layer (the first surface layer and/or the second surface layer) is a layer containing predominantly the polyolefin and carbonyl group-containing thermoplastic copolymer, namely a layer containing the saponified copolymer in an amount expressed by the following formula $$M_1 = m_1 X$$

wherein $M_1$, $m_1$ and $X$ are as defined above.

This layer containing the carbonyl group-containing thermoplastic polymer predominantly (carbonyl group-predominant layer) is distributed in the blend layer so that the blend layer as a whole is bounded to the polyolefin layer through this carbonyl group-predominant layer). For instance, in case the laminate structure is of the above-mentioned asymmetric two-layer type I, symmetric three-layer type (II-b) or asymmetric three-layer type III, the surface layer of the blend layer adjacent to the polyolefin layer alone can be such carbonyl group-predominant layer, or both the surface layers of the blend layer can be such carbonyl group-predominant layers. Further, in case the laminate structure is of the above-mentioned symmetric three-layer type (II-1), the blend layer is so constructed that both the surface layers of the blend layers are carbonyl group-predominant layers.

In this invention, when the blend layer contains the carbonyl group-containing thermoplastic polymer, the carbonyl group-containing thermoplastic polymer tends to be distributed in the blend layer together with the polyolefin. Accordingly, the carbonyl group-containing thermoplastic polymer is predominantly contained together with the polyolefin in the surface layer of the blend layer adjacent to the polyolefin layer. According to this preferred embodiment of this invention, since the carbonyl group-containing thermoplastic polymer is predominantly contained in the surface layer of the blend layer adjacent to the polyolefin layer and hence, the ethylene-vinyl acetate copolymer saponified product is predominantly contained in another layer, it is made a possible to maintain the gas permeation resistance of the laminate structure at a very low level and heighten the interlaminar strength between the polyolefin layer and the blend layer to a level corresponding to the fracture strength of the resin material per se.

As is illustrated in Examples given hereinafter, in the laminate structure of this invention, since the blend layer has such specific laminar multi-layer structure, it exhibits a much higher interlaminar strength and a much lower oxygen permeability than a laminate structure in which the blend layer is homogeneous throughout its structure. In the case of the laminate structure in which the blend layer is homogeneous, if it is intended to maintain the interlaminar strength between the blend layer and polyolefin layer at a practically applicable level, it is necessary to incorporate the polyolefin or carbonyl group-containing polymer in a considerable amount, and in this case, such an undesired tendency that the oxygen permeability increases with increase of the amount of the polyolefin or carbonyl group-containing polymer incorporated. In contrast, when the above-mentioned laminar multi-layer structure is formed in the blend layer of the laminate structure, even if the amount incorporated of the polyolefin or carbonyl group-containing polymer, the interlaminar strength between the blend layer and polyolefin layer can be maintained at a high level. Further, even if the amount incorporated of the polyolefin or carbonyl group-containing polymer is large, the oxygen permeability can be maintained at a low level.

Furthermore, in the laminate structure of this preferred embodiment of this invention, since the blend layer is bonded tightly to the polyolefin directly without forming a particular adhesive layer, the lamination operation can be performed very easily.

MOLDING PROCESS

In general, the novel laminate structure of this invention is prepared by employing extruders, the number of which corresponds to the number of resin layers, and extrusion-molding resins molten in the extruders simultaneously in the form of lapped laminar flows. For instance, in the case of the blend layer, a polyolefin, an ethylene-vinyl acetate copolymer and optionally a carbonyl group-containing polymer are dry-blended directly or after mixing by a pelletizer, a heating roll or a Banbury mixer or melt mixing by a kneader, and then the blend is fed to an extruder, molten therein and extruded therefrom. The polyolefin or saponified copolymer is molten in an extruder different from the extruder for the blend layer and is then extruded therefrom. Accordingly, laminate structures of the above-mentioned asymmetric two-layer type I and symmetric three-layer type II can be formed by employing only two extruders. Further, even laminate structures of the above-mentioned asymmetric three-layer type III and symmetric five-layer type IV can be formed by employing only three extruders.

Any molding conditions can be adopted in this invention, as far as a resin or resin composition can be molten and extruded uniformly. In general, it is preferred that the molding is conducted at a temperature of 170° to 250°C. and a pressure of 10 to 300 Kg/cm². In general, extrusion conditions for forming a blend layer may the same as extrusion conditions for forming a polyolefin layer or ethylene-vinyl acetate copolymer saponified product layer. However, if desired, different conditions can be adopted and conditions may be optionally varied with the above-mentioned range. The flow of the resin extruded from the extruder for the blend layer is combined with the flow of the resin extruded from the extruder for the polyolefin or saponified copolymer layer in a die head, and the combined resin flow is extruded through die orifice and molded to have a structure such as (I-a) to (IV-a) mentioned above.

As the die head, there can be used, for instance, a T-die head (or slit die head) employed in an ordinary film-forming method, a ring die heat employed in an inflation film-forming method, a cross head employed in a blow molding method, and a spider head. It is of course important that these die heads are so arranged that each of combined resin flows is passed through the die passage in the form of a laminar flow, namely substantial mingling of the resins is not caused to occur.

The molding of the laminate structure can be performed by known molding procedures, if only the above point is taken into consideration. Thus, any of known molding methods can be adopted in this invention and any of customary means can be optionally chosen. For instance, instead of combining the blend layer flow and the polyolefin or saponified copolymer layer flow in the die head and extruding them simultaneously, it is possible to extrude these resin flows separately in a parallel relationship and lap them at the extrusion point or at a point spaced from the extrusion point while the resin layers are still viscous.

The laminate structure of this invention can be prepared by a so called extrusion coating method as well as the above-mentioned co-extrusion method. For instance, the blend layer of the laminate structure is prepared in advance in the form of a film, and a polyolefin or ethylene-vinyl acetate copolymer saponified product is molten and extrusion-coated on one or both surfaces of the film of the blend layer. Further, a polyolefin or saponified copolymer layer is prepared in advance in the form of a film, and a blend layer is melt-extruded and coated on one or both the surfaces of this film.

In accordance with a preferred embodiment of this invention, a blend of a polyolefin, an ethylene-vinyl acetate copolymer saponified product and optionally a carbonyl group-containing polymer is extrusion-molded under such conditions that the difference ($\bar{V}_1 - \bar{V}_2$) between the average flow rate ($\bar{V}_1$) of the melt of the poly-olefin and optionally the carbonyl group-cotaining polymer and the average flow rate ($\bar{V}_2$) of the melt of the saponified copolymer is at least 1 cm/sec.

According to this preferable method of this invention, by conducting the molding so that the above conditions will be satisfied, it is possible to form a multi-layer laminar structure including a layer (a) in which the saponified ethylene-vinyl acetate copolymer is predominantly contained and a layer (b) in which the polyolefin is predominantly contained, in a flow of the melt of the blend coming out of the die head of the multi-ply extruder.

In case the extrusion molding temperature is lower than 170°C., since the molding temperature approximates the melting point of the saponified ethylene-vinyl acetate copolymer, in the resulting blend layer of the laminate structure it is impossible to attain a multi-layer laminar structure in which layers are continuous with respect to the plane direction. Further, in case the extrusion molding temperature is higher than 300°C., the molten resin flows are intermingled too intimately and it is difficult to obtain a molded product having the specific multi-layer structure specified in this invention, and degradation is caused by oxidation or thermal decomposition of the resins, especially the saponified ethylene-vinyl acetate copolymer.

At an extrusion molding pressure lower than 3 Kg/cm², it is difficult to attain the average flow rate difference of at least 1 cm/sec between the average flow rate ($\bar{V}_1$) of the melt of the polyolefin and optionally the carbonyl group-containing polymer and the average flow rate ($\bar{V}_2$) of the saponified copolymer melt. In case the pressure for extrusion of the blend is higher than 3 Kg/cm² and the pressure for extrusion of the polyolefin or saponified copolymer is higher than 5 Kg/cm², the press molding effect is caused at the point of junction of two resin flows in the multi-ply molding die, and the interlaminar strength can be further heightened.

There is no upper limit of the pressure for extrusion of each layer. In other words, the extrusion of each layer is conducted under such pressure that no excessive load is imposed on the extruder, and the extrusion pressure is chosen appropriately depending on the capacity and dimension (such as the screw diameter) of the extruder and other factors. When either of the blend and the polyolefin or saponified copolymer is extruded under an excessively high pressure, the other resin is pressed by said excessively high extrusion pressure and it is likely prevented from flowing toward the end portion of the die. Accordingly, it is necessary to keep a good balance between the pressure for extrusion of the blend layer and and the pressure for extrusion of the polyolefin or saponified copolymer layer.

In this embodiment for obtaining a molded article having a multi-layer laminar structure, it is important that the extrusion conditions are so selected that the value expressed by the following formula $$|\bar{v}_2 - \bar{v}_1| = \Delta\bar{v}_{1-2}$$

is at least 1 cm/sec, preferably 1 to 10 cm/sec. In the instant specification and claims, the average flow rate ($v$) is defined to be the value expressed by the following formula $$\bar{v} = (Q/3.6d)/S$$

wherein $Q$ stands for the amount (Kg/hr) of the resin melt extruded from the die of the extruder at prescribed temperature and pressure, $d$ designates the density (g/cc) of the resin melt and $S$ represents the crossectional area (cm²) of the die passage.

The density of the resin melt can be determined by calculating the amount extruded $\eta$ (cc) at prescribed pressure (e.g., 10 Kg/cm²) and temperature by means of, for instance, a viscometer of the constant pressure extrusion type accordint to the following equation $$\eta = HA - \pi r^2 l$$

wherein $H$ is the length (cm) of the lowering of the plunger, $A$ is the cross-sectional area (cm²) of the barrel, $r$ is the orifice radius (cm) and $l$ is the orifice length (cm), measuring the weight W (g) of $\eta$ cc of the extrudate, and conducting the calculation according to the following formula $$d = W/\eta \text{ (g/cc)}.$$

In this invention, conditions for adjusting the $\Delta\bar{v}_{1-2}$ value to at least 1 cm/sec are attained, for instance by the following procedures:

1. With the use of a melt extruder of the same structure and capacity for extrusion of the blend, the degree of dependency of the average flow rate ($\bar{v}$) on temperature and pressure if determined with respect to each of the starting polyolefin optionally with the carbonyl group-containing polymer and the starting saponified copolymer, respectively, and the temperature and pressure conditions are decided so that the difference ($\Delta\bar{v}_{1-2}$) between the average flow rate ($\bar{v}_1$) of the polyolefin melt and the average flow rate ($\bar{v}_2$) of the saponified copolymer melt will be at least 1 cm/sec.

2. The structure or dimention of the extruder is changed or modified so that under prescribed temperature and pressure conditions the value $\Delta\bar{v}_{1-2}$ will be at least 1 cm/sec. For instance, since the crossectional area of a passage for the resin melt in the die of the extruder gives a great influence to the flow rate of the resin melt, the condition of the value $\Delta\bar{v}_{1-2}$ being at least 1 cm/sec is attainable by adjusting the radius of the above passage within a suitable range.

3. It is possible to satisfy the condition of the $\Delta\bar{v}_{1-2}$ value being at least 1 cm/sec by combining the above procedures (1) and (2) appropriately.

In conducting the molding method of this invention, if under such conditions as will give the $\Delta\bar{v}_{1-2}$ value of less than 1 cm/sec, it is difficult to obtain a blend layer having a multi-layer laminar structure specified in this invention. On the other hand, when the $\Delta\bar{v}_{1-2}$ value is too great, a good balance is not obtained between the flows of the molten polyolefin and of the molten saponified copolymer and hence, the molding tends to be difficult in some cases. In view of the foregoing, it is desired to select such conditions as will give the $\Delta\bar{v}_{1-2}$ value ranging from 1 to 10 cm/sec.

As far as the above condition is satisfied, any of known ω-extruders may be optionally used in this invention. As such co-extruder, there can be mentioned, for instance, a combination of a plurality of melt-extruders for melting the blend and the polyolefin or saponified copolymer independently and a multi-ply molding die having a plurality of passages connected to extrusion zones of the above extruders, respectively (inclusive of a die head mounted on the end portion of the die to combine and extrude the resin melt flows). In this case, it is important that care should be taken so that the resin melt formed in the cylinder zone of the extruder is allowed to move through passages of the die and die head in the form of a laminar flow. In other words, it is important that substantial mingling of molten resin flows is not caused to occur. Accordingly, it is preferred to employ as the screw a full-flighted screw such as a metering screw or nylon screw, but in the case of an ordinary screw generally called a mixing screw, such as a screw of the dulmage type, if it has five or less threads in the mixing zone, it is possible to obtain a blend layer having the specific multi-layer structure specified in this invention by suitably choosing the extrusion conditions of such screw, for instance, the diameter R of the screw of the radius R of the die passage. In order to increase the effect of kneading or mixing resins, or to prevent incorporation of foreign substances into a molded article, such members as a breaker plate and a screen are mounted at the die portion of the extruder in some cases in the art of the extrusion molding. In this invention, however, provision of such members on the die portion is not preferred because it prevents the molten resins from flowing in the laminar form. But, if desired, it is permissible to use a breaker plate having less than 300 holes, or less than 5 screens of 120 mesh, and in such case, if the provision place of such breaker plate or screens, the radius R of the die passage, or other extrusion condition is suitably adjusted, it is possible to obtain a blend layer having a multi-layer luminar structure specified in this invention. Furthermore, in case the $\Delta \bar{v}_{1-2}$ value is within the above-mentioned range but relatively small, the employing an extruder having a passage of a relatively great length, it is made possible to manifest the above-mentioned specific layer structure more prominently and conspicuously in the blend layer of resulting molded laminate structure.

The preliminary mixing of a polyolefin, an ethylene-vinyl acetate copolymer saponified product and optionally a carbonyl group-containing thermoplastic polymer may be carried out according to an optional method known per se, and the method for the primary mixing is not particularly critical in this invention. That is, it is sufficient to mix the polyolefin, the saponified copolymer and the carbonyl group-containing polymer in the powdery or granular state at room temperature merely by means of a mixer or the like prior to the melt molding, and any operation of mixing them in the molten state is not especially required. However, it is possible to employ a mixture which has once been molten and blended, such as flashes or fins formed during the molding operation.

The operational procedures for molding the laminate structure of this invention into films, sheets, containers, tubes, pipes and the like are well known in the art except for the above-mentioned points. Therefor, any special description is not given to these known procedures in the instant specification. These procedures for the molding operation are detailed in, for instance, the following literature references:

Keiji Oshima and Shoji Seto; "Methods of Molding and Processing Synthetic Resins" High Polymer Publishing Co., Inc., Kyoto (1956); and Keiji Sawada; "Extrusion Molding of Plastics and Its Application" Seibundo Shinkosha, Tokyo (1966).

The novel laminate structure of this invention can also be prepared by employing a die having die orifices for respective resin flows which are disposed in a parallel relationship (such as parallel alignment and concentric circular arrangement) and combining them at the extrusion point or at a point spaced from the extrusion point while each resin flow is still viscous, instead of combining the blend and the polyolefin or saponified copolymer in the die head and extruding them simultaneously.

It is also possible to prepare a laminate structure of this invention according to a so-called extrusion coating method. More specifically, the laminate structure of this invention can be prepared by forming in advance a substrate such as film from one of the blend and the polyolefin or saponified copolymer and coating one or both surfaces of the substrate with the other resin by the melt extrusion procedures.

In order to impart pressure resistance and other properties to the laminate structure of this invention, it is possible to combine it with other film, sheet or folio according to a so called dry-laminate technique.

USES

The molded laminate structure of this invention can be clearly distinguished from a blend of a polyolefin and an ethylene-vinyl acetate copolymer saponified product (see Japanese Patent Publication No. 1032/67) and laminate structure of a polyolefin and an ethylene-vinyl acetate copolymer saponified product. In the structure formed by laminating a polyolefin with an ethylene-vinyl acetate copolymer saponified product, since there is no bondability between the two resins, it is necessary to employ a particular adhesive for bonding them. Although such laminate structure is excellent in the gas permeation resistance, it is inferior with respect to the interlaminar strength, heat resistance, water resistance, hot water resistance and impact strength and further, this laminate structure is defective in that the preparation steps are complicated. In a molded structure composed of a homogeneous blend of a polyolefin and an ethylene-vinyl acetate copolymer, each of the permeation resistance to oxygen and carbon dioxide gas and the steam permeation reistance is almost the arithmetic mean of the value of the polyolefin alone and that of the saponified copolymer alone.

In contrast, in the laminate structure of this invention, by combining a layer of a blend of a polyolefin and an ethylene-vinyl acetate copolymer saponified product with a layer of an ethylene-vinyl acetate copolymer saponified product having a low permeability to oxygen, carbon dioxide gas and the like or a polyolefin layer having a low steam permeability appropriately depending on the intended use, it is made possible to improve the defect of the saponified copolymer i.e., the high steam permeability and the defect of the polyolefin layer, i.e., the high permeability to oxygen, carbon dioxide gas and the like, while retaining preferred characteristics of each layer as they are.

Furthermore, if a carbonyl group-containing polymer is incorporated into the blend layer according to one of preferred embodiments of this invention, mechanical properties such as interlaminar strength and impact strength and surface characteristics such as transparency and surface smoothness can be conspicuously improved.

In the laminate structure having a blend layer of a multi-layer laminar structure, a blend layer containing a polyolefin, an ethylene-vinyl acetate copolymer saponified product and optionally a carbonyl group-containing polymer is laminated with a layer of a polyolefin or ethylene-vinyl acetate copolymer saponified product, and said blend layer comprises a layer in which the polyolefin optionally with the carbonyl group-containing polymer is predominantly contained and a layer in which the saponified copolymer is predominantly contained. By reason of the above specific structure, in the laminate structure of this invention, the interlaminar strength can be heightened to a level comparable to the fracture strength of the laminate material while retaining substantially an excellent steam permeation resistance of the polyolefin layer and an excellent oxygen permeation resistance. Moreover, the laminate structure of this invention is excellent in not only appearance characteristics such as surface smoothness and transparency but also mechanical properties such as impact resistance. By reason of such excellent properties, the the laminate structure of this invention is very valuable for preserving without degradation liquid, pasty and gel-like foodstuffs such as condiments, e.g., soy, sauce, vinegar, unrefined soy or sake, dressing, mayonnaise, edible oil, soy paste, lard, catchup, etc., alcoholic drinks e.g., sake, pre-cooked rice products and noodles, and other foodstuffs, e.g., soy curd, jam, butter, margarine, etc. Further, the laminate structure of this invention is useful as a container for preserving liquid medicines, agricultural chemicals, cosmetics and detergents. It is also useful as a vessel for preserving aliphatic or aromatic organic solvents or higher fatty acids while prevention the volume decrease of the content.

Still in addition, when the laminate structure is subjected to the incineration treatment in the form of a used container or vessel, the amount of heat generated by combustion is much smaller than in the case of a used container or vessel of an ordinary polyolefin, and it does not yield a toxic gas at the incineration treatment. Accordingly, the laminate structure of this invention is valuable as a container or vessel causing no environmental pollution.

This invention will now be illustrated by reference to Examples.

In each Examples the oxygen gas permeability $QO_2$, water loss $Lw$, falling strength $f_{10}$ and average interlaminar peel strength $Sp$ were determined according to the following methods.

1. Oxygen Gas Permeability, $QO_2$:

1-i. Bottles:

Nitrogen gas was introduced into an evacuated sample bottle to be tested, and an opening of the bottle was sealed with a rubber plug. Contacting surface portions of the opening and rubber plug were coated with an epoxy adhesive, and the bottle was kept for a prescribed period in a thermostatically controlled tank maintained at a temperature of 37°C. and a relative humidity of 15%. Then, the concentration of oxygen, which had permeated into the bottle was determined by the gas chromatography and the oxygen gas permeability $QO_2$ was calculated according to the following equation. Each value given in Examples is a mean value obtained by conducting this test with respect to the samples.

$$QO_2 = \frac{m \times \frac{Ct}{100}}{t \times Op \times A} (cc/m^2 \cdot day \cdot atm)$$

in which $m$ is an amount (ml) of nitrogen gas filled in the bottle, $t$ is a period (day) during which the bottle was kept in the thermostatically controlled tank, $Ct$ is a concentration (% by volume) when $t$ days have passed, $A$ is an effective surface area ($m^2$) of the bottle, and $Op$ is a partial pressure (atm) of oxygen (=0.209).

1-ii. Films or Sheets:

A gas permeation tester was used for the determination. A sample was fixed to two chambers, and one chamber was evacuated to a pressure below $10^{-2}$ mmHg (low pressure side) was replaced by oxygen gas of 1 atmosphere. The pressure increase on the low pressure side was read by a recorder to know the change in the pressure with the lapse of time. Thus, the oxygen gas permeation $QO_2$ was determined. The measurement was conducted at a temperature of 37°C. and the relative humidity on the high pressure side was 15% (75% in some cases). Each value is a mean value obtained from the results of the test made on three samples.

2. Water Loss, $Lw$:

2-i. Bottles:

A certain amount of distilled water was filled in a sample bottle, and an opening of the bottle was sealed with a hot melt adhesive coated on an aluminum foil. The bonded areas of the opening and aluminum foil were covered with an epoxy adhesive.

2-ii. Films or Sheets:

A sample was formed into a bag having a length of 170 mm and a width of 115 mm by means of a heat sealer, and about 200 g of distilled water was filled in the bag. Then, an opening of the bag was heat-sealed.

In each of (2-i) and (2-ii), the sample was kept for 21 days in a thermostat tank maintained at a temperature of 50°C. and a relative humidity of 10%. The weight of the sample was measured, and the water loss $Lw$ was calculated according to the following equation. Each value is a mean value obtained from the results of the test made on three samples.

$$Lw = 100 \times \frac{W_0 - W_{21}}{W_0} (\% \text{ by weight})$$

in which $W_0$ is the weight (g) of water at the start of the test, and $W_{21}$ is the weight (g) of water after standing at a temperature of 50°C. and a relative humidity of 10% for 21 days.

3. Falling Strength, $f_{10}$:

With respect to one kind, 10 samples bottles were chosen, and a certain amount of saline water was filled into each bottle and sealed with a cap. The, the bottles were allowed to stand still for 2 whole days in an atmosphere maintained at $-2$°C. and they were let to fall on concrete from a height of 120 cm at 20°C. so that the bottom face of the bottle hit on the concrete surface. This falling test was repeated 10 times if the bottle was not broken. The number of the bottles which were not broken even when the falling test had been repeated 10 times was counted and the falling strength $f_{10}$ was calculated according to the following formule.

$$f_{10} = \frac{N - n_{10}}{N} \times 100 \, (\%)$$

in which N is the number of the bottles tested (10) and $n_{10}$ is the number of bottles which were not broken even when the falling test was repeated 10 times.

4. Average Interlaminar Peel Strength, Sp:

A prescribed portion having a width of 2.0 cm was cut from a sample, and a part of the bonded interfacial area was peeled by a knife. Then, the sample piece was allowed to stand still for 7 days in an atmosphere maintained at a temperature of 25°C. and a relative humidity of 60%.

Then, the remaining part of the bonded area was peeled at a pulling rate of 100 mm/min by means of a tensile tester and the bonding strength was read. The measurement was conducted under conditions of a temperature of 25°C. and a relative humidity of 60%. Each value is a mean value obtained from the results of the test made on 10 samples. In the case of a sample having a three-layer structure, the value is a mean value of the bonding strength between the outer and intermediate layer and the bonding strength between the intermediate and inner layers. The term "not peeled" given in Examples is used to indicate that at the preliminary peeling of a sample with a knife it was impossible to peel the bonded area or material fructure was caused to occur in either of layers of the sample during the tensile test.

5. Apperance, App:

Two samples to be compared were presented before a panel of 21 men, and their appearance were visually evaluated. Namely, a sample that seemed to have ledd of appearance defects such as surface roughness, i.e., seemed to have a better appearance, was selected by the panel. One point was given to a sample when one man of the panel selected said sample as having a better appearance, and the appearance App (points) was evaluated based on the total points given by the panel. When a response was that there was no difference between the two samples, 0.5 point was given to each sample. As the preliminary test, two bottles identical with respect to material resins, material resin mixing ratio, layer structure, thickness, configuration, molding conditions and extruder used in the molding was compared by the same panel of 21 men. At this test, 12 points were given to one sample and 9 points were given to the other sample. Accordingly, if the difference of the points between two samples was 3 points or less, it was deemed that there was no difference of the appearance between the two samples, and when the point difference was 3.5 points or more, it was deemed that there was a difference of the appearance between the two samples.

EXAMPLE 1

A low density polyethylene having a density of 0.920 g/cc (as measured according to ASTM D-1505), a melt density of 0.764 g/cc as measured at 190°C. and a melt index of 0.3 g/10 min (as measured according to ASTM D-1238) was mixed with an ethylene-vinyl acetate copolymer saponified product having an ethylene content of 25.4 mole %, a degree of saponification of 99.2%, an intrinsic viscosity of 0.08 l/g and a melt density of 1.07 g/cc as measured at 190°C., at a mixing weight ratio indicated in Table 1 given below, and the mixture was blended at room temperature for 3 minutes by means of a Henschel mixer. The so obtained dry blend was kneaded and formed into pellets by means of a pelletizer having a dulmage screw of a diameter of 40 mm and an effective length of 1120 mm (having 8 screw flights at a mixing zone disposed in the top end portion) at a screw rotation rate of 47 rpm and a die temperature of 220°C. The so formed pelletized blend and the above-mentioned low density polyethylene were co-extruded by means of an intermediate layer extruder for the pelletized blend having a dulmage screw having a diameter of 40 mm, an effective length of 800 mm and a mixing zone of 6 screw filights disposed in the top end portion, an outer- and inner-layer extruder for the low density polyethylene installed with a metering screw of a diameter of 65 mm and an effective length of 1430 mm and provided with an adaptor having a two-branched melt channel, and a three-ply die maintained at 190°C. For comparison, the above co-extrusion was conducted in the same manner by employing instread of the above blend the above-mentioned low density polyethylene or saponified copolymer.

The so obtained co-extrudate was molded into an oval bottle having a symmetric three-layer laminate structure having an intermediate layer of said blend and outer and inner layers of said low density polyethylene, according to a known blow molding method. In each of the so obtained bottles, the thickness ratio of outer layer:intermediate layer:inner layer was 4.5:1:4.5 and the bottles had an average thickness of about 600 $\mu$ and an inner volume of about 280 cc.

With respect to each of the so obtained bottles, the oxygen gas permeability $QO_2$ and the average interlaminar peel strength Sp were determined according to the methods described hereinabove to obtain results shown in Table 1. The mixing weight ratio of the low density polyethylene (PO) and the ethylene-vinyl acetate copolymer saponified product (Ev-1) constituting the blend layer (intermediate layer) and results of the determination of $QO_2$ and Sp are shown in Table 1. From the results shown in Table 1, it is seen that effects on the oxygen gas permeability and average interlaminar strength could be obtained when the mixing weight ratio of PO/Ev-1 in the intermediate blend layer was within a range of from 90/10 to 10/90.

Table 1

| PO/Ev-1 | $Q_{O_2}$[cc/m.day.atm] | Sp[g/2cm] |
|---|---|---|
| 100/0 | 1090 | not peeled |
| 98/2 | 985 | not peeled |
| 90/10 | 670 | not peeled |
| 80/20 | 163 | 810 |
| 50/50 | 30 | 360 |
| 20/80 | 8 | 150 |
| 10/90 | 5 | 80 |
| 2/98 | 3 | 0 |
| 0/100 | 2 | 0 |

EXAMPLE 2

A low density polyethylene having the same properties as that used in Example 1 was extruded with use of an intermediate layer extruder of a three-layer vessel extrusion molding machine, which comprised an intermediate layer extruder having a metering screw of a diameter of 40 mm and an effective length of 600 mm, an outer- and inner-layer extruder installed with a metering screw of a diameter of 65 mm and effective length of 1430 mm and provided with an adaptor having a two-branched melt channel, and a three-ply die having a sectional area of an intermediate layer passage of 0.44 cm² at the junction point of the three layers. The extrusion was conducted at a screw rotation rate of 15 rpm in the intermediate layer extruder and at a temperature of 190°C. at said three-ply die. The average flow rate of 1.5 cm/sec was calculated from the extrusion rate (1.8 Kg/hr) obtained in this test.

An ethylene-vinyl acetate copolymer saponified product having the same properties as that used in Example 1 was extruded under the same extrusion conditions as above with use of the intermediate layer extruder of the same extrusion molding machine as above. The average flow rate of 2.7 cm/sec was calculated from the extrusion rate (4.6 Kg/hr) obtained in this test.

The above low density polyethylene was mixed with the above saponified copolymer at a mixing weight ratio indicated in Table 2 and the mixture was dry blended under the same conditions as described in Example 1. The resulting dry blend and the above low density polyethylene were co-extruded with use of the above three-layer vessel extrusion molding machine in such a manner that the dry blend was extruded from the intermediate layer extruder and the low density polyethylene was extruded from the outer- and inner-layer extruder. The temperature of the three-ply die was maintained at 190°C. For comparison, the co-extrusion was conducted in the same manner by employing instead of the dry blend the above low density polyethylene or the above saponified copolymer.

The extrudate was molded into an oval bottle having a symmetric three layer laminate structure having an intermediate layer of the blend and outer and inner layers of the above low densty polyethylene. In each of the so obtained bottles, the average thickness was about 600 $\mu$, the thickness ratio of outer layer:intermediate layer:inner layer was 4.5:1:4.5, and the inner volume was about 280 cc. With respect to each bottle, the oxygen gas permeability $QO_2$, the water loss Lw, the falling strength $f_{10}$ and the average interlaminar peel strength Sp were determined according to the methods described hereinabove. The mixing weight ratio of the low density polyethylene (PO) and the ethylene-vinyl acetate copolymer saponified product (Ev-1) and results obtained by the above determination are shown in Table 2. From the results shown in Table 2, it is seen that effects on the above properties could be obtained when the mixing weight ratio of PO/Ev-1 in the blend layer (intermediate layer) was within a range of 98/2 to 2/98.

Table 2

| PO/Ev-1 | $Qo_2$ cc/m².day.atm | Lw [wt %] | $f_{10}$ [%] | Sp [g/2cm] |
|---|---|---|---|---|
| 100/0 | 1090 | 0.7 | 0 | not peeled |
| 98/2 | 505 | 0.7 | 0 | not peeled |
| 90/10 | 147 | 0.6 | 0 | not peeled |
| 80/20 | 61 | 0.7 | 0 | 940 |
| 50/50 | 26 | 0.8 | 0 | 550 |
| 20/80 | 7 | 0.7 | 0 | 320 |
| 10/90 | 5 | 0.8 | 0 | 170 |
| 2/98 | 3 | 0.8 | 0 | 60 |
| 0/100 | 2 | 0.8 | 0 | 0 |

EXAMPLE 3

Among bottles obtained in Examples 1 and 2, those in which the mixing weight ratio of the low density polyethylene and the ethylene-vinyl acetate copolymer saponified product in the intermediate layer was 80/20, 50/50 or 20/80 were chosen, and with respect to each of the so chosen bottles, according to the method described in the test of the specification, the intermediate layer was divided into three layers and the value of log $(I_0/I)/\bar{\mu}$ and value of $m_1$ and $m_2$ were determined according to the infrared spectrophotometry to obtain results shown in Table 3 given below. In each of the bottles obtained in Example 1 (dulmage screw was employed in the intermediate layer extruder), the value of either $m_1$ or $m_2$ was close to 1.00 in each divided layer, from which it is seen that the intermediate layer was composed of a mixture very close to a homogeneous mixture. In contrast, in the case of the bottles obtained in Example 2 (metering screw was employed in the intermediate layer extruder), the value of $m_2$ was substantially smaller than 1 in the divided layer adjacent to the outer or inner polyethylene layer, and therefore, it is apparent that such divided layer contained the low density polyethylene predominantly. Further, in the central portion of the blend layer, the value of $m_1$ was apparently larger than 1.00, and therefore, it is seen that in such portion the ethylene-vinyl acetate copolymer saponified product was contained in an amount larger than the average content of the saponified copolymer in the intermediate blend layer.

Table 3

| PO/Ev - 1 | Indentification of Layer | Dulmage Type Screw | | | Metering Screw | | |
|---|---|---|---|---|---|---|---|
| | | $\frac{\log(Io/I)}{\bar{\mu}} \times 10^3$ | $m_1$ | $m_2$ | $\frac{\log(Io/I)}{\bar{\mu}} \times 10^3$ | $m_1$ | $m_2$ |
| 80/20 | 1 | 17.1 | 1.00 | | 12.8 | | 0.75 |
| | 2 | 16.2 | | 0.95 | 24.4 | 1.45 | |
| | 3 | 17.0 | 1.00 | | 12.8 | | 0.75 |
| 50/50 | 1 | 41.5 | | 0.98 | 35.5 | | 0.84 |
| | 2 | 42.6 | 1.00 | | 56.6 | 1.34 | |
| | 3 | 42.9 | 1.02 | | 36.0 | | 0.84 |
| 20/80 | 1 | 68.0 | 1.00 | | 64.6 | | 0.95 |
| | 2 | 67.2 | | 0.99 | 75.0 | 1.10 | |

Table 3-continued

| PO/Ev-1 | Identification of Layer | Dulmage Type Screw | | | Metering Screw | | |
|---|---|---|---|---|---|---|---|
| | | $\frac{\log(Io/I)}{\mu} \times 10^3$ | $m_1$ | $m_2$ | $\frac{\log(Io/I)}{\mu} \times 10^3$ | $m_1$ | $m_2$ |
| | 3 | 67.7 | 1.00 | | 63.8 | 0.94 | |

EXAMPLE 4

A high density polyethylene having a density of 0.950 g/cc (as measured according to ASTM D-1505), a melt density of 0.773 g/cc as measured at 190°C. and a melt index of 0.2 g/10 min (as measured according to ASTM D-1238) was mixed with an ethylene-vinyl acetate copolymer saponified product having a ethylene content of 25.4 mole %, a degree of saponification of 99.2%, an intrinsic viscosity of 0.08 l/g and a melt density of 1.07 g/cc as measured at 190°C., at a mixing weight ratio indicated in Table 4 give below, and the mixture was blended at room temperature for 3 minutes by means of a Henschel mixer. The so obtained dry blend was kneaded and formed into pellets by means of a pelletizer having a dulmage screw of a diameter of 40 mm and an effective length of 1120 mm (having 8 screw flights at a mixing zone disposed in the top end portion) at a screw rotation rate of 47 rpm and a die temperature of 220°C. The so formed pelletized blend and the above-mentioned low density polyethylene were co-extruded by means of an intermediate layer extruder for the pelletized blend having an dulmage screw having a diameter of 40 mm, an effective length of 800 mm and a mixing zone of 6 screw flights disposed in the top end portion, an outer- and inner-layer extruder for the low density polyethylene installed with a metering screw of a diameter of 65 mm and an effective length of 1430 mm and provided with an adaptor having a two-branched melt channel, and a three-ply die maintained at 190°C. For comparison, the above co-extrusion was conducted in the same manner by employing instead of the above blend the above-mentioned high density polyethylene or saponified copolymer.

The so obtained co-extrudate was molded into an oval bottle having a symmetric three-layer laminate structure having an intermediate layer of said blend and outer and inner layers of said high density polyethylene, according to a known blow molding method. In each of the so obtained bottles, the thickness ratio of outer layer:intermediate layer:inner layer was 4.5:1:4.5 and the bottles had an average thickness of about 600 $\mu$ and an inner volume of about 280 cc.

With respect to each of the so obtained bottles, the oxygen gas permeability $QO_2$ and the average interlaminar peel strength Sp were determined according to the methods described hereinabove to obtain results shown in Table 4. The mixing weight ratio of the high density polyethylene (PO) and the ethylene-vinyl acetate copolymer saponified product (Ev-1) constituting the blend layer (intermediate layer) and results of the determination of $QO_2$ and Sp are shown in Table 4. From the results shown in Table 4, it is seen that effects on the oxygen gas permeability and average interlaminar strength could be obtained when the mixing weight ratio of PO/Ev-1 in the intermediate blend layer was within a range of from 90/10 to 10/90.

Table 4

| PO/Ev-1 | $QO_2$ [cc/m.day.atm] | Sp [g/2cm] |
|---|---|---|
| 100/0 | 452 | not peeled |
| 98/2 | 376 | not peeled |
| 90/10 | 259 | not peeled |
| 80/20 | 141 | 820 |
| 50/50 | 18 | 390 |
| 20/80 | 10 | 190 |
| 10/90 | 7 | 110 |
| 2/98 | 3 | 0 |
| 0/100 | 2 | 0 |

EXAMPLE 5

A low density polyethylene having the same properties as that used in Example 4 was extruded with use of an intermediate layer extruder of a three-layer vessel extrusion molding machine, which comprised an intermediate layer extruder having a nylon screw of a diameter of 40 mm and an effective length of 600 mm, an outer- and inner-layer extruder installed with a metering screw of a diameter of 65 mm and effective length of 1430 mm and provided with an adaptor having a two-branched melt channel, and a three-ply die having a sectional area of an intermediate layer passage of 0.44 cm² at the junction point of the three layers. The extrusion was conducted at a screw rotation rate of 15 rpm in the intermediate layer extruder and at a temperature of 190°C. at said three-ply die. The average flow rate of 1.3 cm/sec was calculated from the extrusion rate (1.6 Kg/hr) obtained in this test.

An ethylene-vinyl acetate copolymer saponified product having the same properties as that used in Example 4 was extruded under the same extrusion conditions as above with use of the intermediate layer extruder of the same extrusion molding machine as above. The average flow rate of 2.7 cm/sec was calculated from the extrusion rate (4.6 Kg/hr) obtained in this test.

The above low density polyethylene was mixed with the above saponified copolymer at a mixing weight ratio indicated in Table 5 and the mixture was dry blended under the same conditions as described in Example 4. The resulting dry blend and the above low density polyethylene were co-extruded with use of the above three-layer vessel extrusion molding machine in such a manner that the dry blend was extruded from the intermediate layer extruder and the low density polyethylene was extruded from the outer- and inner-layer extruder. The temperature of the three-ply die was maintained at 190°C. For comparison, the co-extrusion was conducted in the same manner by employing instead of the dry blend the above low density polyethylene or the above saponified copolymer.

The co-extrudate was molded into an oval bottle having a symmetric three layer laminate structure having an intermediate layer of the blend and outer and inner layers of the above low density polyethylene. In each of the so obtained bottles, the average thickness was about 600 μ, the thickness ratio of outer layer:intermediate layer:inner layer was 4.5:1:4.5, and the inner volume was about 280 cc. With respect to each bottle, the oxygen gas permeability $QO_2$, the water loss Lw, the falling strength $f_{10}$ and the average interlaminar peel strength Sp were determined according to the methods described hereinabove. The mixing weight ratio of the low density polyethylene (PO) and the ethylene-vinyl acetate copolymer saponified product (Ev-1) and results obtained by the above determination are shown in Table 5. From the results shown in Table 5, it is seen that effects on the above properties could be obtained when the mixing weight ratio of PO/Ev-1 in the blend layer (intermediate layer) was within a range of 98/2 to 2/98.

Table 5

| PO/Ev - 1 | $Qo_2$ [cc/m.day.atm] | L W [%] | $f_{10}$ [%] | Sp [g/2 cm] |
|---|---|---|---|---|
| 100/0 | 452 | 0.2 | 0 | not peeled |
| 98/2 | 211 | 0.2 | 0 | not peeled |
| 90/10 | 106 | 0.2 | 0 | not peeled |
| 80/20 | 39 | 0.2 | 0 | 970 |
| 50/50 | 15 | 0.2 | 0 | 590 |
| 20/80 | 6 | 0.3 | 0 | 400 |
| 10/90 | 4 | 0.3 | 0 | 220 |
| 2/98 | 2 | 0.2 | 10 | 70 |
| 0/100 | 2 | 0.2 | 10 | 0 |

EXAMPLE 6

Among bottles obtained in Examples 4 and 5, those in which the mixing weight ratio of the low density polyethylene and the ethylene-vinyl acetate copolymer saponified product in the intermediate layer was 80/20, 50/50 or 20/80 were chosen, and with respect to each of the so chosen bottles, according to the method described in the text of the specification, the intermediate layer was divided into three layers and the value of log $(I_o/I)/\bar{\mu}$ and values of $m_1$ and $m_2$ were determined according to the infrared spectrophotometry to obtain results shown in Table 6 given below. In each of the bottles obtained in Example 4 (dulmage screw was employed in the intermediate layer extruder), the value of either $m_1$ or $m_2$ was close to 1.00 in each divided layer, from which it is seen that the intermediate layer was composed of a mixture very close to a homogeneous mixture. In contrast, in the case of the bottles obtained in Example 5 (nylon screw was employed in the intermediate layer extruder), the value of $m_2$ was substantially smaller than 1 in the divided layer adjacent to the outer or inner polyethylene layer, and therefore, it is apparent that such divided layer contained the low density polyethylene predominantly. Further, in the central portion of the blend layer, the value of $m_1$ was apparently larger than 1.00, and therefore, it is seen that in such portion the ethylene-vinyl acetate copolymer saponified product was contained in an amount larger than the average content of the saponified copolymer in the intermediate blend layer.

Table 6

| Composition of Blend Layer PO/Ev - 1 | Identification of Divided Layer | Dulmage Type Screw | | | Nylon Screw | | |
|---|---|---|---|---|---|---|---|
| | | $\frac{\log(I_o/I)}{\bar{\mu}} \times 10^3$ | $m_1$ | $m_2$ | $\frac{\log(I_o/I)}{\bar{\mu}} \times 10^3$ | $m_1$ | $m_2$ |
| 80/20 | 1 | 16.1 | | 0.95 | 11.9 | | 0.70 |
| | 2 | 17.9 | 1.05 | | 26.4 | 1.55 | |
| | 3 | 16.0 | | 0.95 | 12.8 | | 0.75 |
| 50/50 | 1 | 42.3 | 1.00 | | 33.3 | | 0.78 |
| | 2 | 42.5 | 1.00 | | 61.0 | 1.44 | |
| | 3 | 43.0 | 1.02 | | 34.1 | | 0.80 |
| 20/80 | 1 | 67.1 | | 0.99 | 62.0 | | 0.91 |
| | 2 | 68.0 | 1.00 | | 78.0 | 1.15 | |
| | 3 | 68.5 | 1.01 | | 62.9 | | 0.93 |

EXAMPLE 7

A low density polyethylene having a density of 0.920 g/cc (as measured according to ASTM D-1505) and a melt index of 2.1 g/10 min (as measured according to ASTM D-1238) was mixed with the ethylene-vinyl acetate copolymer saponified product having an ethylene content of 25.4 mole %, a degree of saponification of 99.2%, and an intrinsic viscosity of 0.16 l/g at a mixing weight ratio indicated in Table 7 given below, and the mixture was blended at room temperature for 3 minutes by means of a Henschel mixer. The so obtained dry blend and the above-mentioned saponified copolymer were co-extruded by means of an intermediate layer extruder for the dry blend having a metering screw having a diameter of 40 mm and an effective length of 800 mm, an outer- and inner-layer extruder for the saponified copolymer installed with a metering screw of a diameter of 65 mm and an effective length of 1430 mm and provided with an adaptor having a two-branched melt channel, and a three-ply die maintained at 190°C. For comparison, the above co-extrusion was conducted in the same manner by employing instead of the above blend the above-mentioned low density polyethylene or saponified copolymer.

The so obtained co-extrudate was molded into an oval bottle having a symmetric three-layer laminate structure having an intermediate layer of said blend and outer and inner layers of said saponified copolymer, according to a known blow molding method. In each of the so obtained bottles, the thickness ratio of outer layer:intermediate layer:inner layer was 4.5:1:4.5 and the bottles had an average thickness of about 600 μ and an inner volume of about 280 cc.

With respect to each of the so obtained bottles, the oxygen gas permeability $QO_2$, water loss Lw, falling strength $f_{10}$ and the average interlaminar peel strength Sp were determined according to the methods described hereinabove to obtain results shown in Table 7. The mixing weight ratio of the low density polyethylene (PO) and the ethylene-vinyl acetate copolymer saponified product (Ev-1) constituting the blend layer (intermediate layer) and results of the determination of $QO_2$, Lw, $f_{10}$ and Sp are shown in Table 7.

Table 7

| Composition of Blend Layer PO/Ev-1 | Qo₂ [cc/m².day.atm] | Lw [wt %] | f₁₀ [%] | Sp [g/2cm] |
|---|---|---|---|---|
| 100/0 | <1 | 0.7 | 0 | 0 |
| 98/2 | <1 | 0.7 | 0 | 80 |
| 90/10 | <1 | 0.9 | 10 | 510 |
| 80/20 | <1 | 1.0 | 20 | 690 |
| 50/50 | <1 | 1.4 | 50 | 790 |
| 20/80 | <1 | 2.5 | 70 | not peeled |
| 10/90 | <1 | 3.7 | 90 | not peeled |
| 2/98 | <1 | 4.9 | 100 | not peeled |
| 0/100 | <1 | 6.3 | 100 | not peeled |

EXAMPLE 8

An isotactic polypropylene having a density of 0.906 g/cc (as measured according to ASTM D-1505) and a melt index of 0.8 g/10 min (as measured according to ASTM D-1238) was mixed with an ethylene-vinyl acetate copolymer saponified product having an ethylene content of 25.4 mole %, a degree of saponification of 99.2% and an intrinsic viscosity of 0.08 l/g at a mixing weight ratio indicated in Table 8 given below, and the mixture was blended at room temperature for 3 minutes by means of a Henschel mixer. The so obtained dry blend and the above saponified copolymer were co-extruded with use of an intermediate layer extruder having a metering screw of a diameter of 40 mm and an effective length of 800 mm, an outer- and inner-layer extruder installed with a metering screw of a diameter of 65 mm and effective length of 1430 mm and provided with an adaptor having a two-branched melt channel, and a three-ply die maintained at 240°C., in such a manner that the dry blend was extruded from the intermediate layer extruder and the saponified copolymer was extruded from the outer- and inner-layer extruder. For comparison, the co-extrusion was conducted in the same manner by employing instead of the dry blend the above isotactic polypropylene or the above saponified copolymer.

The co-extrudate was molded into an oval bottle having a symmetric three-layer laminate structure having an intermediate layer of the blend and outer and inner layers of the above saponified copolymer. In each of the so obtained bottles, the average thickness was about 600 μ, the thickness ratio of outer layer:intermediate layer:inner layer was 4.5:1:4.5, and the inner volume was about 280 cc. With respect to each bottle, the oxygen gas permeability QO₂, the water loss Lw, the falling strength f₁₀ and the average interlaminar peel strength Sp were determined according to the methods decribed hereinabove. The mixing weight ratio of the isotactic polypropylene (PO) and the ethylene-vinyl acetate copolymer saponified product (Ev-1) and results obtained by the above determination are shown in Table 8.

Table 8

| Composition of Blend Layer PO/Ev-1 | Qo₂ [cc/m².day.atm] | Lw [wt %] | Sp [g/2 cm] |
|---|---|---|---|
| 100/0 | <1 | 0.4 | 0 |
| 98/2 | <1 | 0.5 | 40 |
| 90/10 | <1 | 0.6 | 300 |
| 80/20 | <1 | 0.9 | 570 |
| 50/50 | <1 | 1.2 | 670 |
| 20/80 | <1 | 2.3 | 820 |
| 10/90 | <1 | 3.6 | not peeled |
| 2/98 | <1 | 4.8 | not peeled |
| 0/100 | <1 | 6.3 | not peeled |

EXAMPLE 9

An isotactic polypropylene having a density of 0.906 g/cc (as measured according to ASTM D-1505) and a melt index of 0.8 g/10 min (as measured according to ASTM D-1238) was mixed with an ethylene-vinyl acetate copolymer saponified product having an ethylene content of 49.4 mole %, a degree of saponification of 96.3% and an intrinsic viscosity of 0.17 l/g at a mixing weight ratio indicated in Table 9 given below, and the mixture was blended at room temperature for 3 minutes by means of a Henschel mixer. The so obtained dry blend and the above saponified copolymer were co-extruded with use of an intermediate layer extruder having a metering screw of a diameter of 40 mm and an effective length of 800 mm, an outer- and inner-layer extruder installed with a metering screw of a diameter of 65 mm and effective length of 1430 mm and provided with an adaptor having a two-branched melt channel, and a three-ply die maintained at 220°C. in such a manner that the dry blend was extruded from the intermediate layer extruder and the saponified copolymer was extruded from the outer- and inner-layer extruder. For comparison, the co-extrusion was conducted in the same manner by employing instead of the dry blend the above isotactic polypropylene or the above saponified copolymer.

The co-extrudate was molded into an oval bottle having a symmetric three-layer laminate structure having an intermediate layer of the blend and outer and inner layers of the above saponified copolymer. In each of the so obtained bottles, the average thickness was about 600 μ, the thickness ratio of outer layer:intermediate layer:inner layer was 4.5:1:4.5, and the inner volume was about 280 cc. With respect to each bottle, the oxygen gas permeability QO₂, the water loss Lw, the falling strength f₁₀ and the average interlaminar peel strength Sp were determined according to the methods described hereinabove. The mixing weight ratio of the isotactic polypropylene (PO) and the ethylene-vinyl acetate copolymer saponified product (Ev-2) and results obtained by the above determination are shown in Table 9.

Table 9

| Composition of Blend Layer PO/Ev-2 | Qo₂ [cc/m².day.atm] | Lw [wt %] | Sp [g/2 cm] |
|---|---|---|---|
| 100/0 | 17 | 0.4 | 20 |
| 98/2 | 18 | 0.5 | 300 |
| 90/10 | 17 | 0.5 | 610 |
| 80/20 | 17 | 0.6 | 840 |
| 50/50 | 17 | 0.8 | not peeled |
| 20/80 | 17 | 1.3 | not peeled |
| 10/90 | 17 | 2.5 | not peeled |
| 2/98 | 17 | 3.8 | not peeled |
| 0/100 | 17 | 4.1 | not peeled |

EXAMPLE 10

An ethylene-vinyl acetate copolymer having a density of 0.920 g/cc (as measured according to ASTM D-1505), a melt index of 1.2 g/10 min (as measured according to ASTM D-1238) a vinyl acetate content of 5 mole % was mixed with an ethylene-vinyl acetate copolymer saponified product having an ethylene content of 25.4 mole %, a degree of saponification of 99.2% and an intrinsic viscosity of 0.7 l/g at a mixing weight ratio indicated in Table 10 given below, and the mixture was blended at room temperature for 3 minutes by means of a Henschel mixer. The so obtained dry blend and the above saponified copolymer were co-extruded with use of an intermediate layer extruder having a nylon screw of a diameter of 40 mm and an effective length of 800 mm, an outer- and inner-layer extruder installed with a metering screw of a diameter of 65 mm and effective length of 1430 mm and provided with an adaptor having a two-branched melt channel, and a three-ply die maintained at 174°C. in such a manner that the dry blend was extruded from the outer- and inner-layer extruder and the saponified copolymer was extruded from the intermediate layer extruder. For comparison, the co-extrusion was conducted in the same manner by employing instead of the dry blend the above ethylene-vinyl acetate copolymer or the above saponified copolymer.

The co-extrudate was molded into an oval bottle having a symmetric three-layer laminate structure having an intermediate layer of said saponified copolymer and outer and inner layers of the above blend. In each of the so obtained bottles, the average thickness was about 1.5 mm, the thickness ratio of outer layer : intermediate layer : inner layer was 15 : 1 : 15, and the inner volume was about 1150 cc. With respect to each bottle, the oxygen gas permeability $QO_2$, the water loss Lw, the falling strength $f_{10}$ and the average interlaminar peel strength were determined according to the methods described hereinabove. The mixing weight ratio of the ethylene-vinyl acetate copolymer (PO) and the ethylene-vinyl acetate copolymer saponified product (Ev–1) in the blend layer (outer or inner layer) and results obtained by the above determination are shown in Table 10.

Table 10

| Composition of Blend Layer PO/Ev - 1 | $Qo_2$ [cc/m².day.atm] | Lw [wt %] | Sp [g/2 cm] |
|---|---|---|---|
| 100/0 | 2 | 1.0 | 140 |
| 90/10 | 2 | 1.2 | 770 |
| 50/50 | 2 | 2.1 | not peeled |
| 20/80 | 2 | 3.7 | not peeled |
| 0/100 | 2 | 6.3 | not peeled |

The above ethylene-vinyl acetate copolymer and the above were co-extruded and molded under the same extrusion molding conditions and with use of the same extruders as above, in such a manner that the above ethylene-vinyl acetate copolymer was extruded from the intermediate layer extruder and the blend was extruded from the outer- and inner-layer extruder. Thus were obtained oval bottles having a symmetric three-layer laminate structure comprising an intermediate layer of the above ethylene-vinyl acetate copolymer and inner and outer layers of the above blend. The thickness ratio, average total thickness and inner volume of these bottles were the same as those of the bottles molded above. Results of the determination of $QO_2$, Lw and Sp made on these bottles are shown in Table 11 given below.

Table 11

| Composition of Blend Layer PO/Ev - 1 | $Qo_2$ [cc/m².day.atm] | Lw [wt %] | Sp [g/2 cm] |
|---|---|---|---|
| 100/0 | 1450 | 1.0 | not peeled |
| 90/10 | 151 | 1.0 | not peeled |
| 50/50 | 28 | 1.0 | not peeled |
| 20/80 | 8 | 1.0 | 900 |
| 0/100 | 2 | 1.1 | 150 |

EXAMPLE 11

A low density polyethylene having the same properties as those of the low density polyethylene used in Example 1 and an ethylene-vinyl acetate copolymer saponified product having the same properties as those of the saponified copolymer as employed in Example 1 were co-extruded at the same mixing weight ratio as in Example 2 by employing the same intermediate layer extruder and outer- and inner-layer extruder as employed in Example 2 and a three-ply die (T die) maintained at 190°C. Thus were obtained sheets having a symmetric three-layer laminate structure having an intermediate layer of the polymer blend and outer and inner layers of the low density polyethylene and having a thickness of about 240 $\mu$. In each of these sheets, the thickness ratio of outer layer : intermediate layer : outer layer was about 10 : 1 : 10. The oxygen gas permeability $QO_2$, and average interlaminar peel strength Sp of the sheet and the water loss Lw of a bag prepared from such sheet according to the method described in the text of the specification and having the same configuration as described in the text of the specification, were determined according to the methods described in the text of the specification.

The mixing weight ratio of the low density polyethylene (PO) and the saponified copolymer (Ev–1) in the blend layer (intermediate layer), and results of the determination of $QO_2$, Lw and Sp are shown in Table 12.

Table 12

| Composition of Blend Layer PO/Ev-1 | $Qo_2$ (200μ thickness) [cc/m².day.atm] | Lw [wt %] | Sp [g/2 cm] |
|---|---|---|---|
| 100/0 | 2730 | 1.7 | not peeled |
| 98/2 | 1250 | 1.7 | not peeled |
| 90/10 | 370 | 1.8 | not peeled |
| 80/20 | 154 | 1.7 | 980 |
| 50/50 | 63 | 1.6 | 620 |
| 20/80 | 19 | 1.7 | 350 |
| 10/90 | 12 | 1.8 | 190 |
| 2/98 | 7 | 1.7 | 70 |
| 0/100 | 5 | 1.8 | 0 |

EXAMPLE 12

A high density polyethylene having the same properties as those of the high density polyethylene used in Example 4 and an ethylene-vinyl acetate copolymer saponified product having the same properties as those of the saponified copolymer as employed in Example 4 were co-extruded at the same mixing weight ratio as in Example 5 by employing the same intermediate layer extruder and outer- and inner-layer extruder as employed in Example 5 and a three-ply die (T die) maintained at 190°C. Thus were obtained sheets having a symmetric three-layer laminate structure having an intermediate layer of the polymer blend and outer and inner layers of the high density polyethylene and having a thickness of about 240 μ. In each of these sheets, the thickness layer of outer layer : intermediate layer : inner layer was about 10 : 1 : 10. The oxygen gas permeability $QO_2$ and average interlaminar peel strength Sp of the sheet and the water loss Lw of a bag prepared from such sheet according to the method described in the text of the specification and having the same configuration as described in the text of the specification, were determined according to the methods described in the text of the specification.

Table 13

| Composition of Blend Layer PO/Ev - 1 | $Qo_2$ (200μ thickness) [cc/m².day.atm] | Lw [wt %] | Sp [g/2 cm] |
|---|---|---|---|
| 100/0 | 1110 | 0.6 | not peeled |
| 98/2 | 524 | 0.5 | not peeled |
| 90/10 | 265 | 0.5 | not peeled |
| 80/20 | 94 | 0.6 | 960 |
| 50/50 | 39 | 0.6 | 630 |
| 20/80 | 17 | 0.6 | 370 |
| 10/90 | 10 | 0.6 | 200 |
| 2/98 | 6 | 0.6 | 60 |
| 0/100 | 5 | 0.6 | 0 |

EXAMPLE 13

A high density polyethylene having a density of 0.950 g/cc (as measured according to ASTM D-1505) and a melt index of 0.2 g/10 min (as measured according to ASTM D-1238) was mixed with an ethylene-vinyl acetate copolymer saponified product having an ethylene content of 25.4 mole %, a degree of saponification of 99.2 % and an intrinsic viscosity of 0.08 l/g at a mixing weight ratio indicated in Table 14 given below, and the mixture was blended at room temperature for 3 minutes by means of a Henshel mixer. The so obtained dry blend and the above saponified copolymer were co-extruded with use of an inner layer extruder having a metering screw of a diameter of 40 mm and an effective length of 800 mm, an outer layer extruder installed with a metering screw of a dimater of 65 mm and effective length of 1430 mm, and a two-ply die maintained at 200°C. in such a manner that the dry blend was extruded from the outer layer extruder and the saponified copolymer was extruded from the inner layer extruder.

The co-extrudate was molded into an oval bottle having an asymmetric two-layer laminate structure having an outer layer of the blend and an outer layer of the above saponified copolymer. In each of the so obtained bottles, the average thickness was about 1.2 mm, the thickness ratio of outer layer : inner layer was about 20 : 1, and the inner volume was about 660 cc. With respect to each bottle, the oxygen gas permeability $QO_2$, the water loss Lw, the falling strength $f_{10}$ and the average interlaminar peel strength were determined according to the methods described hereinabove. The mixing weight ratio of the high density polyethylene (PO) and the ethylene-vinyl acetate copolymer saponified product (Ev–1) and results obtained by the above determination are shown in Table 14.

Table 14

| Composition of Blend Layer PO/Ev - 1 | $Qo_2$ [cc/m².day.atm] | Lw [wt %] | f [%] | Sp [g/2 cm] |
|---|---|---|---|---|
| 100/0 | 2 | 0.2 | 10 | 0 |
| 98/2 | 1 | 0.2 | 10 | 70 |
| 90/10 | 1 | 0.3 | 20 | 210 |
| 80/20 | 2 | 0.5 | 40 | 420 |
| 50/50 | 1 | 0.8 | 60 | 610 |
| 20/80 | 2 | 1.5 | 90 | not peeled |
| 10/90 | 2 | 2.2 | 100 | not peeled |
| 2/98 | <1 | 3.7 | 100 | not peeled |
| 0/100 | <1 | 6.3 | 100 | not peeled |

EXAMPLE 14

A high density polyethylene having a density of 0.950 g/cc (as measured according to ASTM D-1505) and a melt index of 0.2 g/10 min (as measured according to ASTM D-1238) was mixed with a low density polyethylene having a density of 0.920 g/cc and a melt index of 0.5 g/10 min at a mixing weight ratio of 50/50 and the mixture was blended at room temperature for 3 minutes by means of a Henschel mixer. The so obtained dry blend was kneaded and formed into pellets by means of a pelletizer having a dulmage screw of a diameter of 40 mm and an effective length of 1120 mm (having 8 screw flights at a mixing zone disposed in the top end portion) at a screw rotation rate of 50 rpm and a die temperature of 200°C. The so formed pelletized medium density polyethylene had a density of 0.935 g/cc and a melt index of 0.3 g/10 min.

The so formed medium density polyethylene was mixed with an ethylene-vinyl acetate copolymer saponified product having an ethylene content of 25.4 mole %, a degree of saponification of 99.2 % and an intrinsic viscosity of 0.08 l/g at a mixing ratio indicated in Table 15, and the mixture was blended at room temperature for 3 minutes by a Henschel mixer. The so formed polymer blend and the above medium density polyethylene were co-extruded by means of an outer extruder for the above blend having a metering screw having a diameter of 40 mm and an effective length of 800 mm, an inner layer extruder for the medium density polyethylene installed with a metering screw of a diameter of 65 mm and an effective length of 1430 mm, and a two-ply die maintained at 190°C.

The so obtained co-extrudate was molded into an oval bottle having an asymmetric two-layer laminate structure having an outer layer of said blend and an inner layer of said medium density polyethylene, according to a known blow molding method. In each of the so obtained bottles, the thickness ratio of outer layer : inner layer was about 1 : 20 and the bottles had an average thickness of about 1.2 mm and an inner volume of about 660 cc.

With respect to each of the so obtained bottles, the oxygen gas permeability $QO_2$, the average interlaminar peel strength Sp, the water loss Lw and falling strength $f_{10}$ were determined according to the methods described hereinabove to obtain results shown in Table 15. The mixing weight ratio of the medium density polyethylene (PO) and the ethylene-vinyl acetate copolymr saponified product (Ev–1) constituting the blend layer (intermediate layer) and results of the determination of $QO_2$, $Lw$, $f_{10}$ and $Sp$ are shown in Table 15.

Table 15

| Composition of Blend Layer PO/Ev - 1 | $Qo_2$ [cc/$m^2$.day.atm] | Lw [wt %] | $f_{10}$ [%] | Sp [g/2 cm] |
|---|---|---|---|---|
| 100/0 | 729 | 0.5 | 0 | not peeled |
| 98/2 | 356 | 0.4 | 0 | not peeled |
| 90/10 | 129 | 0.5 | 0 | not peeled |
| 80/20 | 34 | 0.5 | 0 | not peeled |
| 50/50 | 21 | 0.5 | 0 | 560 |
| 20/80 | 7 | 0.5 | 10 | 350 |
| 10/90 | 4 | 0.5 | 10 | 180 |
| 2/98 | 2 | 0.5 | 20 | 60 |
| 0/100 | 2 | 0.5 | 20 | 0 |

EXAMPLE 15

A low density polyethylene having a density of 0.928 g/cc (as measured according to ASTM D-1505) and a melt index of 8.0 g/10 (as measured according to ASTM D-1238) was mixed with an ethylene-vinyl acetate copolymer saponified product having an ethylene content of 25.4 mole %, a degree of saponification of 99.2 % and an intrinsic viscosity of 0.16 l/g at a mixing weight ratio of 90/10, and the mixture was blended at room temperature for 3 minutes by means of a Henschel mixer. The so obtained dry blend and the above saponified copolymer were co-extruded with use of an inner layer extruder having a metering screw of a diameter of 40 mm and an effective length of 800 mm, an outer layer extruder installed with a metering screw of a diameter of 65 mm and effective length of 1430 mm, and a two-ply inflation die maintained at 190°C. in such a manner that the dry blend was extruded from the inner layer extruder and the saponified copolymer was extruded from the outer layer extruder.

The co-extrudate was inflation-molded into a film having an asymmetric two-layer laminate structure having an inner layer of the blend and an outer layer of the above saponified copolymer. In each of the so obtained films, the average thickness was about 100 $\mu$ and the thickness ratio of outer layer : inner layer wss about 1 : 1. For comparison, the co-extrusion was conducted in the same manner as above by employing instead of the above blend the above-mentioned low density polyethylene to obtain a film having the same thickness and thickness ratio as above.

With respect to each of the so obtained films, the oxygen gas permeability $QO_2$ was determined according to the method described hereinabove to obtain results shown in Table 16. Results obtained when the measurement was conducted while maintaining the relative humidity on the outer side (high pressure side) to 75% are also shown in Table 16.

Table 16

| Composition of Blend Layer PO/Ev - 1 | Oxygen Permeability $Qo_2$ | |
|---|---|---|
| | Outside Humidity | $Qo_2$ [cc/$m^2$.day.atm] |
| 100/0 | 15 % R H | 2 |
| | 75 % R H | 10 |
| 90/10 | 15 % R H | 2 |

Table 16-continued

| Composition of Blend Layer PO/Ev - 1 | Oxygen Permeability $Qo_2$ | |
|---|---|---|
| | Outside Humidity | $Qo_2$ [cc/$m^2$.day.atm] |
| | 75 % R H | 4 |

From the results shown in Table 16, it is seen that when the ethylene-vinyl acetate copolymer saponified product alone was used as the component of the outer layer, $QO_2$ was increased under a high humidity condition and the gas barrier property was inferior to some extent.

Each of the above two kinds of laminate films were molded into bags having a length of 170 mm and a width of 115 mm by means of a heat sealer. Then, about 200 cc of water or edible oil was filled in each bag and an opening was heat-sealed. Then, the sample bags were allowed to stand at a temperature of 50°C. and a relative humidity of 10% for 21 days, and the appearance (the delamination state) was examined to obtain results shown in Table 17.

Table 17

| Composition of Blend Layer PO/Ev - 1 | Delamination State after 21 Days | |
|---|---|---|
| | Content of Bag | Delamination State |
| 100/0 | Water | Delamination was not observed |
| | Edible Oil | Delamination was observed |
| 90/10 | Water | Delamination was not observed |
| | Edible Oil | Delamination was not observed |

From the results shown in Table 17, it is seen that in case the polyethylene alone was used as the inner layer, when edible oil was filled in the bag, delamination was caused to occur.

EXAMPLE 16

A 50 : 50 weight ratio mixture of a low density polyethylene having a density of 0.928 g/cc as measured according to ASTM D-1505 and a melt index of 3.0 g/10 min as measured according to ASTM D-1238 and a ethylene-vinyl acetate copolymer saponified product having an ethylene content of 25.4 mole %, a degree of saponification of 99.2% and an intrinsic viscosity of 0.16 l/g was dry blended at room temperature for 3 minutes by means of a Henschel mixer. The so formed dry blend and the above ethylene-vinyl acetate copolymer saponified product were coextruded with use of an inner layer extruder having a metering screw of a diameter of 40 mm and an effective length of 800 mm, an outer layer extruder having a metering screw of a diameter of 65 mm and an effective length of 1430 mm and a two-ply inflation die maintained at 190°C., in such a manner that the above saponified copolymer was extruded from the inner layer extruder and the above blend was extruded from the outer layer extruder. The co-extrudate was molded into a film having an asymmetric two-layer laminate structure having an outer layer of the blend of an inner layer of the above saponified copolymer according to a known inflation molding method. In this film, the thickness ratio of outer layer : inner layer was about 1 : 1 and the average thickness was about 100 μ. For comparison, the co-extrusion was conducted under the same conditions as above by employing instead of the above blend the above low density polyethylene, and the co-extrudate was molded into a film having the same thickness ratio and average thickness as those of the above film comprising the blend layer. With respect to each of the above two kinds of films, the oxygen gas permeability $QO_2$ was determined according to the method described in the text of the sepcification to obtain results shown in Table 18. Results obtained when the measurement was conducted while adjusting the relative humidity of the outside atmosphere (relative humidity on the high pressure side) to 75% are also shown in Table 18.

Table 18

| Composition of Blend Layer PO/Ev - 1 | Oxygen Permeability $Qo_2$ | |
|---|---|---|
| | Outside Humidity | $Qo_2$ [cc/m².day.atm] |
| 100/0 | 15 % R H | 2 |
| | 75 % R H | 2 |
| 50/50 | 15 % R H | 2 |
| | 75 % R H | 3 |

From the results shown in Table 18, it is seen that in each laminate film the value of $QO_2$ was hardly influenced by the outside humidity.

Each of the above two laminate films was molded into a bag having a length of 170 mm and a width of 115 mm by means of a heat sealer and water or edible oil was filled into the bag. The opening of the bag was heat sealed and the sealed bag was allowed to stand at a temperature of 50°C. and a relative humidity of 10% for 21 days. The appearance condition (delamination state) was examined to obtain results shown in Table 19.

Table 19

| Composition of Blend Layer PO/Ev - 1 | Appearance Change after 21 Days | |
|---|---|---|
| | Content of Bag | Delamination State |
| 100/0 | Water | Delamination was observed |
| | Edible Oil | Delamination was not observed |
| 50/50 | Water | Delamination was not observed |
| | Edible Oil | Delamination was not observed |

From the results shown in Table 19, it is seen that in case the inner layer was composed of the ethylene-vinyl acetate copolymer saponified product, when water was filled, delamination was caused to occur.

EXAMPLE 17

An isotactic polypropylene having a density of 0.906 g/cc as measured according to ASTM D-1505 and a melt index of 0.8 g/10 min as measured according to ASTM D-1238, an ethylene-propylene copolymer having a propylene content of 21 mole % and a low density polyethylene having a density of 0.920 g/cc and a melt index of 1.0 g/min were dry blended at a mixing weight ratio of 76/4/20. Then, the blend was heated and kneaded by means of a pelletizer including a dulmage screw having a diameter of 40 mm, an effective length of 1120 mm and a mixing zone of eight flights disposed at the top end portion. The so obtained polypropylene blend was mixed with an ethylene-vinyl acetate copolymer saponified product having an ethylene content of 25.4 mole %, a degree of saponification of 99.2% and an intrinsic viscosity of 0.07 l/g at a mixing weight ratio of 80/20, and the mixture was dry blended at room temperature for 3 minutes by means of a Henschel mixer. The so obtained blend and the above polypropylene blend were co-extruded with use of an inner layer exruder having a nylon screw of a diameter of 40 mm and an effective length of 800 mm, an outer layer extruder having a metering screw of a diameter of 65 mm and an effective length of 1430 mm and a two-ply die maintained at 230°C. in such a manner that the dry blend was extruded from the inner layer extruder and the polypropylene blend was extruded from the outer layer extruder. The co-extrudate was molded into oval bottles having an inner layer of the above blend and an outer layer of the above polypropylene blend. In each of the so obtained bottles, the thickness ratio of inner layer : outer layer was about 9 : 1, the average thickness was about 900 μ and the inner volume was about 660 cc. For comparison, laminate structure bottles of an asymmetric two-layer structure were prepared under the same conditions as above by employing instead of the above polypropylene blend the above isotactic polypropylene having a density of 0.906 g/cc and a melt index of 0.8 g/10 min as the outer layer-constituting polymer.

With respect to each of these two kinds of bottles, the oxygen gas permeability $QO_2$, the falling strength $f_{10}$ and the average interlaminar peel strength Sp were determined according to the methods described in the text of the specification to obtain results shown in Table 20.

From the results shown in Table 20, it is seen that when the above ethylene-propylene copolymer and low density polyethylene were added to the above isotactic polypropylene, the falling strength $f_{10}$ could be improved without substantial degradation of $QO_2$ and Sp.

Table 20

| Outer Layer/-Inner Layer | $Qo_2$ [cc/m².day.atm] | $f_{10}$ [wt %] | Sp [g/2 cm] |
|---|---|---|---|
| PO-A/Blend | 48 | 100 | 790 |
| PO-B/Blend | 49 | 40 | 760 |

PO-A: isotactic polypropylene
PO-B: isotactic polypropylene/ethylene-propylene copolymer/low density polyethylene (76/4/20)
Blend: PO-B/Ev-1 (80/20)

EXAMPLE 18

100 parts by weight of a 50 : 50 weight ratio mixture of a low density polyethylene (PO) having a density of 0.920 g/cc as measured according to ASTM D-1505 and a melt index of 2.1 g/10 min as measured according to ASTM D-1238 and an ethylene-vinyl acetate copolymer saponified product (Ev—1) having an ethylene content of 25.4 mole %, a degree of saponification of 99.2% and an intrinsic viscosity of 0.13 l/g was incorporated with 10 parts by weight of a carbonyl group-containing third component selected from a polyvinyl acetate (PVAc) having an intrinsic viscosity of 1.53 dl/g as measured with respect to acetone solution at 30°C. and having a carbonyl concentration of 1160 milliequivalents per 100 g of the polymer, which was prepared by the bulk polymerization, 6-nylon (6-Nylon) having a relative viscosity of 3.4 as measured with respect to 98% sulfuric acid solution containing 10.0 g/l of the polymer at 20°C. and a carbonyl concentration of 890 milliequivalents, Surlyn A of Na type (Surlyn-A) having a melt index of 1.2 g/10 min and a carbonyl concentration of 160 milliequivalents per 100 g of the polymer (iononomer manufactured by Du Pont, U.S.A.), an acrylic acid-grafted polyethylene (AGPE) having a melt index of 0.9 g/10 min and a carbonyl group concentration of 250 milliequivalents per 100 g of the polymer, an ethylene-vinyl acetate copolymer (EVA) having a melt index of 2.4 g/10 min and a carbonyl concentration of 450 milliequivalents per 100 g of the polymer and an ethylene-ethyl acrylate copolymer (EEA) having a melt index of 6.2 g/10 min and a carbonyl group concentration of 310 milliequivalents per 100 g of the polymer, or with 10 parts by weight of a carbonyl group-free third component selected from an isotactic polypropylene (PP) having a melt index of 1.0 g/10 min, a polyisobutylene having a viscosity average molecular weight of about 1000000 (calculated from the intrinsic viscosity measured with respect to tetrahydrofuran solution at 35°C.), an atactic polystyrene (PS) having a melt index of 3.5 g/10 min and a styrene-butadiene copolymer (SBR) having a styrene content of 80 mole %. Each mixture was dry blended at room temperature for 5 minutes by employing a Henschel mixer, and the resulting dry blend and a low density polyethylene having a density of 0.920 g/cc and a melt index of 0.34 g/10 min were co-extruded by means of an intermediate layer extruder having a screw of a diameter of 40 mm and an effective length of 800 mm, an outer- and inner-layer extruder installed with a screw of a diameter of 65 mm and an effective length of 1430 mm, and a three-ply die maintained at 175 to 245°C. The three-component blend was extruded by the intermediate layer extruder and the above low density polyethylene was extruded by the outer- and inner-layer extruder. The so obtained co-extrudate was molded into an oval bottle having a symmetric three-layer laminate structure having an intermediate layer of the above blend and outer and inner layers of the above low density polyethylene. In 10 kinds of the so obtained bottles, the thickness ratio of outer layer : intermediate layer : inner layer was 4.5 : 1 : 4.5, the total thickness was about 600 μ and the inner volume was about 280 cc. With respect to each of these bottles, the oxygen gas permeability $QO_2$, water loss Lw and average interlaminar peel strength Sp were determined according to the methods described in the text of the specification. The kind of the third component in the blend layer (intermediate layer) and obtained data of $QO_2$, Lw and Sp are shown in Table 21.

For comparison, bottles were molded by employing as the ingredients of the blend layer the above low density polyethylene having a melt index of 2.1 g/10 min and the above ethylene-vinyl acetate copolymer saponified product alone, namely without using the third component. The mixing ratio of both the polymers, the extrusion machine, the laminate structure, the thickness ratio, the total thickness, the inner volume and the bottle configuration were the same as above. With respect to these bottles, properties $QO_2$, Lw and Sp were determined. Results are shown in Table 21 (data given in columns C=0).

The above laminate structure bottles having a three-component blend layer were compared with the laminate structure bottles having a two-component blend layer in respect to the appearance condition App according to the method described in the text of the specification. Results are also shown in Table 21.

From the results shown in Table 21, it is seen that in bottles having a layer laminate structure and containing the carbonyl group-containing polymer in the blend layer the interlaminar peel strength and appearance conditions were improved without substantial damages given to the oxygen gas permeation resistance and water loss as compared with layer laminate bottles containing the two-component blend layer but in the case of layer laminate bottles containing the carbonyl group-free third component such improvements were hardly observed.

Table 21

| Kind of Third Component (C) in Blend Layer | (Blend Layer Composition; (PO/EV-1):C = (50/50):10) | | | APP (points) | |
|---|---|---|---|---|---|
| | $QO_2$ [cc/m day atm] | Lw [wt %] | Sp [g/2 cm] | C = 0 | C = 10.0 |
| PVAC | 26 | 0.8 | 580 | 2 | 19 |
| 6-Nylon | 25 | 0.8 | 550 | 0.5 | 20.5 |
| Surlyn-A | 23 | 0.8 | 590 | 0 | 21 |
| EVA | 24 | 0.8 | 580 | 0 | 21 |
| AGPE | 25 | 0.7 | 570 | 1 | 20 |
| EEA | 24 | 0.7 | 580 | 0 | 21 |
| PP | 28 | 0.7 | 370 | 10.5 | 10.5 |
| PIB | 29 | 0.8 | 360 | 9 | 12 |
| PS | 30 | 0.8 | 340 | 10 | 11 |
| SBR | 30 | 0.9 | 360 | 11.5 | 9.5 |
| (PO/EV-1):C=(50/50):0 | 30 | 0.8 | 360 | | |
| (PO/EV-1):C=(100/0):0 | 1090 | 0.7 | not peeled | | |
| (PO/EV-1):C=(0/100):0 | 2 | 0.8 | 0 | | |

EXAMPLE 19

100 parts by weight of a mixture containing a low density polyethylene (PO) having a density of 0.920 g/cc as measured according to ASTM D-1505 and a melt index of 2.1 g/10 min as measured according to ASTM D-1238 and an ethylene-vinyl acetate copolymer saponified product (EV-1) having an ethylene content of 25.4 mole %, a degree of saponification of 99.2% and an intrinsic viscosity of 0.13 l/g, at a mixing weight ratio of PO : EV-1 of 80 : 20, 50 : 50 or 20 : 80, was incorporated with 0.5 to 25.0 parts by weight of an ethylene-vinyl acetate copolymer having a melt index of 2.4 g/10 min and a carbonyl concentration of 450 milliequivalents per g of the polymer, as a third component (C), and the mixture was dry-blended at room temperature for 5 minutes. Then, 20 kinds bottles shown in Table 22 were molded under the same molding conditions as in Example 18 by employing the same extrusion molding machine as used in Example 18. The above-mentioned blend was extruded to form an intermediate, and as in Example 18, the inner and outer layers were composed of a low density polyethylene having a density of 0.920 g/cc and a melt index of 0.34 g/10 min. The thickness ratio, the total thickness, the inner volume and the configuration of bottles molded in this Example were the same as those of the bottles molded in Example 18. The oxygen gas permeability $QO_2$ and the average interlaminar peel strength Sp were determined according to the methods described in the test of the specification. The mixing weight ratio of the above low density polyethylene having a melt index of 2.1 g/10 min, the above ethylene-vinyl acetate copolymer saponified product and the above ethylene-vinyl acetate copolymer incorporated as the third component (C) in the blend layer (intermediate layer), and results of the determination of the oxygen gas permeability and average interlaminar peel strength are shown in Table 22. From the results shown in Table 22, it is seen that the Sp value was increased by addition of the ethylene-vinyl acetate copolymer (third component), and that although the oxygen gas permeation resistance inherent of the ethylene-vinyl acetate copolymer saponified product was not substantially damaged when the mixing ratio of the third component was lower than about 15 parts by weight, the oxygen permeability was increased and the gas-barrier property was damaged when the mixing ratio of the third component was about 25.0 parts by weight or higher.

Comparison of the above bottles comprising the third component (the above ethylene-vinyl acetate copolymer in the blend layer (intermediate layer), with bottles having a blend layer composed of the above ethylene-vinyl acetate copolymer saponified product and the above low density polyethylene alone, was made on the appearance condition App according to the method described in the text of the specification.

Results are shown in Table 23. From these results, it is seen that the appearance condition of the bottle was improved by addition of the third component.

Table 22

| Composition of Blend Layer (PO/EV-1) : C | $Qo_2$ [cc/m². day.atm] | Sp [g/2 cm] |
| --- | --- | --- |
| (80 / 20) : 0 | 163 | 810 |
| (80 / 20) : 0.5 | 161 | 1010 |
| (80 / 20) : 5.0 | 157 | 1240 |
| (80 / 20) : 15.0 | 162 | 1290 |
| (80 / 20) : 25.0 | 186 | 1310 |
| (50 / 50) : 0 | 30 | 360 |
| (50 / 50) : 0.5 | 29 | 500 |
| (50 / 50) : 5.0 | 24 | 550 |
| (50 / 50) : 15.0 | 30 | 600 |
| (50 / 50) : 25.0 | 42 | 610 |
| (20 / 80) : 0 | 8 | 150 |
| (20 / 80) : 0.5 | 7 | 250 |
| (20 / 80) : 5.0 | 6 | 270 |
| (20 / 80) : 15.0 | 8 | 280 |
| (20 / 80) : 25.0 | 13 | 300 |
| (0 / 100) : 0 | 2 | 0 |
| (0 / 100) : 0.5 | 2 | 10 |
| (0 / 100) : 5.0 | 1 | 14 |
| (0 / 100) : 15.0 | 2 | 15 |
| (0 / 100) : 25.0 | 4 | 17 |

Table 23

| Composition of Blend Layer (PO/EV-1) : C | App [points] | |
| --- | --- | --- |
| | C = C | C = O |
| (80 / 20) : 0.5 | 12.5 | 8.5 |
| (80 / 20) : 5.0 | 17 | 4 |
| (80 / 20) : 15.0 | 21 | 0 |
| (80 / 20) : 25.0 | 21 | 0 |
| (50 / 50) : 0.5 | 14.5 | 6.5 |
| (50 / 50) : 5.0 | 19 | 2 |
| (50 / 50) : 15.0 | 20.5 | 0.5 |
| (50 / 50) : 25.0 | 21 | 0 |
| (20 / 80) : 0.5 | 16 | 5 |
| (20 / 80) : 5.0 | 19.5 | 1.5 |
| (20 / 80) : 15.0 | 21 | 0 |
| (20 / 80) : 25.0 | 21 | 0 |

EXAMPLE 20

A low density polyethylene having a density of 0.920 g/cc as measured according to ASTM D-1505 and a melt index of 0.3 g/10 min as measured according to ASTM D-1238 was mixed with an ethylene-vinyl acetate copolymer saponified product having an ethylene content of 25.4 mole %, a degree of saponification of 99.2% and an intrinsic viscosity of 0.10 l/g, at a mixing weight ratio of 100 : 0, 98 : 2, 90 : 10, 80 : 20, 50 : 50, 20 : 80, 10 : 90, 2 : 98 or 0 : 100. Then, 100 parts by weight of the above mixture was incorporated with 5.0 parts by weight of Surlyn A (ionomer of $Na^+$ type having a carbonyl concentration of 160 milliequivalents per 100 g of the polymer and a melt index of 1.2 g/10 min; product of Du Pont, U.S.A.). The mixture was dry-blended at room temperature for 3 minutes by means of a Henschel mixer.

The so obtained dry blend was heated, kneaded and pelletized by means of a pelletizer having a screw of a diameter of 40 mm and an effective length of 1120 mm (screw rotation rate = 34 rpm; die temperature 185°C.). The so obtained pelletized blend and the above-mentioned low density polyethylene were co-extruded by means of an intermediate layer extruder having a screw of a diameter of 40 mm and an effective length of 800 mm, an outer- and inner-layer extruder installed with a screw of a diameter of 65 mm and an effective length of 1430 mm and provided with an adaptor having a two-branched melt channel, and a three-ply die maintained at 190°C. The above blend was extruded by the intermediate layer extruder and the above low density polyethylene was extruded by the outer- and inner-layer extruder. The co-extrudate was molded into an oval bottle having a symmetric three-layer laminate structure of an intermediate layer of the above three-component blend and outer and inner layers of the low density polyethylene, according to a known blow molding method. In each of the so obtained bottles, the thickness ratio of outer layer : intermediate layer : inner layer was 4.5 : 1 : 4.5 and the average total thickness was about 600 μ. The inner volume of each bottom was about 280 cc. With respect to each bottle, the oxygen gas permeability $QO_2$, water loss Lw, average interlaminar peel strength Sp and appearance App were determined according to the methods described in the text of the specification. The mixing ratio of the low density polyethylene (PO), the ethylene-vinyl acetate copolymer saponified product (EV−1) and the Surlyn A (C) in the blend layer (intermediate layer) and the properties, $QO_2$, Lw, Sp and App of the bottles are shown in Table 24.

For comparison, bottles of a laminate structure were molded by employing the above low density polyethylene and ethylene-vinyl acetate copolymer saponified product as ingredients of the blend layer without using the above Surlyn A. (The mixing ratio of both polymers, the extrusion machine, the laminar structure of the bottle, the thickness ratio, the total thickness, the inner volume and the bottle configuration were the same as above.) Results of the determination of $QO_2$, Lw, Sp and App made on these bottles are also shown in Table 24 (data appearing on columns of C = O).

length of 800 mm, and outer- and inner-layer extruder installed with a screw of a diameter of 65 mm and an effective length of 1430 mm and provided with an adaptor having a two-branched melt channel, and a three-ply die maintained at 210°C. The above pelletized blend was extruded by the intermediate layer extruder and the above high density polyethylene was extruded by the outer- and iner-layer extruder. The co-extrudate was molded into an oval bottle having a symmetric three-layer laminate structure of an intermediate layer of the above three-component blend and Table 24

| Composition of Blend Layer (PO/Ev-1): C | $QO_2$ [cc/m².day.atm] | | Lw [wt %] | | Sp [g/2 cm] | | App [points] | |
|---|---|---|---|---|---|---|---|---|
| | C = 0 | C = 5.0 | C = 0 | C = 5.0 | C = 0 | C = 5.0 | C = 0 | C = 5.0 |
| (100/0) : C | 1090 | 1120 | 0.7 | 0.8 | not peeled | not peeled | 9 | 12 |
| ( 98/2) : C | 985 | 862 | 0.7 | 0.7 | not peeled | not peeled | 6.5 | 14.5 |
| ( 90/10) : C | 670 | 579 | 0.7 | 0.7 | not peeled | not peeled | 2 | 19 |
| ( 80/20) : C | 163 | 145 | 0.7 | 0.7 | 810 | 1090 | 1 | 20 |
| ( 50/50) : C | 30 | 22 | 0.8 | 0.8 | 360 | 590 | 0 | 21 |
| ( 20/80) : C | 8 | 6 | 0.7 | 0.7 | 150 | 400 | 0 | 21 |
| ( 10/90) : C | 5 | 4 | 0.8 | 0.8 | 80 | 320 | 0 | 21 |
| ( 2/98) : C | 3 | 2 | 0.8 | 0.7 | 0 | 210 | 3.5 | 17.5 |
| (0 /100): C | 2 | 2 | 0.8 | 0.7 | 0 | 180 | 10.5 | 10.5 |

EXAMPLE 21

A high density polyethylene having a density of 0.950 g/cc as measured according to ASTM D-1505 and a melt index of 0.2 g/10 min as measured according to ASTM D-1238 was mixed with an ethylene-vinyl acetate copolymer saponified product having an ethylene content of 25.4 mole %, a degree of saponification of 99.2% and an intrinsic viscosity of 0.13 l/g, at a mixing weight ratio of 100 : 0, 98 : 2, 90: 10, 80 : 20, 50 : 50, 20 : 80, 10 : 90, 2 : 98 or 0 : 100. Then, 100 parts by weight of the above mixture was incorporated with 15.0 parts by weight of Surlyn A (ionomer of Na+ type having a carbonyl concentration of 160 milliequivalents per 100 g of the polymer and a melt index of 1.2 g/10 min; product of Du Pont, U.S.A.). The mixture was dry-blended at room temperature for 3 minutes by means of a Henschel mixer.

The so obtained dry blend was heated, kneaded and pelletized by means of a pelletizer having a screw of a diameter of 40 mm and an effective length of 1120 mm (screw rotation rate = 34 rpm; die temperature = 185°C.). The so obtained pelletized blend and the above-mentioned low density polyethylene were co-extruded by means of an intermediate layer extruder having a screw of a diameter of 40 mm and an effective outer and inner layers of the high density polyethylene, according to a known blow molding method. In each of the so obtained bottles, the thickness ratio of outer layer : intermediate layer : inner layer was 4.5 : 1 : 4.5 and the average total thickness was about 600 μ. The inner volume of each bottom was about 280 cc. With respect to each bottle, the oxygen gas permeability $QO_2$, water loss Lw, average interlaminar peel strength Sp and appearance App were determined according to the methods described in the text of the specification. The mixing ratio of the high density polyethylene (PO), the ethylene-vinyl acetate copolymer saponified product (EV—1) and the Surlyn A (C) in the blend layer (intermediate layer) and the properties, $QO_2$, Lw, Sp and App of the bottles are shown in Table 25.

For comparison, bottles of a laminate structure were molded by employing the above high density polyethylene and ethylene-vinyl acetate copolymer saponified product as ingredients of the blend layer without using the above Surlyn A. (The mixing ratio of both polymers, the extrusion machine, the laminar structure of the bottle, the thickness ratio, the total thickness, the inner volume and the bottle configuration were the same as above.) Results of the determination of $QO_2$, Lw, Sp and App made on these bottles are also shown in Table 25 (data appearing on columns of C = 0).

Table 25

| Composition of Blend Layer (PO/Ev-1) : C | $Qo_2$ [cc/m².day.atm] | | Lw [wt %] | | Sp [g/2 cm] | | App [points] | | $f_{10}$ [%] | |
|---|---|---|---|---|---|---|---|---|---|---|
| | C = 0 | C = 15.0 | C = 0 | C = 15.0 | C = 0 | C = 15.0 | C = 0 | C = 15.0 | C = 0 | C = 15.0 |
| (100/0) : C | 452 | 511 | 0.2 | 0.3 | not peeled | not peeled | 11.5 | 9.5 | 0 | 0 |
| (98/2) : C | 376 | 344 | 0.2 | 0.2 | not peeled | not peeled | 7.5 | 13.5 | 0 | 0 |
| (90/10) : C | 259 | 231 | 0.2 | 0.2 | not peeled | not peeled | 5.5 | 15.5 | 0 | 0 |
| (80/20) : C | 141 | 120 | 0.2 | 0.2 | 820 | not peeled | 6 | 15 | 0 | 0 |
| (50/50) : C | 18 | 15 | 0.2 | 0.2 | 390 | not peeled | 5.5 | 15.5 | 0 | 0 |
| (20/80) : C | 10 | 9 | 0.2 | 0.2 | 190 | 660 | 5 | 16 | 0 | 0 |

Table 25-continued

| Composition of Blend Layer (PO/Ev-1) : C | $QO_2$ [cc/m².day.atm] | | Lw [wt %] | | Sp [g/2 cm] | | App [points] | | $f_{10}$ [%] | |
|---|---|---|---|---|---|---|---|---|---|---|
| | C = 0 | C = 15.0 | C = 0 | C = 15.0 | C = 0 | C = 15.0 | C = 0 | C = 15.0 | C = 0 | C = 15.0 |
| (10/90) : C | 7 | 6 | 0.2 | 0.2 | 110 | 600 | 7 | 14 | 0 | 0 |
| (2/98) : C | 3 | 4 | 0.2 | 0.2 | 0 | 560 | 8 | 13 | 10 | 0 |
| (0/100) : C | 2 | 4 | 0.2 | 0.2 | 0 | 540 | 9 | 12 | 10 | 0 |

EXAMPLE 22

A low density polyethylene having the same density and melt index as those of the low polyethylene used in Example 20 was mixed with an ethylene-vinyl acetate copolymer saponified product having the same ethylene content, saponification degree and intrinsic viscosity as those of the saponified copolymer used in Example 20, at a mixing weight ratio of 100 : 0, 98 : 2, 90 : 10, 80 : 20, 50 : 50, 20 : 80, 10 : 90, 2 : 98 or 0 : 100. Then, 100 parts by weight of the above mixture was incorporated with 10.0 parts by weight of Surlyn A (ionomer of $Na^+$ type having a carbonyl concentration of 160 milliequivalents per 100 g of the polymer and a melt index of 1.2 g/10 min; product of Du Pont, U..- S.A.). The mixture was dry-blended at room temperature for 3 minutes by means of a Henschel mixer.

The so obtained dry blend and the above-mentioned low density polyethylene were co-extruded by means of an intermediate layer extruder having a screw of a diameter of 40 mm and an effective length of 800 mm, an outer- and inner-layer extruder installed with a screw of a diameter of 65 mm and an effective length of 1430 mm and provided with an adaptor having a two-branched melt channel, and a three-ply die maintained at 190°C. The above blend was extruded by the intermediate layer extruder and the above low density polyethylene was extruded by the outer- and inner-layer extruder. The co-extrudate was molded into an oval bottle having a symmetric three-layer laminate structure of an intermediate layer of the above three-component blend and outer and inner layers of the low density polyethylene, according to a known blow molding method. In each of the so obtained bottles, the thickness ratio of outer layer : intermediate layer : inner layer was 10 : 1 : 10 and the average total thickness was about 1.2 mm. The inner volume of each bottle was about 850 cc. With respect to each bottle, the oxygen gas permeabilty $QO_2$, water loss Lw, average interlaminar peel strength Sp and appearance App were determined according to the methods described in the text of the specification. The mixing ratio of the low density polyethylene (PO), the ethylene-vinyl acetate copolymer saponified product (EV-1) and the Surlyn A (C) in the blend layer (intermediate layer) and the properties, $QO_2$, Lw, Sp and App of the bottles are shown in Table 26.

For comparison, bottles of a laminate structure were molded by employing the above low density polyethylene and ethylene-vinyl acetate copolymer saponified product as ingredients of the blend layer without using the above Surlyn A. (The mixing ratio of both polymers, the extrusion machine, the laminar structure of the bottle, the thickness ratio, the total thickness, the inner volume and the bottle configuration were the same as above.) Results of the determination of $QO_2$, Lw, Sp and App made on these bottles are also shown in Table 26 (data appearing on columns of C = 0).

Table 26

| Composition of Blend Layer (PO/Ev-1) : C | $QO_2$ [cc/m².day.atm] | | Lw [wt %] | | Sp [g/2 cm] | | App [points] | | $f_{10}$ [%] | |
|---|---|---|---|---|---|---|---|---|---|---|
| | C = 0 | C = 15.0 | C = 0 | C = 15.0 | C = 0 | C = 15.0 | C = 0 | C = 15.0 | C = 0 | C = 15.0 |
| (100/0) : C | 577 | 591 | 0.3 | 0.3 | not peeled | not peeled | 11 | 10 | 0 | 0 |
| (98/2) : C | 496 | 485 | 0.3 | 0.4 | not peeled | not peeled | 8.5 | 12.5 | 0 | 0 |
| (90/10) : C | 325 | 299 | 0.4 | 0.3 | not peeled | not peeled | 6.5 | 14.5 | 0 | 0 |
| (80/20) : C | 92 | 81 | 0.3 | 0.3 | 1040 | not peeled | 5 | 16 | 0 | 0 |
| (50/50) : C | 16 | 13 | 0.3 | 0.3 | 690 | not peeled | 6 | 15 | 10 | 0 |
| (20/80) : C | 6 | 5 | 0.3 | 0.4 | 400 | not peeled | 5 | 16 | 0 | 0 |
| (10/90) : C | 4 | 3 | 0.4 | 0.4 | 230 | 1070 | 6.5 | 14.5 | 0 | 0 |
| (2/98) : C | 2 | 2 | 0.4 | 0.4 | 90 | 660 | 7 | 14 | 0 | 0 |
| (0/100) : C | 1 | 1 | 0.4 | 0.4 | 0 | 490 | 11.5 | 9.5 | 0 | 0 |

EXAMPLE 23

A low density polyethylene having the same density and melt index as those of the low density polyethylene used in Example 22 was mixed with an ethylene-vinyl acetate copolymer saponified product having the same ethylene content, saponification degree and intrinsic viscosity as those of the saponified copolymer used in Example 22, at a mixing weight ratio of 100 : 0, 90 : 10, 50 : 50, 10 : 90, or 0 : 100. Then, 100 parts by weight of the above mixture was incorporated with 10.0 parts by weight of Surlyn A (ionomer of $Na^+$ type having a carbonyl concentration of 160 milliequivalents per 100 g of the polymer and a melt index of 1.2 g/10 min; product of Du Pont, U.S.A.). The mixture was dry-blended at room temperature for 3 minutes by means of a Henschel mixer.

The so obtained dry blend and a mixture of 100 parts by weight of said low density polyethylene and 5 parts by weight of the above Surlyn A by means of an intermediate layer extruder having a screw of a diameter of 40 mm and an effective length of 800 mm, an outer- and inner-layer extruder installed with a screw of a diameter of 65 mm and an effective length of 1430 mm and provided with an adaptor having a two-branched melt channel, and a three-ply die maintained at 190°C. The above dry blend was extruded by the intermediate layer extruder and the above mixture of the low density polyethylene and Surlyn A was extruded by the outer- and inner-layer extruder. The co-extrudate was molded into an oval bottle having a symmetric three-layer laminate structure of an intermediate layer of the above three-component blend and outer and inner layers of the mixture of the low density polyethylene and Surlyn A, according to a known blow molding method. In each of the so obtained bottles, the thickness ratio of outer layer : intermediate layer : inner layer was 10 : 1 : 10 and the average total thickness was about 1.2 mm. The inner volume of each bottom was about 850 cc. With respect to each bottle, the oxygen gas permeability $QO_2$, water loss Lw, average interlaminar peel strength Sp and appearance App were determined according to the methods described in the text of the specification. The mixing ratio of the low density polyethylene (PO), the ethylene-vinyl acetate copolymer saponified product (EV–1) and the Surlyn A (C) in the blend layer (intermediate layer) and the properties, $QO_2$, Lw, Sp and App of the bottles are shown in Table 27.

For comparision, bottles of a laminate structure were molded by employing the above low density polyethylene as ingredient of the outer and inner layers without using the above Surlyn A. (The mixing ratio of blend layer polymers, the extrusion machine, the laminar structure of the bottle, the thickness ratio, the total thickness, the inner volume and the bottle configuration were the same as above.) Results of the determination of $QO_2$, Lw, Sp and App made on these bottles are also shown in Table 27.

10.0 parts by weight of Surlyn A (ionomer of $Na^+$ type having a carbonyl concentration of 160 milliequivalents per 100 g of the polymer and a melt index of 1.2 g/10 min; product of Du Pont, U.S.A.). The mixture was dry-blended at room temperature for 3 minutes by means of a Henschel mixer. The so obtained dry blend and a dry blended mixture of 100 parts by weight of the above-mentioned low density polyethylene, 5 parts of the above saponified copolymer and 10 parts by weight of the above surlyn A were co-extruded by means of an intermediate layer extruder having a screw of a diameter of 40 mm and an effective length of 800 mm, an outer- and inner-layer extruder installed with a screw of a diameter of 65 mm and an effective length of 1430 mm and provided with an adaptor having a two-branched melt channel, and a three-ply die maintained at 190°C. The former blend was extruded from the intermediate layer extruder and the latter blend was extruded from the outer- and inner-layer extruder. The co-extrudate was molded into an oval bottle having a symmetric three-layer laminate structure of an intermediate layer of the former blend and outer and inner layers of the latter blend according to a known blow molding method. In each of the so obtained bottles, the thickness ratio of outer layer : intermediate layer : inner layer was 10 : 1 : 10 and the average total thickness was about 1.2 mm. The inner volume of each bottom was about 850 cc. With respect to each bottole, the oxygen gas permeability $QO_2$, water loss Lw, average interlaminar peel strength Sp and appearance App were determined according to the methods described in the text of the specification. The mixing ratio of the low density polyethylene (PO), the ethylene-vinyl acetate copolymer saponified product (EV–1) and the Surlyn A (C) in the blend layer (intermediate layer) and the properties, $QO_2$, Lw, Sp and App of the bottles are shown in Table 28.

For comparison, bottles of a laminate structure were

Table 27

| Composition of Blend Layer (PO/Ev-1) : C | $Qo_2$ [cc/m².day.atm] | | Sp [g/2 cm] | | App [points] | |
|---|---|---|---|---|---|---|
| | X | Y | X | Y | X | Y |
| (100/0) : 10 | 591 | 605 | not peeled | not peeled | 11 | 10 |
| (90/10) : 10 | 299 | 301 | not peeled | not peeled | 10.5 | 10.5 |
| (50/50) : 10 | 13 | 15 | not peeled | not peeled | 11 | 10 |
| (10/90) : 10 | 3 | 4 | 1070 | 1290 | 9.5 | 11.5 |
| (0/100) : 10 | 1 | 1 | 490 | 550 | 10 | 11 |

PO : low density polyethylene
X : PO alone was used in outer and inner layers
Y : mixture of 100 parts by weight of PO and 5 parts by weight of Surlyn A was used in outer and inner layers

EXAMPLE 24

A low density polyethylene having the same density and melt index as those of the low density polyethylene as used in Example 22 was mixed with an ethylene-vinyl acetate copolymer saponified product having the same ethylene content, saponification degree and intrinsic viscosity as those of the saponified copolymer used in Example 22, at a mixing weight ratio of 100 : 0, 90 : 10, 50 : 50, 10 : 90, or 0 : 100. Then, 100 parts by weight of the above mixture was incorporated with molded by employing the above low density polyethylene alone in the outer and inner layers without using the above saponified copolymer and Surlyn A. (The mixing ratio of the polymers in the blend layers, the extrusion machine, the laminar structure of the bottle, the thickness ratio, the total thickness, the inner volume and the bottle configuration were the same as above.) Results of the determination of $QO_2$, Lw, Sp and App made on these bottles are also shown in Table 28 (data appearing on columns of X).

Table 28

| Composition of Blend Layer (PO/Ev-1) : C | $QO_2$ [cc/m².day.atm] | | Lw [wt %] | | Sp [g/2 cm] | | App [points] | |
|---|---|---|---|---|---|---|---|---|
| | X | Z | X | Z | X | Z | X | Z |
| (100/0) : 10 | 591 | 505 | 0.3 | 0.4 | not peeled | not peeled | 12 | 9 |
| (90/10) : 10 | 299 | 180 | 0.4 | 0.5 | not peeled | not peeled | 10.5 | 10.5 |
| (50/50) : 10 | 13 | 10 | 0.3 | 0.5 | not peeled | not peeled | 11 | 10 |
| (10/90) : 10 | 3 | 2 | 0.4 | 0.5 | 1070 | not peeled | 10 | 11 |
| (0/100) : 10 | 1 | <1 | 0.4 | 0.5 | 490 | 760 | 11.5 | 9.5 |

PO : low density polyethylene
X : low density polyethylene alone was used in outer and inner layers
Z : mixture of 100 parts by weight of low density polyethylene, 5 parts by weight of saponified copolymer and 10 parts by weight of Surlyn A was used in outer and inner layers.

EXAMPLE 25

A low density polyethylene having a density of 0.920 g/cc as measured according to ASTM D-1505 and a melt index of 0.3 g/10 min as measured according to ASTM D-1238 was mixed with an ethylene-vinyl acetate copolymer saponified product having an ethylene content of 49.4 mole %, a degree of saponification of 96.3% and an intrinsic viscosity of 0.07 l/g, at a mixing weight ratio of 100 : 0, 98 : 2, 90 : 10, 80 : 20, 50 : 50, 20 : 80, 10 : 90, 2 : 98 or 0 : 100. Then, 100 parts by weight of the above mixture was incorporated with 10.0 parts by weight of Surlyn A (ionomer of Na+ type having a carbonyl concentration of 160 milliequivalents per 100 g of the polymer and a melt index of 1.2 g/10 min; product of Du Pont, U.S.A.). The mixture was dry-blended at room temperature for 3 minutes by means of a Henschel mixer.

The so obtained dry blend and the above-mentioned saponified copolymer were co-extruded by means of an intermediate layer extruder having a screw of a diameter of 40 mm and an effective length of 800 mm, an outer- and inner-layer extruder installed with a screw of a diameter of 65 mm and an effective length of 1430 mm and provided with an adaptor having a two-branched melt channel, and a three-ply die maintained at 175°C. The above blend was extruded by the intermediate layer extruder and the above saponified copolymer was extruded by the outer- and inner-layer extruder. The co-extrudate was molded into an oval bottle having a symmetric three-layer laminate structure of an intermediate layer of the above three-component blend and outer and inner layers of the above saponified copolymer, according to a known blow molding method. In each of the so obtained bottles, the thickness ratio of outer layer : intermediate layer : inner layer was 4.5 : 1 : 4.5 and the average total thickness was about 600 μ. The inner volume of each bottom was about 280 cc. With respect to each bottle, the oxygen gas permeability $QO_2$, water loss Lw, average interlaminar peel strength Sp and appearance App were determined according to the methods described in the text of the specification. The mixing ratio of the low density polyethylene (PO), the ethylene-vinyl acetate copolymer saponified product (EV-2 and the Surlyn A (C) in the blend layer (intermediate layer) and the properties, $QO_2$, Lw, Sp and App of the bottles are shown in Table 29.

For comparison, bottles of a laminate structure were molded by employing the above low density polyethylene and ethylene-vinyl acetate copolymer saponified product as ingredients of the blend layer without using the above Surlyn A. (The mixing ratio of both polymers, the extrusion machine, the laminar structure of the bottle, the thickness ratio, the total thickness, the inner volume and the bottle configuration were the same as above.) Results of the determination of $QO_2$, Lw, Sp and App made on these bottles are also shown in Table 29 (data appearing on columns of C = 0).

Table 29

| Composition of Blend Layer (PO/EV-2) : C | $QO_2$ [cc/m².day.atm] | | Lw [wt %] | | Sp [g/2 cm] | | App [points] | |
|---|---|---|---|---|---|---|---|---|
| | C = 0 | C = 10.0 | C = 0 | C = 10.0 | C = 0 | C = 10.0 | C = 0 | C = 10.0 |
| (100/0) : C | 17 | 18 | 0.7 | 0.8 | 10 | 480 | 12 | 9 |
| (98/2) : C | 18 | 17 | 0.7 | 0.8 | 270 | 750 | 5.5 | 15.5 |
| (90/10) : C | 17 | 17 | 0.8 | 0.8 | 580 | 920 | 1 | 20 |
| (80/20) : C | 17 | 17 | 0.9 | 1.0 | 810 | 1250 | 0 | 21 |
| (50/50) : C | 17 | 17 | 1.0 | 1.0 | 1120 | not peeled | 0 | 21 |
| (20/80) : C | 17 | 17 | 1.5 | 1.4 | not peeled | not peeled | 0 | 21 |
| (10/90) : C | 17 | 17 | 2.7 | 2.6 | not peeled | not peeled | 2 | 19 |
| (2/98) : C | 17 | 17 | 3.9 | 3.7 | not peeled | not peeled | 4.5 | 16.5 |
| (0/100) : C | 17 | 17 | 4.1 | 3.9 | not peeled | not peeled | 10.5 | 10.5 |

EXAMPLE 26

A high density polyethylene having a density of 0.950 g/cc as measured according to ASTM D-1505 and a melt index of 0.2 g/10 min as measured according to ASTM D-1238 was mixed with an ethylene-vinyl acetate copolymer saponified product having an ethylene content of 25.4 mole %, a degree of saponification of 99.2% and an intrinsic viscosity of 0.08 l/g, at a mixing weight ratio of 100 : 0, 50 : 50, or 0 : 100. Then, 100 parts by weight of the above mixture was incorporated with 15.0 parts by weight of an acrylic acid-grafted polyethylene having a carbonyl concentration of 250 milliequivalents per 100 g of the polymer and a melt index of 0.9 g/10 min. The mixture was dry-blended at room temperature for 3 minutes by means of a Henschel mixer.

The so obtained dry blend was heated, kneaded and pelletized by means of a pelletizer having a screw of a diameter of 40 mm and an effective length of 1120 mm (screw rotation rate = 34 rpm; die temperature = 185°C.) The so obtained pelletized blend and the above-mentioned high density polyethylene were co-extruded by means of an intermediate layer extruder having a screw of a diameter of 40 mm and an effective length of 800 mm, an outer- and inner-layer extruder installed with a screw of a diameter of 65 mm and an effective length of 1430 mm and provided with an adaptor having a two-branched melt channel, and a three-ply die maintained at 210°C. The above blend was extruded by the intermediate layer extruder and the above low density polyethylene was extruded by the outer- and inner-layer extruder. The co-extrudate was molded into a cylindrical bottle having a symmetric three-layer laminate structure of an intermediate layer of the above three-component blend and outer and inner layers of the high density polyethylene, according to a known blow molding method. In each of the so obtained bottles, the thickness ratio of outer layer : intermediate layer : inner layer was 10 : 1 : 10 and the average total thickness was about 600 μ. The inner volume of each bottom was about 450 cc. With respect to each bottle, the oxygen gas permeability $QO_2$, water loss Lw, average interlaminar peel strength Sp and appearance App were determined according to the methods described in the text of the specification. The mixing ratio of the low density polyethylene (PO), the ethylene-vinyl acetate copolymer saponified product (EV-1) and the acrylic acid-grafted polyethylene (C) in the blend layer (intermediate layer) and the properties, $QO_2$, Lw, Sp and App of the bottles are shown in Table 30.

For comparison, bottles of a laminate structure were molded by employing the above high density polyethylene and ethylene-vinyl acetate copolymer saponified product as ingredients of the blend layer. (The mixing ratio of both polymers, the extrusion machine, the laminar structure of the bottle, the thickness ratio, the total thickness, the inner volume and the bottle configuration were the same as above.) Results of the determination of $QO_2$, Lw, Sp and App made on these bottles are also shown in Table 30 (data appearing on columns of C = 0).

Table 39

| Composition of Blend Layer (PO/Ev - 1) : C | $QO_2$ cc/m².day.atm | | Lw wt % | | Sp g/2 cm | | App points | |
|---|---|---|---|---|---|---|---|---|
| | C = 0 | C = 15.0 | C = 0 | C = 15.0 | C = 0 | C = 15.0 | C = 0 | C = 15.0 |
| (100/0) : C | 449 | 460 | 0.2 | 0.2 | not peeled | not peeled | 10.5 | 10.5 |
| (50/50) : C | 35 | 34 | 0.2 | 0.2 | 650 | 820 | 7.5 | 13.5 |
| (0/100) : C | 5 | 6 | 0.2 | 0.2 | 0 | 160 | 10 | 11 |

EXAMPLE 27

The pelletized blend obtained in Example 26 and a high density polyethylene having a density of 0.950 g/cc and a melt index of 0.2 g/10 min were co-extruded by means of an intermediate layer extruder having a screw of a diameter of 40 mm and an effective length of 800 mm, an outer- and inner-layer extruder installed with a screw of a diameter of 65 mm and an effective length of 1430 mm and provided with an adaptor having a two-branched melt channel, and a three-ply die maintained at 220°C. The above blend was extruded by the intermediate layer extruder and the above high density polyethylene was extruded by the outer- and inner-layer extruder. The co-extrudate was molded into a sheet having a symmetric three-layer laminate structure of an intermediate layer of the above three-component blend and outer and inner layers of the high density polyethylene, according to a known extrusion molding method using a P die. In each of the so obtained sheets, the thickness ratio of outer layer : intermediate layer : inner layer was 4.5 : 1 : 4.5 and the average total thickness was about 600 μ. With respect to each sheet, the oxygen gas permeability $QO_2$, average interlaminar peel strength Sp and appearance App were determined according to the methods described in the text of the specification. The mixing ratio of the high density polyethylene (PO), the ethylene-vinyl acetate copolymer saponified product (EV-1) and the acrylic acid-grafted polyethylene (C) in the blend layer (intermediate layer) and the properties, $QO_2$, Sp and App of the bottles are shown in Table 31.

For comparison, sheets of a laminate structure were molded by employing the above high density polyethylene and ethylene-vinyl acetate copolymer saponified product as ingredients of the blend layer without using the above acrylic acid-grafted polyethylene. (The mixing ratio of both polymers, the extrusion machine, the laminar structure of the sheet, the thickness ratio and the total thickness were the same as above.) Results of the determination of $QO_2$, Sp and App made on these bottles are also shown in Table 31 (data appearing on columns of C = 0).

Table 31

| Composition of Blend Layer (PO/EV - 1) : C | $QO_2$ cc/m².day.atm | | Sp g/2 cm | | App points | |
|---|---|---|---|---|---|---|
| | C = 0 | C = 15.0 | C = 0 | C = 15.0 | C = 0 | C = 15.0 |
| (100/0) : C | 903 | 907 | not peeled | not peeled | 11 | 10 |
| (50/50) : C | 36 | 37 | 630 | 790 | 5 | 16 |
| (0/100) : C | 5 | 6 | 0 | 140 | 10 | 11 |

EXAMPLE 28

An isotactic polypropylene having a density of 0.906 g/cc as measured according to ASTM D-1505 and a melt index of 0.8 g/10 min as measured according to ASTM D-1238 was mixed with an ethylene-vinyl acetate copolymer saponified product having an ethylene content of 25.4 mole %, a degree of saponification of 9.2% and an intrinsic viscosity of 0.16 l/g, at a mixing weight ratio of 100 : 0, 98 : 2, 90 : 10, 80 : 20, 50 : 50, 20 : 80, 10 : 90, 2 : 98 or 0 : 100. Then, 100 parts by weight of the above mixture was incorporated with 5.0 parts by weight of a maleic anhydride-modified polypropylene having a carbonyl concentration of 150 milliequivalents per 100 g of the polymer and a melt index of 6.1 g/10 min. The mixture was dry-blended at room temperature for 3 minutes by means of a Henschel mixer.

The so obtained dry blend and the above-mentioned saponified copolymer were co-extruded by means of an intermediate layer extruder having a screw of a diameter of 40 mm and an effective length of 800 mm, an outer- and inner-layer extruder installed with a screw of a diameter of 65 mm and an effective length of 1430 mm and provided with an adaptor having a two-branched melt channel, and a three-ply die maintained at 190°C. The above blend was extruded by the intermediate layer extruder and the above saponified copolymer was extruded by the outer- and inner-layer extruder. The co-extrudate was molded into an oval bottle having a symmetric three-layer laminate structure of an intermediate layer of the above three-component blend and outer and inner layers of the saponified copolymer, according to a known blow molding method. In each of the so obtained bottles, the thickness ratio of outer layer : intermediate layer : inner layer was 4.5 : 1 : 4.5 and the average total thickness was about 600 μ. The inner volume of each bottom was about 280 cc. With respect to each bottle, the oxygen gas permeability $QO_2$, water loss Lw, average interlaminar peel strength Sp and appearance App were determined according to the methods described in the text of the specification. The mixing ratio of the isotactic polypropylene (PO), the ethylene-vinyl acetate copolymer saponified product (EV-1) and the maleic anhydride-modified polypropylene (C) in the blend layer (intermediate layer) and the properties, $QO_2$, Lw Sp and App of the bottles are shown in Table 32.

For comparison, bottles of a laminate structure were molded by employing the above isotactic polypropylene and ethylene-vinyl acetate copolymer saponified product as ingredients of the blend layer without using the above Surlyn A maleic anhydride-modified polypropylene. (The mixing ratio of both polymers, the extrusion machine, the laminar structure of the bottle, the thickness ratio, the total thickness, the inner volume and the bottle configuration were the same as above.) Results of the determination of $QO_2$, Lw, Sp and App made on these bottles are also shown in Table 32 (data appearing on columns of C=0).

Table 32

| Composition of Blend Layer (PO/EV - 1) : C | $QO_2$ [cc/m².day.atm] | | Lw [wt %] | | Sp [g/2 cm] | | App [points] | |
|---|---|---|---|---|---|---|---|---|
| | C = 0 | C = 5.0 | C = 0 | C = 5.0 | C = 0 | C = 5.0 | C = 0 | C = 5.0 |
| (100/0) : C | <1 | <1 | 0.4 | 0.5 | 0 | 60 | 9.5 | 11.5 |
| (98/2) : C | <1 | <1 | 0.5 | 0.6 | 40 | 160 | 7.5 | 13.5 |
| (90/10) : C | <1 | <1 | 0.6 | 0.7 | 300 | 430 | 2.5 | 18.5 |
| (80/20) : C | <1 | <1 | 0.9 | 0.9 | 570 | 620 | 0 | 21 |
| (50/50) : C | <1 | <1 | 1.2 | 1.3 | 670 | 810 | 0 | 21 |
| (20/80) : C | <1 | <1 | 2.3 | 2.3 | 820 | 1090 | 0 | 21 |
| (10/90) : C | <1 | <1 | 3.6 | 3.6 | not peeled | not peeled | 1 | 20 |
| (2/98) : C | <1 | <1 | 4.8 | 4.8 | not peeled | not peeled | 10 | 11 |
| (0/100) : C | <1 | <1 | 6.3 | 6.3 | not peeled | not peeled | 12 | 9 |

EXAMPLE 29

A high density polyethylene having a density of 0.925 g/cc as measured according to ASTM D-1505 and a melt index of 0.2 g/10 min as measured according to ASTM D-1238 was mixed with an ethylene-vinyl acetate copolymer saponified product having an ethylene content of 25.4 mole %, a degree of saponification of 99.2%, and an intrinsic viscosity of 0.08 l/g, at a mixing weight ratio of 100 : 0, or 0 : 100. Then, 100 parts by weight of the above mixture was incorporated with 10.0 parts by weight of an ethylene-maleic anhydride copolymer having a carbonyl concentration of 420 milliequivalents per 100 g of the polymer and a melt index of 1.8 g/10 min. The mixture was dry-blended at room temperature for 3 minutes by means of a Henschel mixer.

The so obtained dry blend and the above-mentioned saponified copolymer were co-extruded by means of an inner layer extruder having a screw of a diameter of 40 mm and an effective length of 800 mm, an outer layer extruder installed with a screw of a diameter of 65 mm and an effective length of 1430 mm and a two-ply die maintained at 210°C. The above blend was extruded by the outer layer extruder and the above saponified copolymer was extruded by the inner layer extruder. The co-extrudate was molded into a cylindrical bottle having a symmetric two-layer laminate structure of an inner layer of the above saponified copolymer and an outer layer of the above blend according to a known blow molding method. In each of the so obtained bottles, the thickness ratio of outer layer: inner layer was 20 : 1 and the average total thickness was about 1.2 mm. The inner volume of each bottom was about 630 cc. With respect to each bottle, the oxygen gas permeability $QO_2$, water loss $Lw$, average interlaminar peel strength $Sp$ and appearance $App$ were determined according to the methods described in the text of the specification. The mixing ratio of the high density polyethylene (PO), the ethylene-vinyl acetate copolymer saponified product (EV-1) and the ethylene-maleic anhydride copolymer (C) in the blend layer (outer layer) and the properties, $QO_2$, $Lw$, $Sp$ and $App$ of the bottles are shown in Table 33.

For comparison, bottles of a laminate structure were molded by employing the above high density polyethylene and ethylene-vinyl acetate copolymer saponified product as ingredients of the blend layer without using the above ethylene-maleic anhydride copolymer. (The mixing ratio of both polymers, the extrusion machine, the laminar structure of the bottle, the thickness ratio, the total thickness, the inner volume and the bottle configuration were the same as above.) Results of the determination of $QO_2$, $Lw$, $Sp$ and $App$ made on these bottles are also shown in Table 33 (data appearing on columns of $C = 0$).

100 parts by weight of the above mixture was incorporated with 10.0 parts by weight of Surlyn A (ionomer of $Zn^+$ type having a carbonyl concentration of 210 milliequivalents per 100 g of the polymer and a melt index of 0.7 g/10 min; product of Du Pont, U.S.A.). The mixture was dry-blended at room temperature for 3 minutes by means of a Henschel mixer.

The so obtained dry blend and the above-mentioned medium density polyethylene were co-extruded by means of an inner layer extruder having a screw of a diameter of 40 mm and an effective length of 800 mm, an outer layer extruder installed with a screw of a diameter of 65 mm and an effective length of 1430 mm and a two-ply die maintained at 200°C. The above blend was extruded by the outer layer extruder and the above medium density polyethylene was extruded by the inner layer extruder. The co-extrudate was molded into an oval bottle having an asymmetric two-layer laminate structure of an outer layer of the above three-component blend and an inner layer of the medium density polyethylene, according to a known blow molding method. In each of the so obtained bottles, the thickness ratio of outer layer : inner layer was 1 : 20 and the average total thickness was about 1.2 mm. The inner volume of each bottom was about 650 cc. With respect to each bottle, the oxygen gas permeability $QO_2$, water loss $Lw$, average interlaminar peel strength $Sp$ and appearance $App$ were determined according to the methods described in the text of the specification. The mixing ratio of the medium density polyethylene (PO), the ethylene-vinyl acetate copolymer saponified product (EV-1) and the Surlyn A (C) in the blend layer (outer layer) and the properties, $QO_2$, $Lw$, $Sp$ and $App$ of the bottles are shown in Table 34.

For comparison, bottles of a laminate structure were molded by employing the above medium density polyethylene and ethylene-vinyl acetate copolymer saponified product as ingredients of the blend layer (outer layer) without using the above Surlyn A. (The mixing ratio of both polymers, the extrusion machine, the laminar structure of the bottle, the thickness ratio, the total thickness, the inner volume and the bottle configuration were the same as above.) Results of the determination of $QO_2$, $Lw$, $Sp$ and $App$ made on these bottles are also shown in Table 34 (data appearing on columns of $C = 0$).

Table 33

| Composition of Blend Layer (PO/EV-1) : C | $Qo_2$ cc/m².day.atm | | $Lw$ wt % | | $f_{10}$ % | | $Sp$ g/2 cm | | $App$ points | |
|---|---|---|---|---|---|---|---|---|---|---|
| | $C = 0$ | $C = 10.0$ | $C = 0$ | $C = 10.0$ | $C = 0$ | $C = 10.0$ | $C = 0$ | $C = 10.0$ | $C = 0$ | $C = 10.0$ |
| (100/0) : C | 2 | 2 | 0.2 | 0.4 | 10 | 10 | 0 | 130 | 11 | 10 |
| (80/20) : C | 2 | 2 | 0.5 | 0.6 | 40 | 20 | 420 | 660 | 0 | 21 |
| (0/100) : C | <1 | <1 | 6.3 | 6.0 | 100 | 90 | not peeled | not peeled | 11 | 10 |

EXAMPLE 30

A medium density polyethylene having a density of 0.935 g/cc as measured according to ASTM D-1505 and a melt index of 0.8 g/10 min as measured according to ASTM D-1238 was mixed with an ethylene-vinyl acetate copolymer saponified product having an ethylene content of 25.4 mole %, a degree of saponification of 99.2% and an intrinsic viscosity of 0.10 l/g, at a mixing weight ratio of 100 : 0, 80 : 20, or 0 : 100. Then, Table 34

| Composition of Blend Layer (PO/EV-1) : C | $Qo_2$ [cc/m².day.atm] | | $Lw$ [wt %] | | $Sp$ [g/2 cm] | | $App$ [points] | |
|---|---|---|---|---|---|---|---|---|
| | $C = 0$ | $C = 10.0$ | $C = 0$ | $C = 10.0$ | $C = 0$ | $C = 10.0$ | $C = 0$ | $C = 10.0$ |
| (100/0) : C | 711 | 719 | 0.5 | 0.5 | not peeled | not peeled | 11 | 10 |
| (20/80) : C | 8 | 7 | 0.6 | 0.6 | 270 | 710 | 0.5 | 20.5 |
| (0/100) : C | 2 | 2 | 0.6 | 0.5 | 0 | 390 | 10.5 | 10.5 |

EXAMPLE 31

A high density polyethylene having a density of 0.950 g/cc as measured according to ASTM D-1505 and a melt index of 0.2 g/10 min as measured according to ASTM-D 1238 and a low density polyethylene having a density of 0.920 g/cc and a melt index of 0.5 g/10 min were dry-blended at a mixing weight ratio of 50/50. The dry blend was heated and kneaded by means of a melletizer having a screw of a diameter of 40 mm and an effective length of 1120 mm (screw rotation rate = 50 rpm; die temperature = 200°C.) to obtain a medium density polyethylene having a density of 0.935 g/cc and a melt index of 0.3 g/10 min. The so obtained medium density polyethylene was mixed with an ethylene-vinyl acetate copolymer saponified product having an ethylene content of 25.4 mole %, a degree of saponification of 99.2% and an intrinsic viscosity of 0.10 l/g, at a mixing weight ratio of 100 : 0, 20 : 80, or 0 : 100. Then, 100 parts by weight of the above mixture was incorporated with 10.0 parts by weight of Surlyn A (ionomer of $Na^+$ type having a carbonyl concentration of 160 milliequivalents per 100 g of the polymer and a melt index of 1.2 g/10 min; product of Du Pont, U.S.A.). The mixture was dry-blended at room temperature for 3 minutes by means of a Henschel mixer.

The so obtained dry blend and the above-mentioned medium density polyethylene were co-extruded by means of an inner layer extruder having a screw of a diameter of 40 mm and an effective length of 800 mm, an outer layer extruder installed with a screw of a diameter of 65 mm and an effective length of 1430 mm and a two-ply die maintained at 200°C. The above blend was extruded by the outer layer extruder and the above medium density polyethylene was extruded by the inner layer extruder. The co-extrudate was molded into an oval bottle having an asymmetric two-layer laminate structure of an inner layer of the above medium density polyethylene and an outer layer of the three-component blend, according to a known blow molding method. In each of the so obtained bottles, the thickness ratio of outer layer : inner layer was 1 : 20 and the average total thickness was about 1.2 mm. The inner volume of each bottom was about 650 cc. With respect to each bottole, the oxygen gas permeability $QO_2$, water loss Lw, average interlaminar peel strength Sp and appearance App were determined according to the methods described in the text of the specification. The mixing ratio of the medium density polyethylene (PO), the ethylene-vinyl acetate copolymer saponified product (EV-1) and the Surlyn A (C) in the blend layer (outer layer) and the properties, $QO_2$, Lw, Sp and App of the bottles are shown in Table 35.

For comparison, bottles of a laminate structure were molded by employing the above medium density polyethylene and ethylene-vinyl acetate copolymer saponified product as ingredients of the blend layer (outer layer) without using the above Surlyn A. (The mixing ratio of both polymers, the extrusion machine, the laminar structure of the bottle, the thickness ratio, the total thickness, the inner volume and the bottle configuration were the same as above.) Results of the determination of $QO_2$, Lw, Sp and App made on these bottles are also shown in Table 35 (data appearing on columns of C = 0).

Table 35

| Composition of Blend Layer (PO/EV-1) : C | $QO_2$ cc/m².day.atm | | Lw wt % | | Sp g/2 cm | | App points | |
|---|---|---|---|---|---|---|---|---|
| | C = 0 | C = 10.0 | C = 0 | C = 10.0 | C = 0 | C = 10.0 | C = 0 | C = 10.0 |
| (100/0) : C | 729 | 740 | 0.5 | 0.5 | not peeled | not peeled | 10.5 | 10.5 |
| (20/80) : C | 7 | 7 | 0.5 | 0.5 | 350 | 800 | 1 | 20 |
| (0/100) : C | 2 | 2 | 0.5 | 0.5 | 0 | 440 | 11.5 | 9.5 |

EXAMPLE 32

A low density polyethylene having a density of 0.928 g/cc as measured according to ASTM D-1505 and a melt index of 3.0 g/10 min as measured according to ASTM D-1238 was mixed with an ethylene-vinyl acetate copolymer saponified product having an ethylene content of 25.4 mole %, a degree of saponification of 99.2% and an intrinsic viscosity of 0.16 l/g, at a mixing weight ratio of 100 : 0, 90 : 10, or 0 : 100. Then, 100 parts by weight of the above mixture was incorporated with 10.0 parts by weight of Surlyn A (ionomer of $Na^+$ type having a carbonyl concentration of 160 milliequivalents per 100 g of the polymer and a melt index of 1.2 g/10 min; product of Du Pont, U.S.A.). The mixture was dry-blended at room temperature for 3 minutes by means of a Henschel mixer.

The so obtained dry blend was heated, kneaded and pelletized by means of a transfer mix having a screw of a diameter of 82.5 mm and an effective length of 1335 mm (special kneader manufactured by Ishikawajima Harima Heavy Industries) (screw rotation rate = 34 rpm; die temperature = 185°C.). The so obtained pelletized blend and the above-mentioned saponified copolymer were coextruded by means of an inner layer extruder having a screw of a diameter of 40 mm and an effective length of 800 mm, an outer layer extruder installed with screw of a diameter of 65 mm and an effective length of 1430 mm and a two-ply inflation die maintained at 190°C. The above blend was extruded by the inner layer extruder and the above saponified copolymer was extruded by the outer layer extruder. The co-extrudate was molded into a film having an asymmetric two-layer laminate structure of an intermediate layer of the above three-component blend and an outer layer of the saponified copolymer, according to a known inflation molding method. In each of the so obtained film, the thickness ratio of outer layer : inner layer was 1 : 1 and the average total thickness was about 100 μ.

The oxygen gas permeability $QO_2$ of each of the so obtained film was determined according to the text of the specification to obtain results shown in Table 36. Results obtained when the determination was conducted while adjusting the outside relative humidity (relative humidity on the high pressure side) are also shown in Table 36.

The above laminate film was molded into a bag having a length of 170 mm and a width of 115 mm by means of a heat sealer. The resulting bag was filled with about 200 cc of water or edible oil and an opening was heat sealed. Then, the bag was allowed to stand at a temperature of 50°C. and a relative humidity of 10% for 21 days. The interlaminar delamination state was observed to obtain results shown in Table 37.

Table 37

| Composition of Blend Layer (PO/EV- 1): c | Change in Appearance (delamination state) after 21 days | | |
|---|---|---|---|
| | Content pf Bag | C = 0 | C = 10.0 |
| (100/0) : C | Water | O | O |
| | Edible Oil | X | O |
| (90/10) : C | Water | O | O |
| | Edible Oil | O | O |

O : delamination was not observed
X : delamination was observed

The appearance App was evaluated with respect to the above laminate film (film of C − 10.0 in the Table) and the laminate film having a blend layer free of the above Surlyn A (film of C = 0 in the above Table). The former film got 21 points but the score of the latter film was 0 point.

EXAMPLE 33

An ethylene-vinyl acetate copolymer saponified product having the same properties as those of the saponified copolymer used in Example 32 and the same kneaded pelletized blend as used in Example 32 were co-extruded by means of an inner layer extruder having a screw of a diameter of 40 mm and an effective length of 800 mm, an outer layer extruder installed with a screw of a diameter of 65 mm and an effective length of 1430 mm and a two-ply inflation die maintained at 190°C. The above blend was extruded by the outer layer extruder and the above saponfied copolymer was extruded by the inner-layer extruder. The co-extrudate was molded into a film having an asymmetric two-layer laminate structure of an inner layer of the above saponified copolymer and an outer layer of the above three-component blend, according to a known inflation molding method. In each of the so obtained films, the thickness ratio of outer layer : inner layer was 1 : 1 and the average total thickness was about 100 μ.

The oxygen gas permeability $QO_2$ of each of the so obtained films was determined according to the method described in the text of the specification to obtain results shown in Table 38. Results obtained when the measurement was conducted by adjusting the outside relative humidity (relative humidity on the high pressure side) are also shown in Table 38.

Table 38

| Composition of Blend Layer (PO/EV - 1) : C | Oxygen Permeability $Qo_2$ | | |
|---|---|---|---|
| | Outside Humidity | $Qo_2$ [cc/m².day.atm] C = 0 | C = 10.0 |
| (100/0) : C | 15 % R H | 2 | 2 |
| | 75 % R H | 2 | 3 |
| (90/10) : C | 15 % R H | 2 | 2 |
| | 75 % R H | 3 | 3 |

The above laminate film was molded into a bag of a length of 170 mm and a width of 115 mm by means of a heat sealer, and 200 cc of water or edible oil was filled in the so obtained bag. An opening was heat sealed and the bag was allowed to stand at a temperature of 50 C. and a relative humidity of 10% for 21 days. Then, the interlaminar delamination state was examined to obtain results shown in Table 39.

Table 39

| Composition of Blend Layer (PO/EV - 1) : C | Appearance Change after 21 Days | | |
|---|---|---|---|
| | Content | Delamination State C = 0 | C = 10.0 |
| (100/0) : C | Water | X | O |
| | Edible Oil | O | O |
| (90/10) : C | Water | O | O |
| | Edible Oil | O | O |

O : delamination was not observed
X : delamination was observed

The above laminate film (film of C = 10.0 in the Table) and the laminate film having a Surlyn A-free blend layer (film of C − 0 in the Table) were evaluated with respect to appearance App according to the method described in the text of the specification. Points of 19.5 were given to the former film, but the score of the latter film was only 1.5 points.

EXAMPLE 34

A high density polyethylene having a density of 0.950 g/cc and a melt index of 0.2 g/10 min, a low density polyethylene having a density of 0.920 g/cc and a melt index of 0.5 g/10 min and a polyisobutylene having a viscosity average molecular weight of about 1000000 were dry blended at a mixing weight ratio of 60 : 20 : 20. The resulting blend was heated, kneaded and pelletized by means of a pelletizer having a screw of a diameter of 40 mm and an effective length of 1120 mm (screw rotation ratio = 34 rpm; die temperature = 185°C.). The so obtained pelletized blend (PO-B) was mixed with an ethylene-vinyl acetate copolymer saponified product having the same physical properties as those of the saponified copolymer used in Example 32 at a mixing weight ratio of 100 : 0, 50 : 50, or 0 : 100. Then, 100 parts by weight of the above mixture was incorporated with 15.0 parts by weight of Surlyn A (ionomer of $Na^+$ type having a carbonyl concentration of 160 milliequivalents per 100 g of the polymer and a melt index of 1.2 g/10 min; product of Du Pont, U.S.A.). The mixture was dry-blended at room temperature for 3 minutes by means of a Henschel mixer.

The so obtained dry blend and the above-mentioned high density polyethylene were co-extruded by means of an inner layer extruder having a screw of a diameter of 40 mm and an effective length of 800 mm, an outer layer extruder installed with a screw of a diameter of 65 mm and an effective length of 1430 mm and a two-ply die maintained at 220°C. The above blend was extruded by the outer layer extruder and the above high density polyethylene was extruded by the inner-layer extruder. The co-extrudate was molded into an oval bottle having an asymmetric two-layer laminate structure of an outer layer of the above blend and an inner layer of the high density polyethylene, according to a known blow molding method. In each of the so obtained bottles, the thickness ratio of outer layer : inner layer was 1 : 4 and the average total thickness was about 850 $\mu$. The inner volume of each bottom was about 550 cc. With respect to each bottole, the oxygen gas permeability $QO_2$, water loss Lw, average interlaminar peel strength Sp and appearance App were determined according to the methods described in the text of the specification. The mixing ratio of the pelletized blend (PO-B), the ethylene-vinyl acetate copolymer saponified product (EV-1) and the Surlyn A (C) in the blend layer (outer layer) and the properties, $QO_2$, Lw, Sp and App of the bottles are shown in Table 40.

For comparison, bottles of a laminate structure were molded by employing the above high density polyethylene (PO-A) ethylene-vinyl acetate copolymer saponified product and Surlyn A as ingredients of the blend layer (outer layer) without using the above pelletized blend and by employing the above high density polyethylene and saponified product alone as ingredients of the blend layer without employing the pelletized blend or Surlyn A. (The mixing ratio of polymers in the blend layer, the extrusion machine, the laminar structure of the bottle, the thickness ratio, the total thickness, the inner volume and the bottle configuration were the same as above.) Results of the determination of $QO_2$, Lw Sp and App made on these bottles are also shown in Table 40.

From the results shown in Table 40, it is seen that the falling strength $f_{10}$ could be improved by addition of the polyisobutylene without substantial degradation of $QO_2$ and Sp.

Further, bottles formed by incorporating the above high density polyethylene (PO-A) into the blend layer and by incorporating the above pelletized blend (PO-B) were compared with respect to the appearance App to obtain results shown in Table 41.

From results of Tables 40 and 41, it is seen that the appearance could be improved by addition of Surlyn A as the component (C) and this improvement was not substantially damaged by addition of the polyisobutylene.

EXAMPLE 35

A high density polyethylene having a density of 0.950 g/cc as measured according to ASTM D-1505 and a melt index of 0.2 g/10 min as measured according to ASTM D-1238 was mixed with an ethylenevinyl acetate copolymer saponified product having an ethylene content of 40.1 mole %, a degree of saponification of 99.1% and an intrinsic viscosity of 0.09 l/g, at a mixing weight ratio of 60 : 40. Then, 100 parts by weight of the above mixture was incorporated with 10.0 parts by weight of Surlyn A (ionomer of $Zn^+$ type having a carbonyl concentration of 210 milliequivalents per 100 g of the polymer and a melt index of 0.7 g/10 min; product of Du Pont, U.S.A.) as a third component. The mixture was dry-blended at room temperature for 3 minutes by means of a Henschel mixer.

A two-component dry blend was similarly prepared without addition of the above Surlyn A.

Each of the so obtained dry blends, the above high density polyethylene and the above saponified copolymer were extruded with use of an intermediate layer extruder having a screw of a diameter of 40 mm and an effective length of 880 mm, an outer layer extruder and an inner layer extruder, each having a screw of a diameter of 35 mm and a length of 700 mm, and a three-ply die maintained at 215°C., in such a manner that the dry blend was extruded from the intermediate layer extruder, the above high density polyethylene was extruded from the outer layer extruder and the above saponified copolymer was extruded from the inner layer extruder. The co-extrudate was molded into a laminate structure bottle having an outer layer of the high density polyethylene, an intermediate layer of the blend and an inner layer of the saponified copolymer according to a known blow molding method. In each of the so obtained bottles, the thickness ratio of outer layer : intermediate layer : inner layer was 1 : 3 : 1 and the average total thickness was about 600 $\mu$. The inner volume of each bottom was about 500 cc.

For comparison, an asymmetric two-layer laminate bottle having a layer of the high density polyethylene alone and a layer of the above saponified copolymer alone (outer layer : inner layer thickness ratio = 1 : 4) was prepared without employing the above blend for the intermediate layer. The total thickness, configuration and inner volume of this comparative bottle were the same as those of the above bottle.

With respect to each of these bottles, the falling strength $f_{10}$ was determined according to the method described in the text of the specification. The data of the falling strength $f_{10}$ and the delamination state after the test are shown in Table 42.

Table 40

| Composition of Blend Layer (PO/EV -1) : C | $Qo_2$ cc/m².day.atm | | $f_{10}$ % | | Sp g/2 cm | | App points | |
|---|---|---|---|---|---|---|---|---|
| | C = 0 | C = 15.0 | C = 0 | C = 15.0 | C = 0 | C = 15.0 | C = 0 | C = 15.0 |
| (PO-A/EV-1) : C=(100/0): C | 761 | 764 | 10 | 10 | not peeled | not peeled | 10.5 | 10.5 |
| (PO-A/EV-1) : C=(50/50): C | 27 | 28 | 60 | 20 | 610 | 780 | 0 | 21 |
| (PO-B/EV-1) : C=(50/50): C | 29 | 29 | 30 | 0 | 620 | 800 | 0 | 21 |

PO-A: HDPE/LDPE/PIB=100/0/0
PO-B: HDPE/LDPE/PIB=60/20/20

Table 41

| App (points) | |
|---|---|
| PO-A | PO-B |
| 11 | 10 |

*Composition of Blend Layer: (PO/EV-1) : C = (50/50) : 15

Table 42

| Layer Structure (outer layer/intermediate layer/inner layer) | F (%) 10 | Delemination State after Falling Test |
|---|---|---|
| Y/above three-component blend/X | 10 | delamination was obwerved in all samples after falling was repeated 9 times |
| Y/above two-component blend/X | 20 | Delamination was observed in all samples after falling was repeated 4 times |
| Y/no intermediate layer/X | 10 | delamination was observed in all samples after falling was conducting once |
| Y (above high density polyethylene alone) | 10 | — |
| X (above saponified copolymer alone) | 100 | — |

The laminate bottle having an intermediate layer of the above three-component blend was compared with the laminate bottle having an intermediate layer of the above two-component blend with respect to the appearance App according to the method described in the text of the specification to obtain results shown in Table 43 given below.

Table 43

| Layer Structure (outer layer/intermediate layer/inner layer) | App (points) |
|---|---|
| Y/above three-component blend/X | 20.5 |
| Y/above two-component blend/X | 0.5 |

In Tables 42 and 43, X indicates the above saponified ethylene-vinyl acetate copolymer and Y indicates the above high density polyethylene.

EXAMPLE 36

A low density polyethylene having a density of 0.920 g/cc as measured according to ASTM D-1505 and a melt index of 0.3 g/10 min as measured according to ASTM D-1238 was mixed with an ethylene-vinyl acetate copolymer saponfied product having an ethylene content of 30.4 mole %, a degree of saponification of 99.6% and an intrinsic viscosity of 0.10 l/g, at a mixing weight ratio of 50 : 50. Then 100 parts by weight of the above mixture was incorporated with 15.0 parts by weight of Surlyn A (ionomer of $Na^+$ type having a carbonyl concentration of 160 milliequivalents per 100 g of the polymer and a melt index of 1.2 g/10 min; product of Du Pont, U.S.A.). The mixture was dry-blended at room temperature for 3 minutes by means of a Henschel mixer.

The so obtained dry blend was heated, kneaded and pelletized by means of a pelletizer having a screw of a diameter of 40 mm and an effective length of 1120 mm (screw rotation rate = 34 rpm; die temperature = 185°C.)

The so pelletized blend, the above saponified copolymer and the above low density polyethylene was co-extruded with use of an intermediate layer extruder having a metering screw of a diameter of 25 mm and an effective length of 600 mm, an outer layer extruder and an inner layer extruder, each having a metering a screw having a diameter of 40 mm and an effective length of 880 mm, and a three-ply die maintained at 200°C., in such a manner that the pelletized blend was extruded from the intermediate layer, the saponified copolymer was extruded from the outer or inner layer extruder and the above low density polyethylene was extruded from the inner or outer layer extruder. According to a known blow molding method, the co-extrudate was molded into a cylindrical bottle (asymmetric three-layer structure) having a total thickness of about 300 $\mu$ and an inner volume of about 120 cc, in which the thickness ratio of outer layer: intermediate layer (blend layer) : inner layer was 2 : 1 : 2.

For comparison, the above ethylene-vinyl acetate copolymer saponified product and low density polyethylene were mixed at a weight ratio of 50 : 50, the above mixture was dry blended without addition of the above Surlyn A, the dry blend was pelletized under the same conditions as above, and by employing this pelletized two-component blend as the intermediate layer-constituting material, the co-extrusion and molding were conducted under the same conditions with use of the same extruders as above, to obtain a bottle which was identical with the above bottle with respect to the total thickness, the thickness ratio, the inner volume and the configuration. Similarly, a bottle of an asymmetric two-layer structure comprising a layer of the above saponified copolymer alone and a layer of the above low density polyethylene was prepared as a comparative bottle.

Each of these bottles was filled with edible oil or water and an opening was sealed. Then, the bottle was allowed to stand still at a temperature of 50°C. and a relative humidity of 10% for 21 days. The delamination state was examined to obtain results shown in Table 44.

Table 44

| Layer Structure (outer layer/intermediate layer/inner layer) | Content | Delamination State after 21 Days |
|---|---|---|
| X/above three-component blend/Y | edible oil | delamination was not observed |
| X/above two-component blend/Y | edible oil | delamination was not obsefved |
| X/no intermediate layer/Y | edible oil | delamination was observed |
| Y/above three-component blend/X | water | delamination was not observed |
| Y/above two-component blend/X | water | delamination was not observed |
| Y/no intermediate layer/X | water | delamination was observed |

The laminate bottle having an intermediate layer of the three-component blend was compared with the laminate bottle having an intermediate layer of the above two-component blend with respect to the appearance App according to the method described in the text of the specification to obtain results shown in Table 45.

Table 45

| Layer Structure (outer layer/intermediate layer/inner layer) | App (points) |
|---|---|
| X/above three-component blend/Y | 21 |
| X/above two component blend/Y | 0 |
| Y/above three-component blend/X | 21 |
| Y/above two-component blend/X | 0 |

In Tables 44 and 45, X indicates the above ethylene-vinyl acetate copolymer saponified product and Y indicates the above low density polyethylene.

EXAMPLE 37

Laminate films of an asymmetric three-layer structure comprising an intermediate layer of the same three-component or two-component pelletized blend as formed in Example 36, an outer layer of the same ethylene-vinyl acetate copolymer saponified product as employed in Example 36 and an inner layer of the same low density polyethylene as used in Example 36 (outer layer : intermediate layer : inner layer thickness ratio = 1 : 2 : 2; total thickness = about 150 μ) were prepared by employing an inflation three-ply die maintained at 205°C. according to a known inflation method.

Each of the so obtained films was formed into a bag having a length of 170 mm and a width of 115 mm by means of a heat sealer. The so obtained bag was filled with about 200 cc of edible oil, and an opening was heat sealed. Then, the bag was allowed to stand at a temperature of 50°C. and a relative humidity of 10% for 21 days, and the delamination state was examined to obtain results shown in Table 46.

Table 46

| Layer Structure (outer layer/intermediate layer/inner layer) | Content | Delamination State after 21 Days |
|---|---|---|
| X/above three-component blend/Y | edible oil | delamination was not observed |
| X/above two-component blend/Y | edible oil | delamination was not observed |
| X/no intermediate layer/Y | edible oil | delamination was observed |

The laminate film having an intermediate layer of the above three-component blend was compared with the laminate film having an intermediate layer of the above two-component blend with respect to the appearance App according to the method described in the text of the specification, to obtain results shown in Table 47 given below.

Table 47

| Layer Structure (outer layer/intermediate layer/inner layer) | App (points) |
|---|---|
| X/above three-component blend/Y | 21 |
| X/above two-component blend/Y | 0 |

In Tables 46 and 47, X and Y have the same meaning as defined in Example 36.

EXAMPLE 38

100 parts by weight of an 80 : 20 weight ratio premix of an ethylene-vinyl acetate copolymer saponified product and Surlyn A (ionomer manufactured by Du Pont, U.S.A.), each having the same properties as that used in Example 18, was incorporated with 40 parts by weight of a low density polyethylene having a density of 0.920 g/cc as measured according to ASTM D-1505, a melt density of 0.76 g/cc as measured at 190°C. and a melt index of 0.3 g/10 min as measured according to ASTM D-1238, and the mixture was dry blended under the same conditions as described in Example 18. The above low density polyethylene alone was subjected to the extrusion test with use of the same intermediate layer extruder as employed in Example 5 (installed with a metering screw) and a three-ply die maintained at 190°C. When the screw rotation rate of said extruder was 15 rpm, an average flow rate of 1.5 cm/sec was calculated from the extrusion rate (1.8 Kg/hr), and when the screw rotation rate of said extruder was 7 rpm, an average flow rate of 0.70 cm/sec was calculated from the extrusion rate (0.84 Kg/hr). The above dry blend and low density polyethylene were co-extruded with use of the same inner layer extruder (installed with a metering screw), outer- and inner-layer extruder and three-ply die (maintained at 190°C.) as employed in Example 5 for molding of bottles, in such a manner that the blend was extruded from the intermediate later extruder and the low density polyethylene was extruded from the outer- and inner-layer extruder. At this co-extrusion operation, the rotation rate of the screw of the intermediate layer extruder was adjusted to 15 rpm (extrusion pressure being 6.5 Kg/cm$^2$) and the rotation rate of the screw of the outer- and inner-layer extruder was adjusted to 20 rpm (extrusion pressure being 11 Kg/cm$^2$). The resulting co-extrudate was molded into an oval bottle of a symmetric three-layer laminate structure having an intermediate layer of the above blend and inner and outer layers of the low density polyethylene according to a known blow molding method. The average thickness, the thickness ratio and the inner volume of the so obtained bottle were the same as those of the bottle obtained in Example 5. The so obtained bottle is designated as "bottle F".

The co-extrusion was conducted under the same conditions with use of the same polymer materials and the same extruders and three-ply die as above, except that the rotation rate of the screw of the intermediate layer extruder was changed to 7 rpm (extrusion pressure being 2.7 Kg/cm$^2$) and the rotation of the screw of the outer- and inner-layer extruder was changed to 9.3 rpm (extrusion pressure being 4.5 Kg/cm$^2$). The co-extrudate was molded according to a known blow molding method to obtain a bottle having the same average thickness, the same thickness ratio, the same inner volume and the same layer structure as those of bottle F. The so obtained bottle is designated as "bottle G".

The co-extrusion was conducted under the same conditions with use of the same polymer materials and extruders as in the case of the above bottle F except that in the intermediate layer extruder the metering screw was replaced by a dulmage type screw having a mixing zone of 8 threads at the top end portion (having a diameter of 40 mm and an effective length of 800 mm). The co-extrudate was molded into a bottle identical with bottle F with respect to the configuration, laminate structure (layer structure), thickness ratio, average thickness and inner volume. The so formed bottle is designated as "bottle H".

With respect to each of the so obtained bottles F, G and H, the oxygen gas permeability $QO_2$ and the average interlaminar peel strength Sp were determined according to the methods described in the text of the specification to obtain results shown in Table 48.

Then, with respect to each of these three bottles, the blend layer was divided into three layers according to the method described in the text of the specification, and the values of $\log (I_o/I)\bar{\mu}$, $m_1$ and $m_2$ of divided layers 1 and 3 adjacent to the low density polyethylene layer and the intermediate divided layer 2 were calculated according to the equations given in the text of the specification. Results are shown in Table 49.

EXAMPLE 39

100 parts by weight of a 50 : 50 weight ratio premix of an ethylene-vinyl acetate copolymer saponified product and Surlyn A (isomer manufactured by Du Pont, U.S.A.), each having the same properties as that used in Example 18, was incorporated with 5 parts by weight of a low density polyethylene having the same properties as that used in Example 38, and the mixture was dry blended under the same conditions as adopted in Example 38 for formation of the bottle F. The above dry blend and the above low density polyethylene were co-extruded with use of the same inner layer extruder (installed with a metering screw), outer- and inner-layer extruder and three-ply die (maintained at 190°C.) as employed in Example 38 for molding of bottle F, in such a manner that the blend was extruded from the intermediate later extruder and the low density polyethylene was extruded from the outer- and inner-layer extruder. At this co-extrusion operation, the rotation rate of the screw of the intermediate layer extruder was adjusted to 15 rpm (extrusion pressure being 5 Kg/cm²) and the rotation rate of the screw of the outer- and inner-layer extruder was adjusted to 40 rpm (extrusion pressure being 22 Kg/cm²). The resulting co-extrudate was molded into an oval bottle of a symmetric three-layer laminate structure having an intermediate layer of the above blend and inner and outer layers of the low density polyethylene according to a known blow molding method. The thickness ratio of outer layer: intermediate layer: inner layer was 9 : 1 : 9, the average total thickness was about 1.2 mm and the inner volume was about 550 cc. The so obtained bottle is designated as "bottle J". The co-extrusion was conducted under the same conditions with use of the same polymer materials and extruders as in the case of the above bottle J except that in the intermediate layer extruder the metering screw was replaced by a dulmage screw of the same type as used in Example 38. The co-extrudate was molded into a bottle identical with bottle J with respect to the configuration, laminate structure (layer structure), thickness ratio, average thickness and inner volume. The so formed bottle is designated as "bottle K".

With respect to each of the so obtained bottles J and K, the oxygen gas permeability $QO_2$ and the average interlaminar peel strength Sp were determined according to the methods described in the text of the specification to obtain results shown in Table 48.

Then, with respect to each of these two bottles, the blend layer was divided into three layers according to the method described in the text of the specification, and the values of $\log (I_o/I)\bar{\mu}$ and $m_1$ of divided layers 1 and 3 adjacent to the low density polyethylene layer were calculated according to the equations given in the text of the specification. Results are shown in Table 49.

EXAMPLE 40

100 parts by weight of a 95 : 5 weight ratio premix of an ethylene-vinyl acetate copolymer saponified product and Surlyn A (isomer manufactured by Du Pont, U.S.A.), each having the same properties as that used in Example 18, was incorporated with 100 parts by weight of a low density polyethylene having the same properties as that used in Example 38. The premix was incorporated with 200 ppm of 2,6-di-tert-butyl-4-gydroxytoluene (B. H. T.) as an antioxidant, 300 ppm of stearylamide and 300 ppm of oleylamide, and the mixture was dry blended under the same conditions as in Example 18. Then, the so obtained dry blend was pelletized by means of a pelletizer having a metering screw of a diameter of 90 mm and an effective length of 1980 mm. (The screw rotation rate was 88 rpm, the extrusion rate was 100 Kg/hr and the die temperature was 210°C.)

The so obtained pelletized blend and the above low density polyethylene (incorporated with 200 ppm of an antioxidant of the B. H. T. type, 300 ppm of stearylamide and 300 ppm of oleylamide) were co-extruded with use of the same inner layer extruder (installed with a metering screw), outer- and inner-layer extruder and three-ply die (maintained at 190°C.) as employed in Example 38 for molding of bottle F, in such a manner that the blend was extruded from the intermediate later extruder and the low density polyethylene was extruded from the outer- and inner-layer extruder. At this co-extrusion operation, the rotation rate of the screw of the intermediate layer extruder was adjusted to 15 rpm (extrusion pressure being 5.5 Kg/cm²) and the rotation rate of the screw of the outer- and inner-layer extruder was adjusted to 10 rpm (extrusion pressure being 5 Kg/cm²). The resulting co-extrudate was molded into an oval tube of a symmetric three-layer laminate structure having an intermediate layer of the above blend and inner and outer layers of the low density polyethylene according to a known blow molding method. The average thickness was about 300 $\mu$, the thickness ratio of outer layer : intermediate layer : inner layer was about 2.3 : 1 : 2.3, and the inner volume was about 250 cc. The so obtained tube is designated as "tube L". The co-extrusion was conducted under the same conditions with use of the same polymer materials and extruders as in the case of the above tube L except that in the intermediate layer extruder the metering screw was replaced by the same dulmage type screw as used in Example 38. The co-extrudate was molded into a tube identical with tube L with respect to the configuration, laminate structure (layer structure), thickness ratio, average thickness and inner volume. The so formed tube is designated as "bottle M".

With respect to each of the so obtained tube L and M, the oxygen gas permeability $QO_2$ and the average interlaminar peel strength Sp were determined according to the methods described in the text of the specification to obtain results shown in Table 48.

Then, with respect to each of these three bottles, the blend layer was divided into three layers according to the method described in the text of the specification, and the values of log $(I_o/I)\overline{\mu}$ and $m_1$ of divided layers 1 and 3 adjacent to the low density polyethylene layer were calculated according to the equations given in the text of the specification, results are shown in Table 49.

Table 48

| Example No. | Sample | $QO_2$ ( cc/m² . day . atm ) | Sp ( g/2 cm ) |
|---|---|---|---|
| 38 | F | 12.4 | 320 |
| 38 | G | 29.2 | 130 |
| 38 | H | 81.0 | 120 |
| 39 | J | 23.3 | not peeled |
| 39 | K | 101 | 120 |
| 40 | L | 21.5 | not peeled |
| 40 | M | 97.5 | 160 |

Table 49

| Example No. | Sample | Identification of Layer | log $(I_o/I)/\overline{\mu} \times 10^3$ | | |
|---|---|---|---|---|---|
| | | | | $m_1$ | $m_2$ |
| 38 | F | 1 | 39.8 | 0.82 | |
| 38 | F | 3 | 31.4 | 0.65 | |
| 38 | G | 1 | 45.5 | 0.94 | |
| 38 | G | 3 | 42.6 | 0.88 | |
| 38 | H | 1 | 47.4 | 0.98 | |
| 38 | H | 3 | 47.4 | 0.98 | |
| 39 | J | 1 | 33.9 | 0.84 | |
| 39 | J | 3 | 29.5 | 0.73 | |
| 39 | K | 1 | 39.2 | 0.97 | |
| 39 | K | 3 | 40.4 | 1.00 | |
| 40 | L | 1 | 33.5 | 0.83 | |
| 40 | L | 3 | 28.2 | 0.70 | |
| 40 | M | 1 | 40.4 | 1.00 | |
| 40 | M | 3 | 40.4 | 1.00 | |
| 38 | F | 2 | 74.1 | | 1.53 |
| 38 | H | 2 | 50.5 | | 1.04 |

EXAMPLE 41

A dry blend composed of the same resins at the same mixing ratio as in Example 38 and prepared under the same preliminary mixing conditions as in Example 38 and an ethylene-vinyl acetate copolymer having a density of 0.93 g/cc as measured according to ASTM D-1505, a melt density of 0.77 g/cc as measured at 190°C., a melt index of 0.5 g/10 min as measured according to ASTM D-1238, a vinyl acetate content of 5 % by weight and an average flow rate of 1.6 cm/sec as measured under the same conditions as adopted in Example 38 were co-extruded with use of the same inner layer extruder (installed with a metering screw), outer- and inner-layer extruder and three-ply die (maintained at 190°C.) as employed in Example 38, in such a manner that the blend was extruded from the intermediate later extruder and the ethylene-vinyl acetate copolymer was extruded from the outer- and inner-layer extruder. At this co-extrusion operation, the rotation rate of the screw of the intermediate layer extruder was adjusted to 15 rpm (extrusion pressure being 6.5 Kg/cm²) and the rotation rate of the screw of the outer- and inner-layer extruder was adjusted to 20 rpm (extrusion pressure being 13Kg/cm²). The resulting co-extrudate was molded into an oval bottle of a symmetric three-layer laminate structure having an intermediate layer of the above blend and inner and outer layers of the ethylene-vinyl acetate copolymer according to a known blow molding method. The average thickness, the thickness ratio and the inner volume of the so obtained bottle were the same as those of the bottle obtained in Example 5. The so obtained bottle is designated as "bottle N".

100 parts by weight of an 80 : 20 weight ratio premix of an ethylene-vinyl acetate copolymer saponified product and Surlyn A (ionomer manufactured by Du Pont, U.S.A.), each having the same properties as that used in Example 18 was incorporated with 40 parts by weight of the above ethylen-vinyl acetate copolymer.

By employing the resulting blend as the intermediate layer material and the same inner- and outer-layer material as above, a bottle of a three-layer laminate structure having inner and outer layers of the above ethylene-vinyl acetate copolymer an an intermediate layer of the blend of the above ethylene-vinyl acetate copolymer, Surlyn A and the ethylene-vinyl acetate copolymer saponified product was prepared under the same molding conditions with use of the same multilayer extrusion machine as above. This bottle was identical with the bottle N as regards the configuration and other factors. The so obtained bottle is designated as "bottle P".

The co-extrusion was conducted under the same conditions with use of the same polymer materials and extruders as in the case of the above bottle P except that in the intermediate layer extruder the metering screw was replaced by a dulmage type screw having a mixing zone of 8 threads at the top end portion (having a diameter of 40 mm and an effective length of 800 mm). The co-extrudate was molded into a bottle identical with respect to the configuration, laminate structure (layer structure), thickness ratio, average thickness and inner volume. The so formed bottle is designated as "bottle dp".

With respect to each of the so obtained bottles N, P and dp the oxygen gas permeability $QO_2$ and the average interlaminar peel strength Sp were determined according to the methods described in the text of the specification to obtain results shown in Table 50.

Then, with respect to each of these three bottles, the blend layer was divided into three layers according to the method described in the text of the specification, and the values of log $(I_o/I)/\overline{\mu}$ and $m_1$ of divided layers 1 and 3 adjacent to the low density polyethylene layer were calculated according to the equations given in the text of the specification. Results are shown in Table 51.

EXAMPLE 42

An ethylene-vinyl acetate copolymer saponified product having an ethylene content of 49.4 mole %, a degree of saponification of 96.3 %, an intrinsic viscosity of 0.15 l/g and a melt density of 1.02 g/cc as measured at 190°C. was subjected to the extrusion test under the same conditions as in Example 38 with use of the same intermediate layer extruder and three-ply die as employed in Example 38. An average flow rate of 3.5 cm/sec in the die was calculated from the extrusion rate (5.7 Kg/hr).

100 parts by weight of a 90 : 10 weight ratio premix of the above ethylene-vinyl acetate copolymer saponified product and Surlyn A (ionomer manufactured by Du Pont, U.S.A.) having the same properties as that used in Example 18 was incorporated with 50 parts by weight of a low density polyethylene having the same properties as that employed in Example 38. Then, the mixture was dry blended under the same conditions as in Example 18.

The so obtained dry blend and a high density polyethylene having a density of 0.950 g/cc as measured according to ASTM D-1505, a melt density of 0.773 g/cc as measured at 190°C. and a melt index of 0.2 g/10 min as measured according to ASTM D-1238 were co-extruded with use of the same inner layer extruder (installed with a metering screw), outer- and inner-layer extruder and three-ply die (maintained at 190°C.) as employed in Example 5 for molding of bottles, in such a manner that the blend was extruded from the intermediate layer extruder and the high density polyethylene was extruded from the outer- and inner-layer extruder. At this co-extrusion operation, the rotation rate of the screw of the intermediate layer extruder was adjusted to 15 rpm (extrusion pressure being 6 Kg/cm$^2$) and the rotation rate of the screw of the outer- and inner-layer extruder was adjusted to 20 rpm (extrusion pressure being 12 Kg/cm$^2$). The resulting co-extrudate was molded into a cylindrical bottle of a symmetric three-layer laminate structure having an intermediate layer of the above blend and inner and outer layers of the high density polyethylene according to a known blow molding method. The average thickness was about 800$\mu$, the thickness ratio of outer layer: intermediate layer: inner layer was 4.5 : 1 : 4.5 and the inner volume was about 600 cc. The so obtained bottle is designated as "bottle Q".

100 parts by weight of a 90 : 10 weight ratio mixture of the above ethylene-vinyl acetate copolymer saponified product and the above Surlyn A was incorporated with 25 parts by weight of the above low density polyethylene and 25 parts by weight of the above high density polyethylene (having an average flow rate of 1.3 cm/sec as measured under the same conditions as in Example 38), and the mixture was dry blended under the same conditions as above. By employing the resulting blend as the intermediate layer material and the above high density polyethylene ad the outer- and inner-layer material, a bottle of a three laminate structure which was identical with the bottle Q in respect to the configuration, laminate structure, average thickness, thickness ratio and inner volume was prepared under the same molding conditions with use of the same intermediate layer extruder and outer- and inner-layer extruder (screw rotation rate = 22 rpm; extrusion pressure = 11 Kg/cm$^2$) as used above. The resulting bottle is designated as "bottle R".

Further, under the same conditions with use of the same extruders as mentioned above, a bottle having an intermediate layer of the same four-component blend as in the case of the bottle R and outer and inner layers of the above low density polyethylene and the above high density polyethylene was prepared. This bottle was identical with the bottle R with respect to the configuration, laminate structure, average thickness, thickness ratio and inner volume. This bottle is designated as "bottle S".

The co-extrusion was conducted under the same conditions with use of the same polymer materials and extruders as above in the case of the above bottle S except that in the intermediate layer extruder the metering screw was replaced by a dulmage type screw having a mixing zone of 8 threads at the top end portion (having a diameter of 40 mm and an effective length of 800 mm). The co-extrudate was molded into a bottle identical with bottle S with respect to the configuration, laminate structure, thickness ratio, average thickness and inner volume. The so formed bottle is designated as "bottle dS".

With respect to each of the so obtained bottles Q, R, S and dS, the oxygen gas permeability $QO_2$ and the average interlaminar peel strength Sp were determined according to the methods described in the text of the specification to obtain results shown in Table 50.

Then, with respect to each of these four bottles, the blend layer (intermediate layer) was divided into three layers according to the method described in the text of the specification, and the values of log $(I_o/I)\bar{\mu}$ and $m_1$ of divided layers 1 and 3 adjacent to the inner and outer layers were calculated according to the equations given in the text of the specification. Results are shown in Table 51.

EXAMPLE 43

By employing the same intermediate layer material as in Example 38 and an isotactic polypropylene having a density of 0.192 g/cc (ASTM D-1505) and a melt index of 0.8 g/10 min (ASTM D-1238) as an inner- and outer-layer material, an oval bottle of a symmetric three-layer structure (average thickness = about 600$\mu$; outer layer : intermediate layer : inner layer thickness ratio = 9.5 : 1 : 9.5; inner volume = about 280 cc) was prepared under the same conditions with use of the same extruding molding machine (the intermediate layer having a metering screw) as adopted in Example 5. The extrusion pressure was 7.5 Kg/cm$^2$ in the outer-and inner-layer extruder and 5.5 Kg/cm$^2$ in the intermediate layer. The so obtained bottle is designated as "bottle T".

A 76 : 20 : 4 mixing weight ratio mixture of the above isotactic polypropylene, a low density polyethylene having a density of 0.920 g/cc and a melt index of 0.8 g/10 min and an ethylene-propylene copolymer having an ethylene content of 30 mole % was molten and kneaded by a pelletizer. By employing the resulting pelletized blend as the inner- and outer-layer material and the same intermediate material as in the case of the bottle T, a bottle was prepared under the same conditions with use of the same extrusion molding machine as in the case of the bottle T (the extrusion pressure was 9.5 Kg/cm$^2$ in the outer- and inner-layer extruder and 6 Kg/cm$^2$ in the intermediate layer extruder). The resulting bottle was identical with the bottle T with respect to the configuration, laminate structure, average thickness, thickness ratio and the inner volume. This bottle is designated as "bottle U".

The co-extrusion was conducted under the same conditions with use of the same polymer materials and extruders as in the case of the above bottle except that in the intermediate layer extruder the metering screw was replaced by a dulmage type screw having a mixing zone of 8 threads at the top end portion. The co-extrudate was molded into a bottle identical with the bottle U with respect to the configuration, laminate structure, thickness ratio, average thickness and inner volume. The so formed bottle is designated as "bottle dU".

With respect to each of the so obtained bottles T, U and dU the oxygen gas permeability $QO_2$ and the average interlaminar peel strength Sp were determined according to the methods described in the text of the specification to obtain results shown in Table 50.

Then, with respect to each of these three bottles, the blend layer (intermediate layer) was divided into three layers according to the method described in the text of the specification, and the values of log $(I_o/I)\bar{\mu}$ and $m_1$ of divided layers 1 and 3 adjacent to the outer and inner layers were calculated according to the equations given in the text of the specification.

Table 50

| Example No. | Sample | QO$_2$ (cc/m$^2$ . day . atm) | Sp ( g/2 cm ) |
|---|---|---|---|
| 41 | N | 13.6 | 430 |
| 41 | P | 12.9 | 470 |
| 41 | dP | 66.1 | 250 |
| 42 | Q | 22.5 | 290 |
| 42 | R | 23.1 | 360 |
| 42 | S | 23.6 | 420 |
| 42 | dS | 134 | 190 |
| 43 | T | 28.2 | 240 |
| 43 | U | 29.0 | 300 |
| 43 | dU | 113 | 100 |

Table 51

| Example No. | Sample | Identification of Layer | log $(I_o/I)/\bar{\mu} \times 10^3$ | m$_1$ |
|---|---|---|---|---|
| 41 | N | 1 | 39.8 | 0.82 |
| 41 | N | 3 | 31.4 | 0.65 |
| 41 | P | 1 | 38.8 | 0.80 |
| 41 | P | 3 | 30.0 | 0.62 |
| 42 | Q | 1 | 21.6 | 0.86 |
| 42 | Q | 3 | 19.4 | 0.77 |
| 42 | R | 1 | 22.6 | 0.89 |
| 42 | R | 3 | 20.1 | 0.79 |
| 42 | S | 1 | 22.5 | 0.89 |
| 42 | S | 3 | 19.7 | 0.78 |
| 42 | dS | 1 | 24.9 | 0.99 |
| 42 | dS | 3 | 25.2 | 1.00 |
| 43 | T | 1 | 39.2 | 0.81 |
| 43 | T | 3 | 31.4 | 0.65 |
| 43 | U | 1 | 39.8 | 0.82 |
| 43 | U | 3 | 32.0 | 0.66 |
| 43 | dU | 1 | 48.5 | 1.00 |
| 43 | dU | 3 | 47.5 | 0.98 |

EXAMPLE 44

A cylindrical bottle having an asymmetric three-layer laminate structure including an outer layer of a high density polyethylene (same as used in Example 42), an intermediate layer of the same three-component blend as used in Example 38 and an inner layer of a low density polyethylene (same as used in Example 38), which had an average thickness of about 800$\mu$, an outer layer : intermediate layer : inner layer thickness ratio of 5 : 1 : 4 and an inner volume of about 600 cc, was molded by employing a multi-layer extruding machine for three-layer vessels comprising an outer layer extruder having a metering screw of a diameter of 65 mm and an effective length of 1430 mm (screw rotation rate = 10 rpm; pressure = 7 Kg/cm$^2$), an intermediate layer extruder having a metering screw of a diameter of 40 mm and an effective length of 800 mm (screw rotation rate = 15 rpm; pressure = 6 Kg/cm$^2$), an inner layer extruder having a screw of a diameter of 50 mm and an effective length of 1100 mm (screw rotation rate = 10 rpm; pressure = 8.5 Kg/cm$^2$) and an asymmetric three-layer extruding three-ply die having an intermediate layer passage sectional area of 0.44 cm$^2$ at the junction of the three layers and being maintained at 190°C., and also by employing a known blow molding machine. The so obtained bottle is designated as "bottle V". The co-extrusion was conducted under the same conditions with use of the same polymer materials and extruders as in the case of the above bottle V except that in the intermediate layer extruder the metering screw was replaced by a dulmage type screw having a mixing zone of 8 threads at the top end portion. The co-extrudate was molded into a bottle identical with the bottle V with respect to the configuration, laminate structure, thickness ratio, average thickness and inner volume. The so formed bottle is designated as "bottle dV".

With respect to each of the so obtained bottles V and dV, the oxygen gas permeability QO$_2$ and the average interlaminar peel strength Sp were determined according to the methods described in the text of the specification to obtain results shown in Table 52.

Then, with respect to each of these two bottles, the blend layer (intermediate Layer) was divided into three layers according to the method described in the text of the specification, and the values of log $(I_o/I)/\bar{\mu}$ and $m_1$ of divided layers 1 and 3 adjacent to the inner and outer layers were calculated according to the equations given in the text of the specification. Results are shown in Table 53.

EXAMPLE 45

A cylindrical bottle having an symmetric four-layer structure comprising an outer layer (first layer counted from the outside) of the same isotactic polypropylene composition as used in formation of bottles U and dU in Example 43, an intermediate layer (second layer) of the same three-component blend as used in Example 38, an inner layer (third layer) of the same isotactic polypropylene composition as used in Example 43 for formation of bottles U and dU and an innermost layer (fourth layer) of the same low density polyethylene as used in Example 38, which had an average thickness of about 900$\mu$, an outer layer : intermediate layer : inner layer : innermost layer ratio of 9 : 1 : 9 : 2 and an inner volume of about 600 cc, was molded by employing multi-layer extruding machine for four-layer vessels which comprised an outer- and inner-layer extruder (first and third layer extruder) installed with a metering screw of a diameter of 65 mm and an effective length of 1430 mm and provided with a two-branched melt channel (screw rotation rate = 40 rpm; pressure = 22 Kg/cm$^2$), an intermediate layer extruder (second layer extruder) having a metering screw of a diameter of 40 mm and an effective length of 800 mm (screw rotation rate = 15 rpm; pressure = 7 Kg/cm$^2$), an innermost layer extruder (fourth layer extruder) having a metering screw of a diameter of 32 mm and an effective length of 640 mm (screw rotation rate = 30 rpm; pressure = 6.5 Kg/cm$^2$) and an asymmetric four-layer extruding four-ply die having an intermediate layer passage sectional area of 0.44 cm$^2$ at the junction of the four layers and being maintained at 190°C. and also by employing a known blow molding machine. The so obtained bottle is designated as "bottle W".

100 parts by weight of the above isotactic polypropylene composition was incorporated with 10 parts by weight of the same ethylene-vinyl acetate copolymer saponified product as employed in Example 35 and 5 parts by weight of the same Surlyn A as used in Example 38, and the mixture was dry blended at room temperature efor 3 minutes by means of a Henschel mixer. By employing the so obtained dry blend as a material for the outer and inner layers (first and third layers) and the same intermediate and innermost layer materials as above, a bottle which was identical with the bottle W with respect to the configuration, layer structure, average thickness, thickness ratio and inner volume was prepared under the same extrusion and molding conditions with use of the same extruding and molding machines as above. The so obtained bottle is designated as "bottle X".

For comparison, a bottle $dX$ was molded under the same conditions as adopted for formation of the bottle X except that the metering screw of the intermediate layer extruder (second layer extruder) was replaced by a dulmage screw having a mixing zone of 8 threads disposed at the top end portion.

With respect to each of the so obtained bottles W, X and $dX$, the oxygen gas permeability $QO_2$ and average interlaminar peel strength Sp were determined according to the methods described in the text of the specification. Results are shown in Table 52.

Further, with respect to each of these three bottles, according to the method described in the text of the specification the blend layer (intermediate layer) was divided into three layers, the values of log $(I_o/I)/\bar{\mu}$ and $m_1$ of the divided layers 1 and 3 adjacent to the outer layer (first layer) and inner layer (third layer) were calculated according to the equations given in the text of the specification. Results are shown in Table 53.

EXAMPLE 46

100 parts by weight of an 80 : 20 weight ratio premix of an ethylene-vinyl acetate copolymer saponified product and Surlyn A (ionomer manufactured by Du Pont, U.S.A.), each having the same properties as that used in Example 18 was incorporated with 40 parts by weight of a low density polyethylene having a density of 0.920 g/cc as measured according to ASTM D-1505, a melt density of 0.76 g/cc as measured at 190°C. and a melt index of 2.1 g/10 min as measured according to ASTM D-1238, (having an average flow rate of 2.0 cm/sec as measured as in Example 38), and the mixture was dry blended at room temperature for 3 minutes by means of a Henschel mixer. Then, the dry blend was pelletized by means of a pelletizer having a metering screw of a diameter of 90 mm and an effective length of 1980 mm (screw rotation rate = 88 rpm; die temperature = 190°C.), to thereby obtain a pelletized three-component blend.

A film of an asymmetric two-layer laminate structure having an outer layer of the above three-component blend and an inner layer of the same low density polyethylene as used in Example 38, which had an average thickness of about $120\mu$ and an outer layer : inner layer thickness ratio of 1 : 2, was prepared by employing a multi-layer extruding machine for two-layer vessels comprising an outer layer extruder having a nylon screw of a diameter of 40 mm and an effective length of 800 mm (screw rotation rate = 15 rpm; pressure = 6 Kg/cm²), an inner layer extruder having a metering screw of a diameter of 65 mm and an effective length of 1430 mm (screw rotation rate = 7 rpm; pressure = 5 Kg/cm²) and an asymmetric two-layer extruding two-ply die having an outer layer passage sectional area of 0.44 cm² at the junction of the two layers and being maintained at 190°C. and also by employing an inflation molding machine for formation of films. The so obtained film is designated as "film Y".

For comparison, a film $dY$ was prepared under the same conditions as above except that the nylon screw of the outer layer extruder was replaced by a dulmage screw having a mixing zone of eight threads at the top end portion.

With respect to each of the so obtained films Y and $dY$, the oxygen gas permeability $QO_2$ and the Freon gas permeability $QF_{12}$ were determined according to the pressure method described in the text of the specification by employing a gas permeation tester (temperature = 37°C.; high pressure side gas pressure = 760 mmHg; low pressure side gas pressure = $10^{-2}$ mmHg). Further, the average interlaminar strength Sp was also determined according to the method described in the text of the specification. Results are shown in Table 54.

With respect to each of these two films, according to the method described in the text of the specification, the blend layer (outer layer) was divided into three layers, and the values of log $(I_o/I)/\bar{\mu}$ and $m_1$ in the divided layer 1 adjacent to the inner layer (low density polyethylene layer) were calculated according to the equations given in the text of the specification. Results are shown in Table 53.

Table 52

| Example No. | Sample | $QO_2$ (cc/m² . day.atm) | Sp (g/2 cm) |
|---|---|---|---|
| 44 | V | 8.9 | 280 |
| 44 | dV | 37.5 | 100 |
| 45 | W | 14.8 | 240 |
| 45 | X | 11.6 | 300 |
| 45 | dX | 43.0 | 150 |

Table 53

| Example No. | Sample | Identification of Layer | log $(I_o/I)/\bar{\mu} \times 10^3$ | $m_1$ |
|---|---|---|---|---|
| 44 | V | 1 | 40.3 | 0.83 |
| 44 | V | 3 | 31.5 | 0.65 |
| 44 | dV | 1 | 47.8 | 0.99 |
| 44 | dV | 3 | 48.6 | 1.00 |
| 45 | W | 1 | 40.2 | 0.83 |
| 45 | W | 3 | 32.2 | 0.66 |
| 45 | X | 1 | 39.7 | 0.82 |
| 45 | X | 3 | 31.5 | 0.65 |
| 45 | dX | 1 | 48.0 | 0.99 |
| 45 | dX | 3 | 47.5 | 0.98 |
| 46 | Y | 3 | 15.2 | 0.59 |
| 46 | dY | 3 | 24.8 | 0.96 |

Table 54

| Example No. | Sample | $QO^2$ (cc/m². day. atm) | $QF_{12}$ (cc/m². day . atm) | Sp (g/2 cm) |
|---|---|---|---|---|
| 46 | Y | 37.1 | 4.7 | 210 |
| 45 | dY | 186 | 17.9 | 130 |

What we claim is:

1. A resin laminate structure comprising at least one layer (a) of a polyolefin and at least one layer (b) consisting essentially of (A) a polyolefin and (B) a saponified product of ethylene-vinyl acetate copolymers having an ethylene content of 25 to 50 mole % and a degree of saponification of at least 96% at an A : B mixing weight ratio ranging from 90 : 10 to 10 : 90, said two layers being laminated by means of co-extrusion without an adhesive so that said layer (a) and said layer (b) are adjacent to each other, wherein said layer (b) is of such a multi-layer laminar structure that the polymer composition is different with respect to the thickness direction but substantially identical with respect to the plane direction and that when the layer (b) is divided into at least two layers in the direction of the thickness, at least that divided layer adjacent to said layer (a) contains predominantly the polyolefin (A), namely contains said saponified product in an amount expressed by the following formula $$M_2 = m_2 X$$

wherein X stands for the average content (% by weight) of the saponified product of the ethylene-vinyl acetate copolymer in the said layer (b), $m_2$ is a number of from 0 to 0.95, and $M_2$ is the content (% by weight) of said saponified product in said specific divided layer, and an adjacent divided layer contains predominantly the saponified product of the ethylene-vinyl acetate copolymer (B), namely contains the saponified product in an amount expressed by the following formula $$M_1 = m_1 X$$

wherein X is as defined above, $m_1$ is a number of at least 1.05, and $M_1$ is the content (% by weight) of said saponified product in said specific divided layer.

2. A resin laminate structure set forth in claim 1 wherein the polyolefin is selected from the group consisting of crystalline homopolymers and copolymers of olefins expressed by the following formula

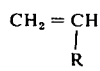

wherein R is a hydrogen atom or an alkyl group having up to 4 carbon atoms.

3. A resin laminate structure set forth in claim 1 wherein the polyolefin has a melt index of from 0.05 to 5.0 g/10 min.

4. A resin laminate structure set forth in claim 1 wherein the polyolefin is a low density polyethylene, a medium density polyethylene or a high density polyethylene.

5. A resin laminate structure set forth in claim 1 wherein the polyolefin is an isotactic polypropylene.

6. A resin laminate structure set forth in claim 1 wherein said saponified ethylene-vinyl acetate copolymer has an intrinsic viscosity [$\eta$], measured at 30°C. with use of a mixed solvent of 85% by weight of phenol and 15% by weight of water, of from 0.07 to 0.17 l/g.

7. A resin laminate structure set forth in claim 1 which comprises (a) at least one polyolefin layer and (b) at least one layer of said blend which are bonded to each other without an intermediate adhesive layer so that they are adjacent to each other, the layer thickness ratio, (a) : (b), being within a range of from 1 : 10 to 40 : 1.

8. A resin laminate structure set forth in claim 1 which comprises (b) at least one layer of said blend and (c) at least one layer of said ethylene-vinyl acetate copolymer saponified product which are bonded to each other without an intermediate adhesive layer so that they are adjacent to each other, the layer thickness ratio, (b) : (c), being within a range of from 1 : 10 to 50 : 1.

9. A resin laminate structure set forth in claim 1 which comprises (a) at least one polyolefin layer, (b) at least one layer of said blend and (c) at least one layer of said ethylene-vinyl acetate copolymer saponified product which are bonded to one another without an intermediate adhesive layer so that they are adjacent to one another, the layer thickness ratio, (a) : (b) : (c), being within a range of from 1 : 1 : 1 to 50 : 30 : 1.

10. A resin laminate structure set forth in claim 1 which is in the form of a container.

11. A resin laminate structure set forth in claim 1 which is in the form of a film.

12. A resin laminate structure set forth in claim 1 which is in the form of a tube.

13. A resin laminate structure comprising two surface layers of a polyolefin and an intermediate layer of a blend consisting essentially of (A) said polyolefin, (B) a saponified product of an ethylene-vinyl acetate copolymer having an ethylene content of 25 to 50 mole % and a degree of saponification of at least 96% and (C) a thermoplastic polymer containing a carbonyl group at the main or side chain thereof at a concentration of 120 to 1400 milliequivalents per 100 g of the polymer, the weight ratio of B : C being within 95 : 5 to 50 : 50, said polyolefin (A) being present in an amount of 5 to 100 parts by weight per 100 parts by weight of the sum of said polymers (B) and (C), and said two surface layers and said intermediate layer being laminated by means of co-extrusion without an adhesive so that said two surface layers and said intermediate layer are adjacent to each other, wherein said intermediate layer has such a multi-layer laminar structure that the polymer composition is different with respect to the thickness direction but substantially identical with respect to the plane direction and that when the intermediate layer is divided into three layers in the direction of the thickness, the two divided layers adjacent to said polyolefin surface layers each contain predominantly the polyolefin (A) and the carbonyl group-containing thermoplastic polymer (C), namely contain said saponified product (B) in an amount expressed by the following formula $$M_1 = m_1 X$$

wherein X stands for the average content (% by weight) of the ethylene-vinyl acetate copolymer saponified product in the blend layer, $m_1$ is a number of from 0 to 0.95, and $M_1$ is the content (% by weight) of said saponified product in said divided outer layer, and the divided inner layer contains predominantly the ethylene-vinyl acetate copolymer saponified product (B), namely contains said saponified product (B) in an amount expressed by the formula $$M_2 = m_2 X$$

wherein X is as defined above, $m_2$ is a number of at least 1.05 and $M_2$ is the content (% by weight of said saponified product in said divided inner layer.

14. A resin laminate structure set forth in claim 13 wherein said carbonyl group-containing thermoplastic polymer is a homopolymer of a monomer expressed by the following formula

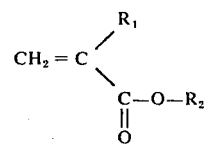

wherein $R_1$ is a hydrogen atom or a lower alkyl group having up to 4 carbon atoms, and $R_2$ is a hydrogen atom or an alkyl group having 1 to 12 carbon atoms, or a copolymer of said monomer with an olefin or other $\alpha,\beta$-ethylenically unsaturated monomer.

15. A resin laminate structure set forth in claim 13 wherein said carbonyl group-containing thermoplastic polymer is a homopolymer of a monomer expressed by the following formula

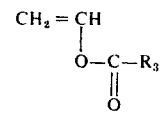

wherein $R_3$ is a hydrogen atom or an alkyl group having up to 4 carbon atoms or a phenyl group, or a copolymer of said monomer with an olefin or a carbonyl group-free, other $\alpha,\beta$-ethylenically unsaturated monomer.

16. A resin laminate structure set forth in claim 13 wherein said carbonyl group-containing thermoplastic polymer is an ionomer.

17. A resin laminate structure set forth in claim 13, wherein said carbonyl group-containing thermoplastic polymer is a polyamide or copolyamide composed of recurring units expressed by the following formula

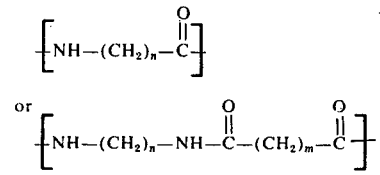

wherein $n$ is a number of from 3 to 13 and $m$ is a number of from 4 to 11.

* * * * *